(12) United States Patent
Thayer et al.

(10) Patent No.: US 11,933,899 B2
(45) Date of Patent: Mar. 19, 2024

(54) REMOTE MEASUREMENT OF SHALLOW DEPTHS IN SEMI-TRANSPARENT MEDIA

(71) Applicants: The Regents of the University of Colorado, Denver, CO (US); LiteWave Technologies, Inc., Louisville, CO (US)

(72) Inventors: Jeffrey P. Thayer, Boulder, CO (US); Geoffrey Crowley, Lafayette, CO (US); Andrew W. Gisler, Boulder, CO (US); Steven Mitchell, Annapolis, MD (US); Matthew Hayman, Boulder, CO (US)

(73) Assignees: The Regents of the University of Colorado, Denver, CO (US); LiteWave Technologies, Inc., Louisville, CO (US)

( * ) Notice: Subject to any disclaimer, the term of this patent is extended or adjusted under 35 U.S.C. 154(b) by 0 days.

(21) Appl. No.: 17/582,966

(22) Filed: Jan. 24, 2022

(65) Prior Publication Data
US 2022/0171064 A1 Jun. 2, 2022

Related U.S. Application Data

(63) Continuation of application No. 15/949,921, filed on Apr. 10, 2018, now Pat. No. 11,231,502, which is a
(Continued)

(51) Int. Cl.
*G01S 17/89* (2020.01)
*G01C 7/02* (2006.01)
(Continued)

(52) U.S. Cl.
CPC ............... *G01S 17/89* (2013.01); *G01C 7/02* (2013.01); *G01S 7/4817* (2013.01); *G01S 7/484* (2013.01);
(Continued)

(58) Field of Classification Search
None
See application file for complete search history.

(56) References Cited

U.S. PATENT DOCUMENTS

| 3,669,540 A | 6/1972 | Rattman et al. |
| 4,277,167 A | 7/1981 | Eppel |

(Continued)

FOREIGN PATENT DOCUMENTS

| EP | 1391382 A1 | 2/2004 |
| EP | 2277776 A2 | 1/2011 |

(Continued)

OTHER PUBLICATIONS

Crowley G., et al., "Characteristics of Traveling Ionospheric Disturbances Observed by the TIDDBIT Sounder," Radio Science, vol. 47, Jun. 9, 2012, 12 pages.
(Continued)

*Primary Examiner* — Eric L Bolda

(57) ABSTRACT

Through discrimination of the scattered signal polarization state, a lidar system measures a distance through semi-transparent media by the reception of single or multiple scattered signals from a scattering medium. Combined and overlapped single or multiple scattered light signals from the medium can be separated by exploiting varying polarization characteristics. This removes the traditional laser and detector pulse width limitations that determine the system's operational bandwidth, translating relative depth measurements into the conditions of two surface timing measurements and achieving sub-pulse width resolution.

20 Claims, 23 Drawing Sheets

Related U.S. Application Data continuation-in-part of application No. 15/461,196, filed on Mar. 16, 2017, now Pat. No. 11,313,678, which is a continuation-in-part of application No. 15/092,015, filed on Apr. 6, 2016, now Pat. No. 10,684,362, which is a continuation-in-part of application No. 14/129,925, filed as application No. PCT/US2012/045038 on Jun. 29, 2012, now Pat. No. 9,476,980.

(60) Provisional application No. 62/483,704, filed on Apr. 10, 2017, provisional application No. 62/143,502, filed on Apr. 6, 2015, provisional application No. 61/503,314, filed on Jun. 30, 2011.

(51) Int. Cl.
| | |
|---|---|
| *G01S 7/481* | (2006.01) |
| *G01S 7/484* | (2006.01) |
| *G01S 7/4863* | (2020.01) |
| *G01S 7/4865* | (2020.01) |
| *G01S 7/487* | (2006.01) |
| *G01S 7/499* | (2006.01) |
| *G01S 17/10* | (2020.01) |
| *G01S 17/42* | (2006.01) |
| *G01S 17/93* | (2020.01) |

(52) U.S. Cl.
CPC .......... *G01S 7/4863* (2013.01); *G01S 7/4865* (2013.01); *G01S 7/487* (2013.01); *G01S 7/499* (2013.01); *G01S 17/10* (2013.01); *G01S 17/42* (2013.01); *G01S 17/93* (2013.01); *Y02A 90/30* (2018.01)

(56) References Cited

U.S. PATENT DOCUMENTS

| | | |
|---|---|---|
| 4,518,254 A | 5/1985 | Penny et al. |
| 4,963,024 A | 10/1990 | Ulich |
| 4,967,270 A | 10/1990 | Ulich et al. |
| 4,986,656 A | 1/1991 | Sweeney et al. |
| 5,157,257 A | 10/1992 | Geiger |
| 5,192,978 A | 3/1993 | Keeler |
| 5,243,541 A | 9/1993 | Ulich |
| 5,457,639 A | 10/1995 | Ulich et al. |
| 5,815,250 A | 9/1998 | Thomson et al. |
| 6,654,105 B2 | 11/2003 | Wang et al. |
| 6,928,194 B2 | 8/2005 | Mai et al. |
| 7,057,199 B2 | 6/2006 | Perry |
| 7,127,348 B2 | 10/2006 | Smitherman et al. |
| 7,580,127 B1 | 8/2009 | Mayor et al. |
| 7,725,258 B2 | 5/2010 | Smitherman |
| 7,893,957 B2 | 2/2011 | Peters, III et al. |
| 7,899,311 B1 | 3/2011 | Kearney et al. |
| 7,944,548 B2 | 5/2011 | Eaton |
| 8,054,464 B2 | 11/2011 | Mathur et al. |
| 8,493,445 B2 | 7/2013 | Degnan, III et al. |
| 8,531,650 B2 | 9/2013 | Feldkhun et al. |
| 9,090,320 B2 | 7/2015 | Rufo et al. |
| 9,476,980 B2 | 10/2016 | Thayer et al. |
| 10,684,362 B2 | 6/2020 | Thayer et al. |
| 2006/0231771 A1 | 10/2006 | Lee et al. |
| 2008/0137058 A1 | 6/2008 | Cesare |
| 2009/0073442 A1 | 3/2009 | Smith |
| 2010/0008588 A1 | 1/2010 | Feldkhun et al. |
| 2010/0025589 A1 | 2/2010 | Olcott et al. |
| 2010/0188504 A1 | 7/2010 | Dimsdale et al. |
| 2010/0296107 A1 | 11/2010 | Keranen |
| 2016/0223671 A1 | 8/2016 | Thayer et al. |
| 2016/0259058 A1 | 9/2016 | Verheggen et al. |
| 2017/0184399 A1 | 6/2017 | Thayer et al. |
| 2019/0018143 A1 | 1/2019 | Thayer et al. |

FOREIGN PATENT DOCUMENTS

| | | |
|---|---|---|
| FR | 2971343 A1 | 8/2012 |
| GB | 2256766 A | 12/1992 |
| JP | H02238391 A | 9/1990 |
| WO | 0242792 A1 | 5/2002 |
| WO | 2006004686 A2 | 1/2006 |
| WO | 2013003771 A1 | 1/2013 |
| WO | 2016138585 A1 | 9/2016 |

OTHER PUBLICATIONS

Extended European Search Report issued in European Application No. 12804262.9, dated Oct. 9, 2014, 7 pages.

International Preliminary Report on Patentability for International (PCT) Application No. PCT/US2012/45038, dated Jan. 7, 2014, 18 pages.

International Search Report for International (PCT) Application No. PCT/US2012/45038, dated Sep. 26, 2012.

Jacques, S., et al., "Imaging Skin Pathology with Polarized Light," Journal of Biomedical Optics, Jul. 2002, vol. 7(3), pp. 329-340.

Mitchell S., et al., "Polarization Lidar for Shallow Water Depth Measurement," Optical Society of America, 2010, vol. 49, 6 pages.

Nayegandhi, "Lidar Technology Overview," Jun. 2007, 66 pages. lidar.cr.usgs.gov/downloadfile2.php?file=Nayegandhi_Lidar_Technology_Over- view.pdf.

Written Opinion for International (PCT) Application No. PCT/US2012/45038, dated Sep. 26, 2012, 17 pages.

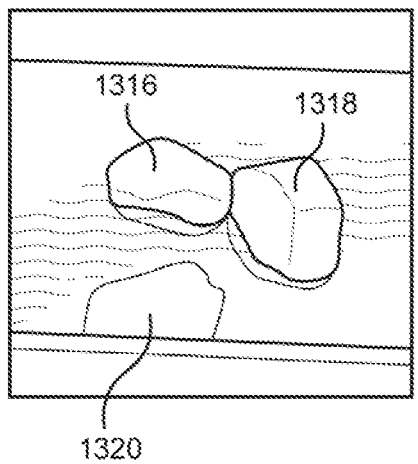
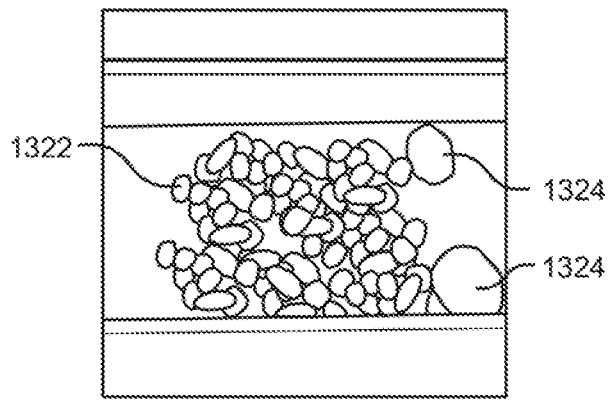
FIG. 13D          FIG. 13E
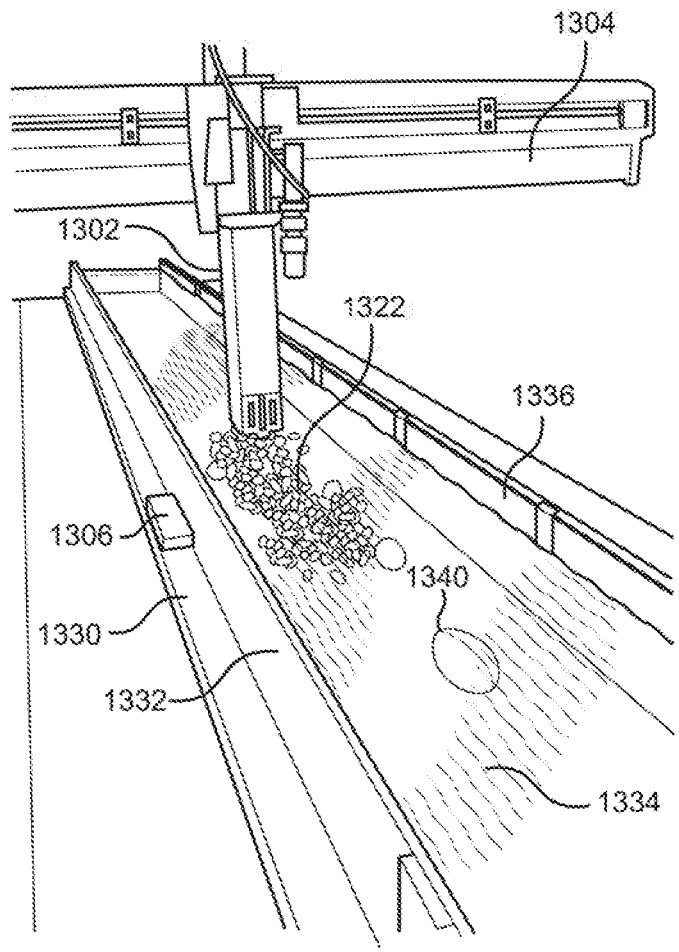
FIG. 13F

FIG. 14A  FIG. 14B

REMOTE MEASUREMENT OF SHALLOW DEPTHS IN SEMI-TRANSPARENT MEDIA

CROSS REFERENCE TO RELATED APPLICATIONS

The present application is a continuation of application Ser. No. 15/949,921, filed Apr. 10, 2018 which claims the benefit of and priority, under 35 U.S.C. § 119(e), to U.S. Provisional Application Ser. No. 62/483,704, filed Apr. 10, 2017, and also is a continuation-in-part of U.S. patent application Ser. No. 15/461,196, filed Mar. 16, 2017, which claims the benefit of and priority, under 35 U.S.C. § 119(e), to U.S. Provisional Application Ser. No. 62/309,163, filed Mar. 16, 2016, which is a continuation-in-part of U.S. patent application Ser. No. 15/092,015, filed Apr. 6, 2016, now U.S. Pat. No. 10,684,362, which claims the benefits of and priority, under 35 U.S.C. § 119(e), to U.S. Provisional Application Ser. No. 62/143,502, filed Apr. 6, 2015, which is a continuation-in-part of U.S. patent application Ser. No. 14/129,925, filed Dec. 27, 2013, now U.S. Pat. No. 9,476,980, which is the National Stage of International Application No. PCT/US2012/045038, filed Jun. 29, 2012, which claims the benefits of and priority, under 35 U.S.C. § 119(e) to U.S. Provisional Application Ser. No. 61/503,314, filed Jun. 30, 2011, all of the above-mentioned applications are fully incorporated herein by reference in their entireties.

FIELD

This invention is directed generally to methods and systems for remote sensing measurements, and particularly to methods and systems for remote sensing measurements through semi-transparent media, e.g., glass, plastic, sapphire, and combinations thereof, and even more particularly to methods and systems for sensing a relative distance and/or shape of an object or feature in various environments.

BACKGROUND

Light detection and ranging (lidar) bathymetry is a technique capable of measuring the depth of a relatively shallow body of water (e.g., less than 2 meters). A pulsed laser beam is transmitted from the lidar instrument to the body of water. The light generated by the laser beam is typically in the blue-green portion of the spectrum due to the high transmission through water of light at that wavelength. Portions of the laser pulse scatter from the air/water interface, the water volume, and the floor of the water body back to and are collected by the instrument. The times of flight of the detected signals are converted into range measurements and, upon consideration of viewing geometry, propagation paths, and associated errors, permit determination of the probed water depth.

Depth measurement in the shallow water regime is challenging due to system bandwidth limitations of traditional bathymetric lidar techniques. Traditionally the approach used to resolve two scattering objects separated in range is by resolving the difference in travel time of light between the two objects. The limiting factor in resolving the range between targets in traditional systems is dictated by the pulse width of either the laser pulse or the detection electronics, often defined as $c\tau/2n$, where c is the speed of light, n is the index of refraction of the media, and ti is the limiting pulse width in time (or the inverse of the system bandwidth). Consequently, in shallow depth applications the limit of current lidar technologies occurs where ambiguities exist between surface scatterings, volume scattering along the water column, and floor scattering due to system bandwidth limitations associated with laser and/or detector pulse widths. As a result, present day bathymetry lidar systems are limited to depth measurements no shallower than tens of centimeters.

Also, conventional lidar systems rely on the total intensity of backscattered laser light to determine the time-of-flight between lidar system and desired target. The total intensity is converted to electrical signals by sampling the detected current using an analog-to-digital converter, or where a threshold comparator, or some variant, can convert pulsed analog signals to digital form, and time tagged to identify the occurrence of a return signal. The identified time is then converted to a range. Subsequent targets along the optical path are identified in range by their relative difference in time. This description of lidar acquisition is often summarized by such terms as full waveform, Geiger mode, or photon counting. An extension of these acquisition techniques is found in 3-D or flash lidars. These systems can suffer in their range resolving capability by their system's bandwidth (involving the convolution of the laser pulse length with the detector and electronics time response). These design factors translate to limits in ranging closely spaced targets along the optical path (for example, water surface and bottom in shallow waters; objects submerged just below the water surface; objects located behind glass) with typical values on the order of tens of centimeters for the most expensive and sophisticated systems to a meter or more for more conventional systems.

There is a need in the art to improve the precision and other aspects of bathymetry lidar systems.

SUMMARY

Accordingly, the invention is directed to methods and systems for remote measurement of shallow depths in semi-transparent media that substantially obviate one or more of the problems due to limitations and disadvantages of the prior art.

An advantage of the invention is to provide enhanced range resolution and precise measurement in shallow water depth measurement and water floor topography mapping.

Further, the invention has capabilities and applications in semi-transparent media thickness measurement and surface topography characterization.

Another advantage is to allow distance sampling with no physical contact with the media.

Yet another advantage is providing a low cost, accurate, self-calibrating, and scalable solution with a differential measurement requiring no knowledge of the lidar system's platform vertical position.

Still another advantage of the invention is to provide a method and system for navigation of autonomous vehicles.

Yet another advantage of the invention is to provide a method and system for navigation through a semi-transparent media.

Another advantage of the invention is to provide enhanced range resolution and precise measurement in shallow water depth measurement and water floor topography mapping. Further, the invention has capabilities and applications in semi-transparent media thickness measurement and surface roughness characterization.

Another advantage is to allow distance sampling with no physical contact with the media.

Yet another advantage is providing a low cost, accurate, self-calibrating, and scalable solution with a differential measurement to determine depth requiring no knowledge of the lidar system's platform vertical position.

Another advantage is to provide optical properties of a semitransparent liquid by performing reflect transmissometer measurements.

Further yet another advantage is providing a sub-pulse width resolution technique using a lidar system for detecting and characterizing "soft targets" whose optical density becomes sufficiently large to produce multiple scattering effects in the media. For example, measuring water quality as characterized by a level of turbidity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a lidar system includes a system adapted to measure elevations including a lidar system configured with computational equipment configured for determining an elapsed time between two portions of received light from a laser pulse, based on a difference between properties of portions of the received light, and a relative distance based on the elapsed time, wherein the elapsed time is less than a duration of the laser pulse, or within a system's dead time. The system also includes a time interval meter configured to determine a time of flight based on a time that the laser pulse is generated to when a reflection of the laser pulse are received. The system further includes one or more control electronics configured to measure topographic elevations using the time of flight.

In one embodiment, a lidar system includes a machine implemented method for reducing loss of data caused by blind zones in a laser scanning apparatus. The method includes dynamically monitoring a time of flight (TOF) of laser light pulse transmitted and received by the laser scanning apparatus, wherein the laser scanner apparatus comprises computational equipment configured to determine an elapsed time between two portions of received light from a laser pulse reflected from one or more surfaces, based on a difference between properties of portions of the received light, and a relative distance based on the elapsed time, wherein the elapsed time is less than a duration of the laser pulse, or within a system's dead time. The method further includes determining whether a potential collision of an outgoing laser light pulse and an incoming signal is likely to occur. In addition, the method includes adjusting a laser pulse repetition frequency (PRF) of the laser pulse in response to a determination that the potential collision of the laser pulse and the incoming signal is likely to occur.

In one embodiment, a machine implemented method for maintaining a constant swath width using a laser scanning apparatus or a 3-D flash capability includes determining an elapsed time between two portions of received light from a laser pulse, based on a difference between properties of portions of the received light, and a relative distance based on the elapsed time, wherein the elapsed time is less than a duration of the laser pulse or a system's dead time. The method also can include dynamically adjusting scanner parameters to keep a spot density relatively constant as at least one of an aircraft flying height and ground terrain elevation changes during a survey mission.

In one embodiment, a method of retrofitting an existing lidar system to achieve a retrofitted lidar system with improved resolution includes retrofitting an existing lidar system with one or more components. The retrofitted lidar system is configured to determine, with computational equipment, an elapsed time between two portions of received light from a laser pulse, based on a difference between properties of portions of the received light, and a relative distance based on the elapsed time, wherein the elapsed time is less than a duration of the laser pulse or the system's dead time.

In one embodiment, a method of mapping a surface topography includes generating a pulse of polarized light and scattering at least some portion of the pulse of polarized light onto one or more surfaces. The scattered light is received from the surfaces as one or more received pulses and the received pulses have one or more portions that overlap in an ambiguous intrapulse overlap portion. The method includes splitting and separating the received surface pulses and the received second surface pulse scattered light into a first component and a second component, the first component and the second component having a relative difference in polarization between each other, wherein the separation removes the ambiguous intrapulse overlap. Next, determining an amount of time elapsed between the first component and the second component and calculating a relative distance between the first surface and the second surface based on the amount of time elapsed, thereby achieving a sub-pulse width resolution.

In one embodiment, a lidar system includes a transmitter configured to output a pulse of polarized light to a medium; the transmitter includes a laser and a polarizer in optical communication with the laser. The lidar system further includes a receiver configured to collect multiple scattered lights from the medium; the multiple scattered lights include received pulses having varying angular spread or depolarization. The lidar system further includes a first detector; the first detector comprising a sensor array of light sensors. The lidar system further includes a second detector; the second detector comprising a second sensors array of light sensors; the first detector and the second detector are each configured to receive at least a respective component of the multiple scattered lights from the receiver; and the light sensors of the first sensors array and the second sensors array are each configured to receive a respective portion of the received pulses. The lidar system further includes timing electronics coupled to each of the first detector and the second detector; an output of the timing electronics comprises a value indicative of a relative distance based on an amount of time elapsed between inner portions of the received pulses of the multiple scattered lights, thereby achieving a sub-pulse width resolution; optionally the value is based on an optical separation of respective component portions of the multiple scattered lights.

In one embodiment, the transmitter further includes a half-wave plate in optical communication with the laser. In another aspect, the transmitter further includes a prism in optical communication with the laser. In another aspect, the laser includes at least one of a polarized laser, pulsed laser, and a continuous wave (CW) laser. In another aspect, the polarized light includes a known polarization. In another aspect, the polarized light includes circular polarization. In another aspect, the receiver includes a telescope. In another aspect, the receiver further includes a spectral filter. In another aspect, the lidar system further includes a polarizing splitter; the first detector and the second detector are in optical communication with the polarizing splitter. In another aspect, the respective component of the received pulses of the multiple scattered lights comprises a cross-planar polarization component and a co-planar polarization component. In another aspect, the first detector is calibrated to receive substantially the cross-planar component and the second detector is calibrated to receive substantially the co-planar component. In another aspect, the first detector and the second detector are each calibrated to the respective portion of the multiple scattered lights.

In another embodiment, a lidar system includes a source of polarized light configured to output a pulse of polarized light and a light receiver configured to receive multiple scattered lights comprising received pulses having varying angular spread or depolarization; the light receiver comprising a polarizing beam splitter; the polarizing beam splitter is configured to split the received pulses into cross-planar polarization components and a co-planar polarization components. The lidar system further includes a first detector including a sensor array of light sensors; the first detector is configured to receive the cross-planar polarization components; and the light sensors of the sensors array are each configured to receive a respective component of the cross-planar polarization components. The lidar system further includes a second detector including a second sensor array of light sensors; the second detector is configured to receive the co-planar polarization component; and the light sensors of the second sensors array are each configured to receive a respective component of the co-planar polarization component. The lidar system further includes timing electronics coupled in electrical communication with the first detector and the second detector configured to output a value indicative of a relative distance based on an amount of time elapsed between inner portions of the received pulses of the multiple scattered lights, thereby achieving a sub-pulse width resolution.

In one embodiment, the source of polarized light includes a laser, a half-wave plate, and a polarizer. In another aspect, the laser is selected from the group consisting of a polarized laser, pulsed laser, and continuous wave (CW) laser. In another aspect, the first detector and the second detector each includes a photomultiplier tube, the photomultiplier tube counts photons in the cross-planar polarization component and the co-planar polarization component, respectively.

One embodiment is directed towards a method of determining characteristics of at least two surfaces. The method includes transmitting a pulse of polarized energy to at least two surfaces and receiving reflected energy from the surfaces received over a period of time after a transmission of the energy. The system further senses information indicative of one or more properties of two or more portions of received reflected energy. The properties of each of the portions of the received reflected energy includes one or more of (a) an orientation of the portion, (b) an angular spread of the portion, (c) a degree of polarization of the portion, (d) an azimuthal polarization pattern of the portion, (e) a high order scattering profile of the portion, and (f) a range of a respective property being one of the properties (a) to (e). The method also includes determining with computational equipment one or more elapsed time among the two or more portions of the received reflected energy, based on one or more differences among the properties of the portions where the elapsed time is less than a duration of the pulse of polarized energy.

Another embodiment is directed towards a method of imaging and profiling the skin of a patient. The method includes transmitting a pulse of polarized light to the skin of the patient and receiving a collection of light where the collection of light includes light reflected from the skin surface and subcutaneous layers of the patient over a period of time after a transmission of the pulse. The method also includes sensing information indicative of one or more properties of two or more portions of received light in the collection. The properties of each of the portions of the received light include one or more of: (a) an orientation of the portion, (b) an angular spread of the portion, (c) a degree of polarization of the portion, (d) an azimuthal polarization pattern of the portion, (e) a high order scattering profile of the portion, and (f) a range of a respective property being one of the properties (a) to (e). The method also includes determining with computational equipment characteristics of the skin, e.g., pathology normal, cancerous, precancerous and the like, based on one or more differences among the properties of the portions, wherein the elapsed time is less than a duration of the pulse.

Still yet another embodiment is directed towards a navigation system. The navigation system is configured to assist with vehicle operation or provide autonomous vehicle operation. The navigation system includes a light transmitter configured to transmit a pulse of polarized light to at least two surfaces within a transmission path of the pulse, a light receiver configured to receive a collection of light. The collection includes light from the surfaces received over a period of time after a transmission of the pulse by the light transmitter and a sensor system configured for sensing information indicative of one or more properties of two portions of received light in the collection. The properties of each of the portions of the received light includes one or more of: (a) an orientation of the portion, (b) an angular spread of the portion, (c) a degree of polarization of the portion, (d) an azimuthal polarization pattern of the portion, (e) a high order scattering profile of the portion, and (f) a range of a respective property being one of the properties (a) to (e). The system also includes computational equipment configured for determining an elapsed time between the two portions of the received light, based on a difference between the properties of the portions, and a relative distance based on the elapsed time, wherein the elapsed time is less than a duration of the pulse.

The present disclosure can provide a number of advantages depending on the particular aspect, embodiment, and/or configuration. These and other advantages will be apparent from the disclosure. Additional features and advantages may be learned by the practice of the invention.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 13D illustrates aspects of the experimental setup of example 5;

FIG. 13E illustrates aspects of the experimental setup of example 5;

FIG. 13F illustrates an experimental setup of example 5;

FIG. 14A illustrates an experimental setup of example 6;

FIG. 14B illustrates an experimental setup of example 6;

Figure 1:
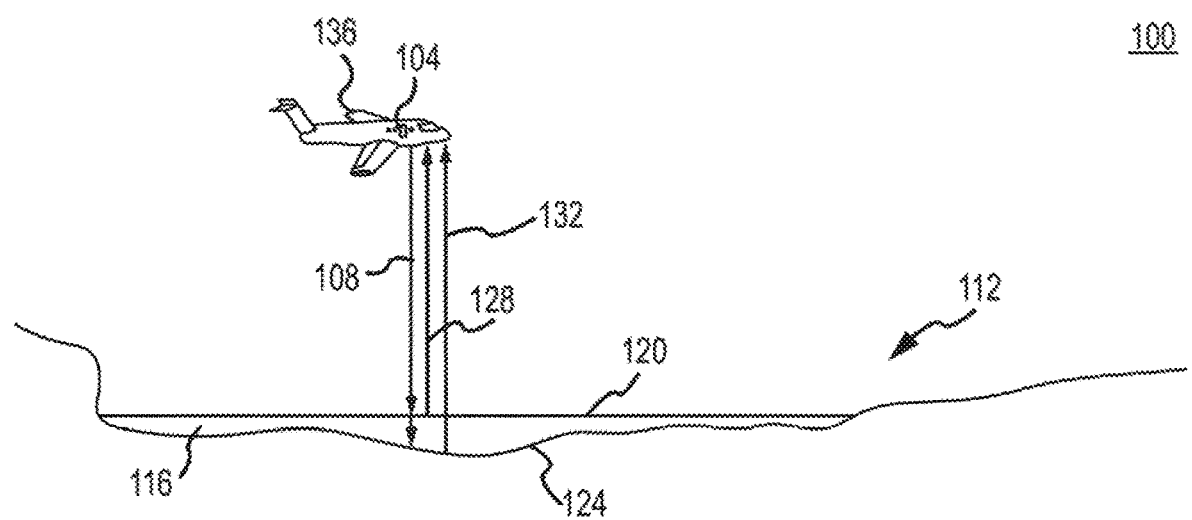
FIG. 1 illustrates a lidar system in accordance with embodiments of the present invention, in an exemplary operating environment.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION OF THE ILLUSTRATED EMBODIMENTS

The present disclosure can provide a number of advantages depending on the particular aspect, embodiment, and/or configuration. These and other advantages will be apparent from the disclosure.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "module," as used herein, refers to any known or later developed hardware, software, firmware, artificial intelligence, fuzzy logic, or combination of hardware and software that is capable of performing the functionality associated with that element.

The terms "determine," "calculate," and "compute," and variations thereof, as used herein, are used interchangeably and include any type of methodology, process, mathematical operation or technique.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

As used herein, "comprising," "including," "containing," "is," "are," "characterized by," and grammatical equivalents thereof are inclusive or open-ended terms that do not exclude additional unrecited elements or method steps unless explicitly stated otherwise.

The term "resolution" relates to a degree of discernibility or distinguishability between two objects or events (e.g., light pulses).

The term "intrapulse" relates to events occurring within a single pulse length, also referred to as sub-pulse.

The term "interpulse" refers to the relation between two or more pulses that could be overlapping or separate in time.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible, utilizing, alone or in combination, one or more of the features set forth above or described in detail below.

In order to more fully appreciate the present disclosure and to provide additional related features, the following references are incorporated herein by reference in their entirety:

(1) U.S. Pat. No. 4,967,270 by Ulich, et al., which discloses an improved imaging light detection and ranging (lidar) system which provides variable time delay range gating across a selected image. Variable time delay range gating across an image is accomplished using a plurality of imaging cameras which are individually triggered after preselected delays to obtain multiple subimages. These multiple subimages are then put together in a mosaic in a computer to provide a complete image of a target plane using only one light pulse.

(2) U.S. Pat. No. 6,928,194 by Mai, et al., which discloses a system for mosaicing multiple input images, captured by one or more remote sensors, into a seamless mosaic of an area of interest. Each set of input images captured by the remote sensors within a capture interval are ortho-rectified and mosaiced together into a composite image. Successive composite images, along a given flight path, are then mosaiced together to form a strip. Adjacent strips are then mosaiced together to form a final image of the area of interest.

(3) U.S. Pat. No. 7,127,348 by Smitherman, et al., which discloses, a vehicle based data collection and processing system which may be used to collect various types of data from an aircraft in flight or from other moving vehicles, such as an automobile, a satellite, a train, etc. In various embodiments the system may include: computer console units for controlling vehicle and system operations, global positioning systems communicatively connected to the one or more computer consoles, camera array assemblies for producing an image of a target viewed through an aperture communicatively connected to the one or more computer consoles, attitude measurement units communicatively connected to the one or more computer consoles and the one or more camera array assemblies, and a mosaicing module housed within the one or more computer consoles for gathering raw data from the global positioning system, the attitude measurement unit, and the retinal camera array assembly, and processing the raw data into orthorectified images.

(4) U.S. Pat. No. 7,580,127 by Mayor, et al., which discloses a polarization lidar system capable of remotely identifying characteristics of atmospheric aerosol particles by transmitting a polarized beam of light and analyzing polarization characteristics of received backscatter is disclosed. The transmitter features high pulse energy to remotely identify aerosol particles with substantially one pulse. The transmitter employs a thin film plate polarizer and a Raman wavelength shifter to achieve eye-safe, single-plane linearly polarized energy. The transmit beam and receiver field of view are coaxial. The receiver employs a telescope, a collimating lens, and a beam splitter. The beam splitter splits the received backscatter into a single-plane polarized beam whose polarization plane is parallel to the plane of transmission and a single-plane polarized beam whose polarization plane is perpendicular to the plane of transmission. Each split beam is directed through separate focusing lenses onto separate detectors. The detector signals are amplified and processed to remotely determine atmospheric aerosol particle characteristics.

(5) U.S. Pat. No. 7,725,258 by Smitherman, which discloses a vehicle based data collection and processing system which may be used to collect various types of data from an aircraft in flight or from other moving vehicles, such as an automobile, a satellite, a train, etc. In various embodiments the system may include: computer console units for controlling vehicle and system operations, global positioning systems communicatively connected to the one or more computer consoles, camera array assemblies for producing an image of a target viewed through an aperture communicatively connected to the one or more computer consoles, attitude measurement units communicatively connected to the one or more computer consoles and the one or more camera array assemblies, and a mosaicing module housed within the one or more computer consoles for gathering raw data from the global positioning system, the altitude measurement unit, and the retinal camera array assembly, and processing the raw data into orthorectified images.

(6) U.S. Pat. No. 7,893,957 by Peters, III, et al., which discloses a camera system having a compound array of imaging sensors disposed in a retinal configuration. The system preferably comprises a concave housing. A first imaging sensor is centrally disposed along the housing. At least one secondary imaging sensor is disposed along the housing, adjacent to the first imaging sensor. The focal axis of the second imaging sensor, in the preferred embodiment, intersects with the focal axis of the first imaging sensor within an intersection area.

(7) U.S. Pat. No. 7,899,311 by Kearney, et al., which discloses a camera system having a rigid camera frame to receive a removable shutter and serve as a releasable attachment point for the camera lens system and image receiving means. An adaptor and wedge have complementary contact points that allow constant alignment and orientation of the system components after removal and reattachment without recalibration or realignment. The camera system may be used in a photographic imaging system such as an airborne reconnaissance system.

(8) U.S. Patent Application Publication No. 2006/0231771 by Lee, et al., which discloses a system for detecting airborne agents. The system can include a laser source that provides laser pulses of at least two wavelengths, a transmitter that transmits the laser pulses, and a coupling mechanism configured to remotely couple the laser pulses between the laser source and the transmitter. The system can include a receiver that receives both elastically backscattered signals from airborne agents and fluorescence signals from the airborne agents. The system can include a telescope that both transmits a collimated laser beam of the laser pulse from the transmitter to a far field and receives the elastically backscattered signals and the fluorescence signals from the far field. The system can include a detection system having at least one of a backscatter optical detector that detects the elastically backscattered signals and one or more fluorescence optical detectors that detect the fluorescence signals in selected spectral band(s) from the airborne agents.

(9) U.S. Patent Application Publication No. 2008/0137058 by Cesare, which discloses monostatic LIDARs use the same telescope to send the laser beam in atmosphere and to collect the backscattered echo. An important element of monostatic LIDARs is the optical separator between the emission and reception paths of the laser beam. By using a system made by a Faraday rotator in combination with two polarizing beam splitters suitably oriented, it is possible to achieve this separation with minimum losses with respect to prior systems using semi-reflective plates and/or polarizing beam splitters in conjunction with quarter-wave plates. The effectiveness of this system does not rely on the maintenance of the polarization status of the laser beam when backscattered by the atmosphere molecules and particles, or on the reduction of the received laser power relatively to the transmitted one. The system is simple, compact, and can work at several wavelengths of the laser source.

(10) U.S. Patent Application Publication No. 2010/0025589 by Olcott, et al., which discloses methods and systems for processing an analog signal that is generated by a high energy photon detector in response to a high energy photon interaction. A digital edge is generated representing the time of the interaction along a first path, and the energy of the interaction is encoded as a delay from the digital edge along a second path. The generated digital edge and the delay encode the time and energy of the analog signal using pulse width modulation.

(11) U.S. Patent Application Publication No. 2016/0259058 by Verheggen, et al., which discloses an apparatus and method of using a laser to scan the ground or a target from an airborne or ground-based platform. In certain embodiments, the apparatus and method produces a 3-D elevation model of the terrain. In some embodiments, the apparatus includes a pulsed laser, a receiver to detect and amplify the pulse after being reflected by objects on the ground (or the ground itself), and electronics which measures the time of flight of the optical pulse from which the slant range to the target is calculated. Technical advantages of the disclosed embodiments include avoiding blind zones to ensure that no laser shots are wasted. In certain embodiments for airborne applications, the apparatus may also be configured to maintain a constant swath width or constant spot spacing independent of aircraft altitude or ground terrain elevation.

Embodiments herein presented are not exhaustive, and further embodiments may be now known or later derived by one skilled in the art.

One embodiment is directed towards a lidar system. A lidar system is configured to measure the distance or other properties of a target surface by illuminating the target surface with light. In one embodiment, the lidar system of the present invention is configured to measure shallow depths of semi-transparent media. Media includes a first surface and a second surface and the body of the media in-between the first and second surfaces. In a vertical orientation, the first and second surfaces of the media may be the top and bottom surfaces, respectively. Light transmitted is partially scattered from and partially refracted into the top surface of semi-transparent media. The bottom surface may include a relatively opaque or polarization-altering media or a second semi-transparent media. The top surface and the body of semi-transparent media include but are not limited to media such as water or glass. The bottom surface that is relatively opaque or polarization-altering includes but is not limited to media such as ice, sand, rock, wall, skin, hypodermis, cells, other anatomical regions, and/or combinations of the same.

In one embodiment, the lidar system includes a transmitter configured to output polarized light to a target, a receiver configured to collect scattered light from the target, and first and second detectors. The first and second detectors are configured to receive at least a respective portion of the scattered light from the receiver. The first and second detectors may be configured to detect the respective portions of the scattered light and substantially the same time or with some offset. The system also includes timing electronics coupled to each of the first and second detectors.

The transmitter used in the invention may include transmitters that generate and transmit a light with a known polarization. The transmitter may include a laser and a polarizer in optical communication with the laser. The transmitter may further include a half-wave plate in optical communication with the laser. The laser may include at least one of a polarized laser, a pulsed laser, or a continuous wave (CW) laser. In one specific example, a transmitter includes a Teem Photonics 35 mW laser with a 450 ps pulse width with optics that generates and transmits linearly polarized light with degree of polarization greater than 99.9%.

The receiver may include one or more receivers that can receive scattered light. The receiver may include a telescope. The receiver may optionally include one or more components for filtering processes (i.e. a spectral filter) and may further include a polarizing splitter. In one specific example, a receiver includes an Orion Maksutov-Cassegrain telescope with a 90 mm aperture and a 1250 mm effective focal length.

The first and second detectors include detectors that can detect and count photons in a light signal. The detectors may include photomultiplier tubes that output a photon count signal. Other detectors that may operate in photon counting or analog mode include avalanche photodiodes, charge coupled devices, or other photon detectors. In one specific example, the detectors include Hamamatsu H7422PA-40 photomultiplier tubes with a 2.5 ns pulse width.

Timing electronics includes electronics that can calculate a relative distance based on an amount of time elapsed between light signals. Timing electronics may include a constant fraction discriminator (CFD) to discriminate an apex in a photon count signal, a time-to-digital converter (TDC), and a processor. In one specific example, timing electronics include a SensL CFD with an 8 ns output pulse width and a SensL HRM Time TDC with a 27 ps bin width and a 190 ns dead time.

In another embodiment, a lidar system includes a light transmitter configured to transmit a light signal, a light receiver configured to receive a scattered light signal, the scattered light signal includes first and second components, and a detector configured to resolve the first and second components of the scattered light signal.

A light signal includes electromagnetic radiation carrying information. Information includes distinguishing attributes of the light signal such as the amplitude, frequency, phase, polarization, other attributes, and/or combinations of the same. The light signal may be coded by natural (i.e., light containing a polarization signature of the target scattered from a linearly polarized incident light) or artificial means (i.e., coding embedded by electronics when a light is generated). In addition, the polarization may be any type of polarization (e.g., linearly, vertical, horizontal, and/or circular). A light signal may be any type of signal (e.g., pulsed or continuous wave (CW) laser, lamp, LED light, and/or other light sources or combinations of the same). Pulsed light signals may have demarcations in the null signal between the pulses; CW light signals may have demarcations where the wave changes modulation, phase, and/or other attributes. A light signal may include component signals with varying attributes occupying at least a portion of substantially the same and/or indistinguishable time and/or space as the light signal.

The scattered light signal includes the specular and diffuse light scattered from the targeted medium. A scattered light signal includes a directed light signal changing direction as a result of the directed light signal hitting a surface. The surface could include polarization preserving or polarization-altering surfaces. The scattered light signal may have a different intensity, frequency, phase, polarization, other attributes, and/or combinations of the same, due to the characteristics of the directed light signal interacting with the surface. Further, when the directed light signal hits a polarization-altering surface, the scattered light signal may scatter significantly to various polarizations and/or directions. A reflected light signal includes the specular light scattered from a target medium. A reflected light signal may further refer to the action of optical components within a transmitter and receiver of an instrument that directs a light signal from one element to another.

A component signal of a light signal includes at least some uniform distinguishing attribute such as amplitude, frequency, phase, polarization, other attributes, and/or combination of the same. In one specific example, the co-planar polarization and the cross-planar polarization of a light signal are two components of a light signal.

In yet another embodiment, a lidar system includes a source of polarized light and a light receiver, the light receiver configured to receive scattered light. The light receiver includes a polarizing beam splitter. The polarizing beam splitter splits the scattered light into a cross-planar polarization component and a co-planar polarization component. The lidar system further includes a first detector and a second detector. The first detector is configured to receive the cross-planar polarized component. The second detector is configured to receive the co-planar polarized component.

In still another embodiment, a method of measuring a relative distance between a first surface and a second surface with differing polarization characteristics. The method includes the steps of generating polarized light, scattering at least some of the polarized light from the first surface and at least some of the polarized light from the second surface, receiving the scattered light, and splitting the scattered light into a first and second component. The first and second component have a relative difference in polarization. The method further includes the steps of detecting the first and second component, determining an amount of time elapsed between the first and second component, and calculating a relative distance between the first surface and the second surface based on the amount of time elapsed.

In another embodiment, a lidar system includes a laser light source, an output of the laser light source is laser light. The lidar system further includes a polarizing beam splitter, the laser light is aligned with the transmission axis of the polarizing beam splitter, and an output of the polarizing beam splitter is linearly polarized light. The lidar system further includes a quarter-wave plate, the linearly polarized light transmitted by the polarizing beam splitter is received at the quarter-wave plate. In a first mode of operation, the fast or slow axis of the quarter-wave plate is oriented 45-degrees to the linearly polarized light output of the polarizing beam splitter, circularly polarized light is emitted by the quarter-wave plate. In a second mode of operation, the quarter-wave plate is oriented such that fast and slow axis of the quarter-wave plate are aligned with the linear polarized light output of the polarizing beam splitter, linearly polarized light is emitted by the quarter-wave plate. The lidar system further includes a detector. Light scattered by the polarizing beam splitter is received at the detector.

In yet another embodiment, a lidar system includes a source of light and a variable wave plate. In a first mode of operation, the variable wave plate is configured to output light polarized in a first direction, and in a second mode of operation, the variable wave plate is configured to output light polarized in a second direction relatively different than the first direction. The lidar system further includes a detector. The detector is configured to receive scattered light of the polarized light.

In still another embodiment, a method of measuring a relative distance between surfaces includes measuring a relative distance to a polarization preserving surface, which includes generating linearly polarized light at a first time, the generated light is vertically polarized, circularly polarizing the vertically polarized light in a first direction, and scattering at least some of the light circularly polarized in a first direction from the polarization preserving surface. The scattered light is circularly polarized in a second direction after being scattered by the polarization preserving surface. Measuring the relative distance between surfaces further includes linearly polarizing the scattered light, and passing the linearly polarized light to a detector. The light is received at the detector at a second time. Measuring the relative distance between surfaces further includes determining an amount of time elapsed between the first time and the second time to obtain a first time difference, and measuring a relative distance to a polarization-altering surface. Measuring a relative distance to the polarization-altering surface includes generating linearly polarized light at a third time, the generated light is vertically polarized, passing at least a first portion of the vertically polarized light through the polarization preserving surface to the polarization-altering surface, a second portion of the vertically polarized light is scattered by the polarization preserving surface as vertically polarized light, scattering the linearly polarized light passed through the polarization preserving surface from the polarization-altering surface, the linearly polarized light is altered after being scattered by the polarization-altering surface, passing a horizontally polarized component of the polarization-altered scattered light to a detector, the light is received at the detector at a fourth time, light scattered by the polarization preserving surface is not passed to the detector, determining an amount of time elapsed between the third time and the fourth time to obtain a second time difference, using the first and second time differences, and calculating a relative distance between the polarization preserving surface and the polarization-altering surface.

In another embodiment, a method of measuring relative distance between a first surface and a second surface with different polarization characteristics includes generating light, scattering the light respectively from the first surface and the second surface, receiving each of the scattered light from the first surface and the second surface, detecting the scattered light, and determining an amount of time elapsed between the light scattered from the first surface and the light scattered from the second surface.

In one embodiment, the lidar system can be configured for using in an underwater vehicle as part of or an input for a navigation system or method.

In one embodiment, the lidar system is utilized in a vehicle to provide real-time navigation. The navigation may include autonomous navigation for a vehicle, used as in an additional input to aid with manned navigation, and/or an additional input for autonomous navigation. The vehicle can include any type of vehicle, e.g., aircraft manned or unmanned, automobile, autonomous automobile, underwater vehicle in an underwater environment, e.g., ocean, lake, river, and the like.

The navigation system can include many different types of components of a lidar system. The navigation system may be part of or independent of a navigation system of an autonomous underwater vehicle (AUV) which is a robot that can operate in underwater and unstructured environments without continuous human guidance, submarine, an unmanned underwater vehicle (UUV) which is a classification vehicle that includes non-autonomous remotely operated underwater vehicles (ROVs), e.g., controlled and powered from the surface by an operator/pilot via an umbilical or using remote control and other vehicles, e.g., a submarine or device to aid an underwater scuba diver.

In one embodiment, the lidar is configured to provide navigation or object detection to assist with navigation and/or mapping of underwater features or objects or add in any of the foregoing, e.g., ocean floors, river beds, obstructions, and the like. It can also be used for other purposes, e.g., navigation for spacecraft, location of lost or sunken treasure, boats, or other objects, underwater mine detection, and the like.

In one embodiment, the lidar system includes a pulse of polarized light that is emitted through a semi-transparent media into aqueous environment. There is an aqueous/semi-transparent or underwater/semi-transparent media interface.

In one embodiment, the lidar system is configured to utilize multiple wavelengths in one system or multiple wavelengths in multiple systems, e.g., in the same pulse or different pulses of energy. In a preferred embodiment, the wavelength may be in a range from about 250 nm to about 10 µm. The selection of specific wavelength or multiple wavelengths is based on the application or the surfaces to be measured.

In one embodiment, the lidar system is integrated with or into a navigation system, the navigation system includes one or more of a global positioning system (GPS), an inertial measurement unit (IMU), a radar unit, a laser rangefinder unit, a camera unit, a sonar unit, a power unit, a data storage unit, e.g., networked attached storage unit, a hard disk, a solid state drive (SSD) and the like. The navigation system is configured to communicate with other internal or external components. The lidar system is configured to provide more accurate navigation along with other benefits described herein.

The GPS may be any sensor configured to estimate a geographic location of the vehicle. To this end, GPS may include a transceiver operable to provide information regarding the position of the vehicle with respect to the earth. The IMU unit can include any combination of sensors (e.g., accelerometers and gyroscopes) configured to sense position and orientation changes of the vehicle based on inertial acceleration.

The radar system is configured to use radio signals to sense objects within the local environment of the vehicle. The sonar system is configured to use soundwaves to sense objects within the water. The lidar, radar, sonar, and/or GPS may additionally be configured to sense the speed and/or heading of the objects.

In one embodiment, the lidar system either independent or as a component of a navigation system is configured to be used with or in an underwater vehicle described with reference to U.S. Pat. No. 9,090,320, which is hereby incorporated by reference as if fully set forth herein.

In one embodiment, the lidar system may be any sensor configured to sense objects in the environment in which the underwater vehicle is located using one or more pulse of polarized light. Depending upon the embodiment, the lidar system can include one or more laser sources, a laser scanner, and one or more detectors, among other system components. The lidar system can be configured to operate in a coherent (e.g., using heterodyne detection) or an incoherent detection mode.

In one embodiment, the interface at the semi-transparent media and underwater is configured to remove or reduce any obscurance. In a preferred embodiment, the vehicle is configured with an object to create a laminar flow of water at or near the interface (semi-transparent media/liquid) and/or with a material to aid in creating laminar flow of liquid at or near the interface, e.g., coating.

In one embodiment, the navigation system includes as a component a lidar system configured for three-dimensional mapper of an object, e.g., underwater mapping of an object or surface, planetary or asteroid surfaces and the like. The system is configured to provide resolution in the range from about 60 meters or more with a few [cm] resolution. In a preferred embodiment, the range is from 30 m with a few [cm] resolution.

In one embodiment, the lidar system is configured with an object identification module, e.g., allowing the system to predict a type of an object based on characterization of rough or smooth surface properties.

In one embodiment, the lidar system is configured with an auto-correction module that provides different adjustments to the system as a function of index of refraction due to one or more of temperature, salinity, depth, and pressure.

In one embodiment, the lidar system comprises a duty cycle power module that allows the system to operate in different power modes, off, low, medium, and high to preserve battery and increase operation time. This duty cycle power module is configured to regulate power to all system subcomponents. For example, the duty cycle power module can be configured to utilize different processing times for the lidar system and operation times of the lidar system, e.g., operations may be set in range from about every 5 minutes to about every day, week, month, or more. This is especially useful for remote or satellite lidar system in order to conserve energy or operate when solar energy units are at their maximum. In one embodiment, the vehicle includes a transmitter configured to output a pulse of polarized light to a target, a receiver configured to collect scattered light from the target, one or more detectors configured to receive at least a respective portion of the scattered light from the receiver, and timing electronics coupled to each of the one or more detectors.

In one embodiment, the vehicle includes a light transmitter configured to transmit a light signal, a light receiver configured to receive a scattered light signal, the scattered light signal includes a first component and a second component, and a detector configured to resolve the first and second components of the scattered light signal to a sub-pulse width resolution.

In one embodiment, the vehicle includes a lidar system having a source of polarized light and a light receiver, the light receiver configured to receive scattered light. The light receiver includes a polarizing beam splitter, the polarizing beam splitter splits the scattered light into a cross-planar polarization component and a co-planar polarization component. The lidar system further includes a first detector, the first detector is configured to receive the cross-planar polarized component, and a second detector, the second detector is configured to receive the co-planar polarized component. Reference will now be made in detail to an embodiment of the present invention, examples of which are illustrated in the accompanying drawings.

FIG. 1 illustrates a lidar system 104 in accordance with embodiments of the present invention, in an exemplary operating environment 100. The lidar system 104 generates transmitted light 108 that is directed towards a target 112. The target 112 may comprise a body of water 116 having a top surface 120 and a floor 124. In a first mode of operation, light 128 scattered from the surface 120 of the target 112 is received by the lidar system 104. The time elapsed between the generation of a pulse of light 108 scattered from the surface 120 of the target 112 and returned to the lidar system 104 as a scattered signal 128 is used to determine a relative distance between the surface 120 of the target 112 and the lidar system 104. In a second mode of operation, the time elapsed between the generation of a pulse of transmitted light 108 and a signal 132 scattered from the floor 124 of the target 112 is used to determine the relative distance between the lidar system 104 and the floor 124 of the target 112. By taking the difference between the distance to the surface 120 and the distance to the floor 124, the relative distance between the surface 120 and the floor 124 can be determined. Accordingly, the relative depth of the water 116 can be determined. In the example of FIG. 1, the lidar system 104 is associated with a platform 136 comprising an airplane. However, a lidar system 104 in accordance with embodiments of the present invention may be associated with different platforms 136. Examples of suitable platforms 136, in addition to an airplane, include satellites, unmanned aerial vehicles, helicopters, balloons, boats, or other platforms. In addition, a lidar system 104 in accordance with embodiments of the present invention is not limited to shallow water bathymetry. For example, the lidar system 104 can be used for bottom surface mapping, or for determining the distance between any polarization preserving surface that is at least partially transmissive of light 108, and a polarization-altering surface behind the polarization preserving surface, particularly in the instance where the separation distance would be otherwise unresolvable due to system bandwidth limitations associated with laser and/or detector pulse widths. The polarization-altering surface includes but is not limited to media such as ice, sand, rock, wall, skin, hypodermis, cell, other anatomical regions, and combinations of the same.

Figure 2A:
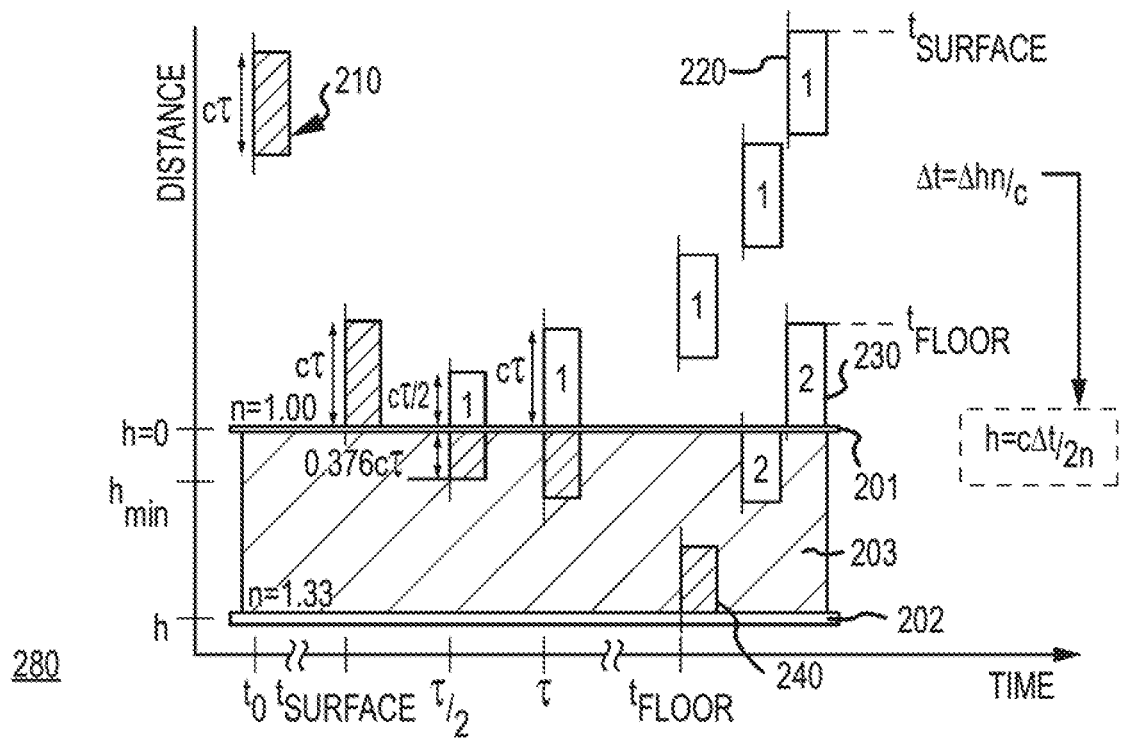
FIG. 2A and FIG. 2B illustrate detection of scattered light pulse over time for a system with pulse width resolution.
Figure 2B:
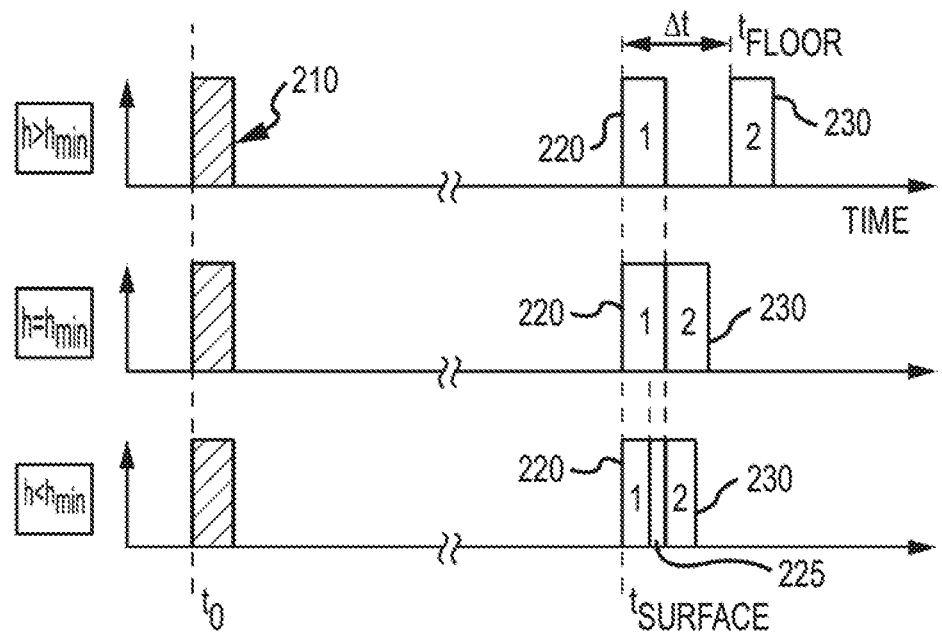

FIG. 2A and FIG. 2B illustrate detection of scattered light pulse over time for a system with pulse width resolution.

FIG. 2A depicts an exemplary shallow water environment 280 with shallow water body 203 having water surface 201 and water floor 202. The y-axis represents the distance of a vertical cross-section of shallow water environment 280. The x-axis represents time. The level of water surface 201 is at distance h=0; the level of water floor 202 is at distance h. Water body 203 with a water medium has a refractive index of n=1.33. Air medium above water surface 201 has a refractive index of n=1.

Transmitted (Tx) pulse 210 is a light pulse having a length $c\tau$. At time $t_0$, Tx pulse 210 is generated by a lidar system such as lidar system 104 or by other light sources. In environment 280, Tx pulse 210 is being transmitted substantially normal to water surface 201. However, Tx pulse 210 may be transmitted at other angles as long as Tx pulse 210 can be at least partially scattered from and partially refracted through water surface 201.

At time $t_{surface}$, Tx pulse 210 arrives at water surface 201. As stated, Tx pulse 210 will be partially scattered off water surface 201, the scattered light pulse being received (Rx) pulse 220, and partially refracted through water surface 201 into water body 203, the refracted light pulse being refracted pulse 240. Thus, at time $\tau/2$, half of Tx pulse 210 has been scattered as Rx pulse 220 with length $c\tau/2$, and half of Tx pulse 210 has been refracted as refracted pulse 240 with length $0.376c\tau$ (due to the refraction index in water body 203). At time $\tau$, Tx pulse 210 has been fully either scattered as Rx pulse 220 or refracted as refracted pulse 240.

At time $t_{floor}$, refracted pulse 240 reaches water floor 202 and will be at least partially scattered as Rx pulse 230. Rx pulse 230, like refracted pulse 240, will have a comparatively shortened length when traveling in water body 203 because of the refractive index of water body 203 (n=1.33) as opposed to air (n=1). Rx pulse 230 will lengthen to length $c\tau$ when it exits the water surface 201.

Thus, when Rx pulse 230 exits water surface 201, the time difference between $t_{floor}$ and $t_{surface}$ can be derived from the time difference between Rx pulse 220 and Rx pulse 230. Further, the relationship between the time difference of $t_{floor}$ and $t_{surface}$ and the physical distance between water surface 201 (h=0) and water floor 202 (h) is given by $$h = \frac{c\Delta t}{2n} \quad (1)$$

Therefore, the depth of water body 203 can be determined.

FIG. 2B depicts timings diagrams for Rx pulses 220 and 230 for specific water depth scenarios. When the distance between water surface 201 and water floor 202 (h) is greater than a minimum depth of water (hmin) for which half of Rx pulse 220 has scattered from water surface 201 (h>hmin), a discernible gap exists between Rx pulses 220 and 230, and timing difference between Rx pulses 220 and 230 ($\Delta t$) is tfloor-tsurface. When the distance between water surface 201 and water floor 202 (h) is equal to hmin, Rx pulse 230 comes directly after Rx 220 with no discernible gap and no overlapped portions between Rx pulses 220 and 230. When the distance between water surface 201 and water floor 202 (h) is less than hmin (h<hmin), Rx pulse 230 comes before the entire portion of Rx pulse 220 has progressed, creating an ambiguous interpulse overlap 225.

Therefore, there is a limitation to the detection method as described in FIG. 2A and FIG. 2B. This limitation is that the scattered pulses Rx pulse 220 and Rx pulse 230 must be substantially separable. That is, Rx pulse 230 must not start to exit water surface 201 before Rx pulse 220 has been completely scattered from water floor 202. Effectively, this requirement requires a minimum depth of water (hmin) for which Rx pulse 230 cannot scatter from water floor 202 before half of Rx pulse 220 has scattered from water surface 201 at time $\tau/2$. In this embodiment, $h_{min}$ is $0.376c\tau$ (due to the refraction index in water body 203 as discussed previously) and depends on the length of Tx pulse 210.

When $h<h_{min}$, the two scattered pulses, Rx pulse 220 and 230, have an ambiguous interpulse overlap 225 that is not separable for resolving the time difference between $t_{floor}$ and $t_{surface}$ from Rx pulses 220 and 230. In practice, $h_{min}$ is limited by equipment limitations for generating and detecting light pulses with minimal length τ.

Figure 2C:
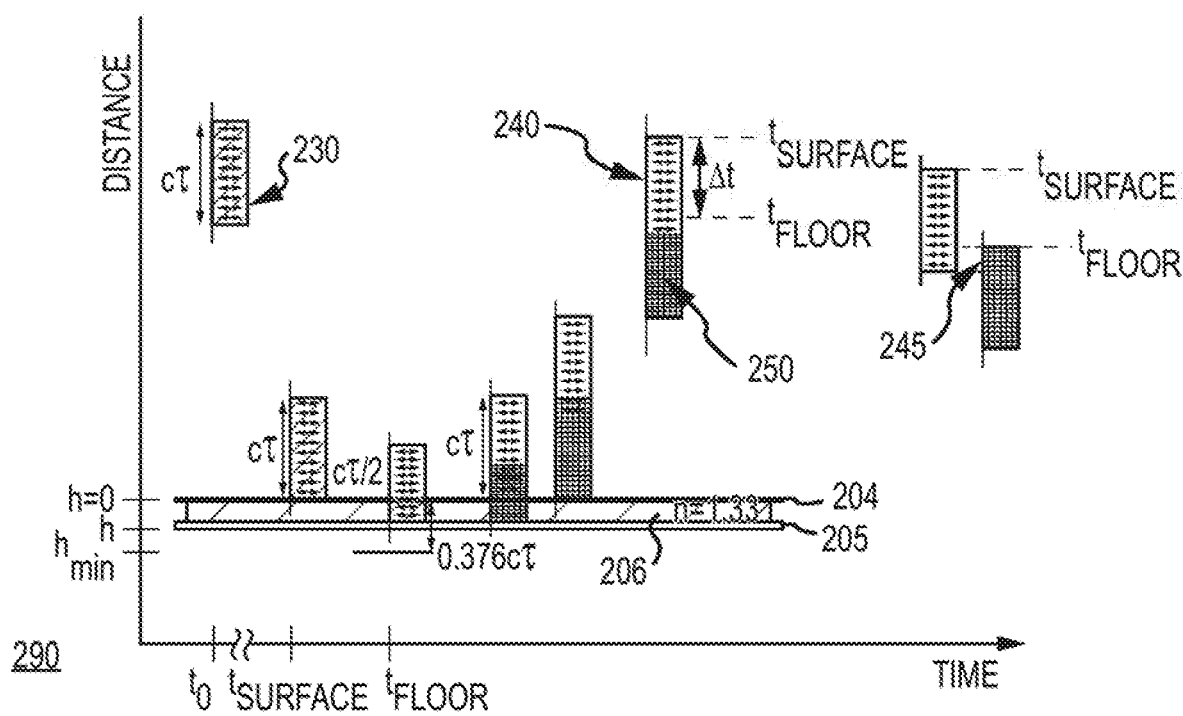
FIG. 2C and FIG. 2D illustrate detection of scattered light pulse over time for a system with sub-pulse width resolution in accordance with an embodiment of the present invention.
Figure 2D:
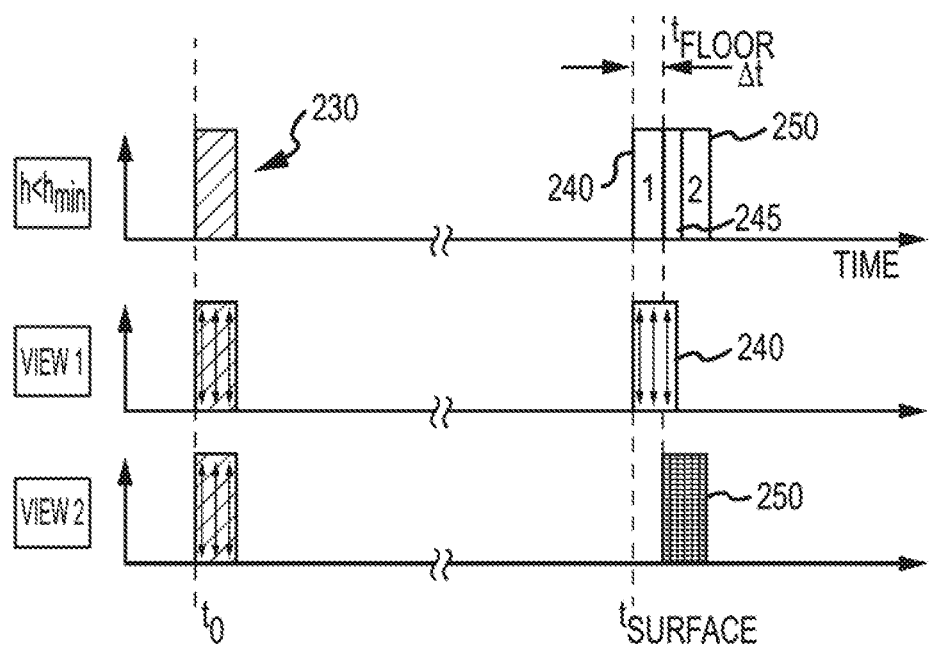

FIG. 2C and FIG. 2D illustrate detection of scattered light pulse over time for a system with intrapulse or sub-pulse width resolution in accordance with an embodiment of the present invention.

Referring to FIG. 2C, an exemplary shallow water environment is depicted as reference number 290. The environment 290 includes a shallow water body 206 having water surface 204 and water floor 205. The y-axis represents the distance of a vertical cross-section of shallow water environment 290. The x-axis represents time. The level of water surface 204 is at distance h=0, and the level of water floor is at distance h. The depth of water body 206 is at distance h, which is less than the minimum depth of water ($h_{min}$) for Tx pulse 230. Therefore, an Rx pulse 240 that is scattered from water surface 204 and an Rx pulse 250 that is scattered from water floor 205 includes an ambiguous interpulse overlap portion 245. Ambiguous interpulse overlap 245 is created similarly to ambiguous interpulse overlap 225 as described with respect to FIG. 2A and FIG. 2B.

In this embodiment, Tx pulse 230 is a light pulse having a known polarization. For example, Tx pulse 230 is polarized in the cross-planar direction to the propagation vector of Tx pulse 230, which is normal to water surface 204 when in direct nadir viewing. Tx pulse 230 can be polarized by a lidar system, such as lidar system 104, or by other polarizing light sources as known in the art. As Tx pulse 230 arrives at water surface 204 at time $t_{surface}$, Tx pulse 230 is partially scattered by water surface 204 as Rx pulse 240. Since water surface 204 is a polarization preserving surface, Rx pulse 240 keeps substantially the same polarization as Tx pulse 230. Tx pulse 230 is also partially refracted into water body 206. The refracted portion of Tx pulse 230 is scattered by water floor 205 at time $t_{floor}$. Water floor 205 is a polarization-altering surface and creates polarization scattering in the scattered light. Therefore, Rx pulse 250 will have a different polarization from Tx pulse 230 and Rx pulse 240 when scattered from water floor 205.

FIG. 2D depicts timings diagrams for Rx pulses 240 and 250 for water depth of $h<h_{min}$. Scattered pulses Rx pulse 240 and Rx pulse 250 will have an overlap 245 because of $h<h_{min}$. Referring to views 1 and 2, in this embodiment, the ambiguous interpulse overlap 245 can be removed and Rx pulses 240 and 250 can be separated as two distinct signals because Rx pulse 240 has only the cross-planar polarization being scattered from water surface 204, and Rx pulse 250 has a range of altered polarizations due to the backscattering from being scattered from water floor 205. This separation may be achieved by various mechanical (i.e., mechanically movable mirrors), optical (i.e., prisms or splitting polarizers), electronic means (i.e., photon counting detectors), and/or combination of the same.

While FIGS. 2A-2D were discussed with respect to one transmitted polarized light pulse according to an embodiment of the invention, other configurations can be used. For example, instead of pulsed light, continuous wave (CW) laser can also be used (i.e., where gaps between each "pulse" can be similarly obtained by modification of phase induced by scattering). Further, two or more transmitted light pulses with different polarizations can also be used in place of or in complement to the one cross-planar polarized light. For example, according to one embodiment of the invention as discussed with reference to FIG. 5, two light pulses can be transmitted each having a different polarization such that, after filtering, one pulse will gather signal only from the polarization preserving surface and one pulse will gather signal only from the polarization-altering surface. In this configuration, only one detector is required to count both light pulses. Still further, polarizations that are in alignment with the transmitted pulse (i.e., co-planar and cross-planar polarization) are preferred but are not required. Other polarization angles can be used and may be better suited for other applications (i.e., surfaces positioned at an angle or surfaces made up of other materials such as ice).

Figure 3:
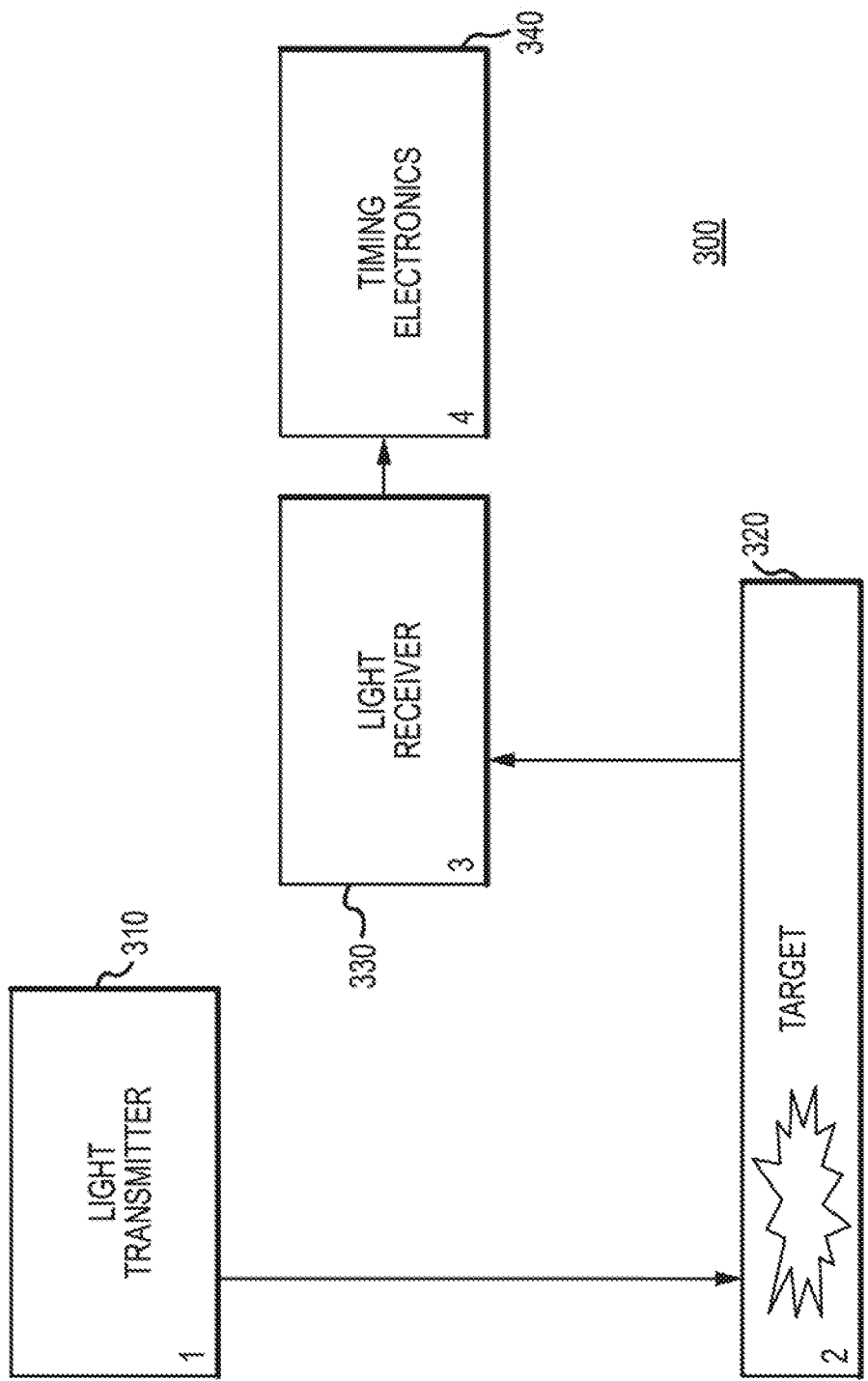
FIG. 3 illustrates a lidar system in accordance with an embodiment of the present invention.

FIG. 3 illustrates a lidar system according to an embodiment of the invention. Referring to FIG. 3, lidar system is generally depicted as reference number 300. The lidar system 300 includes a light transmitter 310, light receiver 330, and timing electronics 340. The light transmitter 310 is configured to generate and output at least one light signal (e.g., pulsed or continuous wave (CW) laser). In a preferred embodiment, the outputted light signal has a known polarization. Target 320 is a shallow water body or any other type of body with a respective relatively polarization preserving and semi-transparent surface (first surface) and a relatively polarization-altering (e.g., opaque and/or depolarization) surface (second surface). The outputted light signal from light transmitter 310 is configured to scatter from both the first and second surfaces. Light receiver 330 is configured to receive the scattered light signals from target 320 and separate the scattered light signals into their respective components. Timing electronics 340 is electrically coupled to light receiver 330 and is configured to calculate a relative distance based on an amount of time elapsed between light signals.

Figure 4:
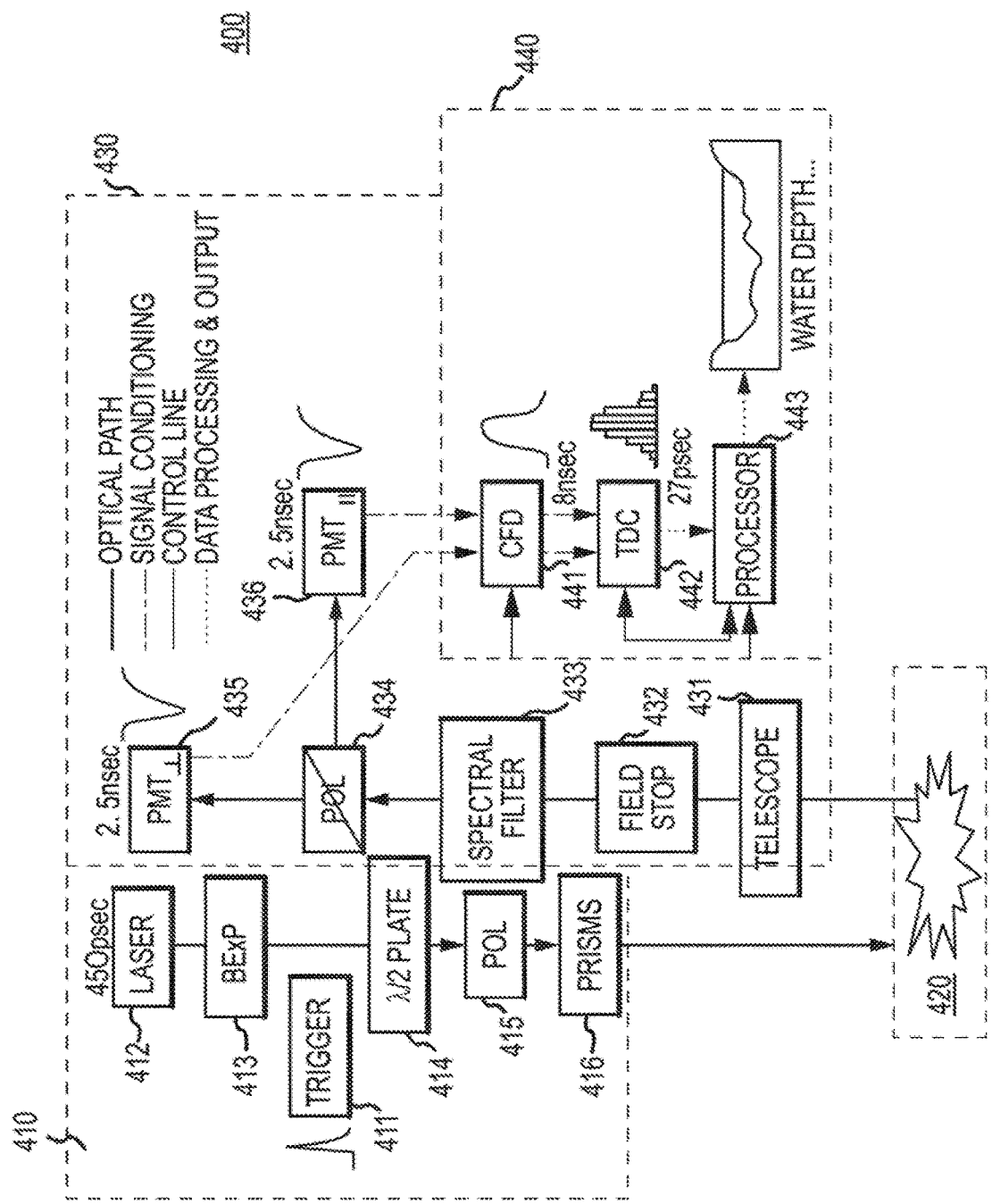
FIG. 4 depicts components of a lidar system in accordance with an embodiment of the present invention.

FIG. 4 illustrates components of a lidar system according to an embodiment of the invention.

Referring to FIG. 4, the lidar system 400 includes light transmitter 410, light receiver 430, and timing electronics 440. In this embodiment, the light transmitter 410 includes laser 412, beam expander 413, half-wave plate 414, polarizer 415, and prisms 416. Laser 412 acts as a light source for lidar system 400 and is configured to emit a focused light as the basis of the transmitted light signal. Laser 412 can be a pulsed laser, continuous wave (CW) laser, polarized laser, or other types of lasers. In other embodiments, laser 412 can generically include other light sources as known in the art (i.e., lamp or LED light). In one embodiment, a 450 ps pulsed laser is used as laser 412. Beam expander 413, half-wave plate 414, polarizer 415, and prisms 416 are optional and are configured to focus and align the transmitted light signal towards target 420. In this embodiment, the chain of beam expander 413, half-wave plate 414, polarizer 415, and prisms 416 are each aggregated and aligned to the optical path of the transmitted light signal. Beam expander 413 is configured to expand the transmitted light signal for tight spot targets. Half-wave plate 414 may be mechanically or electrically (i.e., using a liquid crystal variable retarder) operable to control the retardance of the focused light signal along the optical path. Polarizer 415 is configured to polarize the light signal with a known polarization. A polarizing laser may also be used as laser 412 for a known polarization. Prisms 416 are configured to coaxially direct and focus the transmitted light signal to target 420 as known in the art.

In operation, trigger 411 may be electrically coupled to laser 412 or other components of light transmitter 410 to start the transmission of the light signal. In other embodiments, light transmitter 410 may operate continuously without trigger 411. Light signal is transmitted from light transmitter 410 to target 420. Target 420 includes at least a first surface and a second surface as described herein. The transmitted light signal is partially scattered from the first surface as a first scattered light signal and partially refracted into the target. The refracted light is scattered from the second surface as a second scattered light.

The first scattered light signal has substantially the same polarization as the transmitted light signal while the second scattered light signal will have a different polarization due to the scattering from the second surface. The first and second scattered light signals may have an overlapped interpulse portion forming one combined scattered light signal.

Light receiver 430 includes telescope 431, field stop 432, spectral filter 433, splitting polarizer 434, first detector 435, and second detector 436. Each of these components are aggregated and aligned to an optical path of the scattered light signal. Telescope 431 acts to collect the scattered light signal. Field stop 432 and spectral filter 433 are optional components. Field stop 432 acts to limit the field of view of light receiver 430 where the scattered light signal would be gathered. Spectral filter 433 acts to further filter the received light to the light spectrum of interest (i.e., limiting the spectrum to the expected frequency of the scattered light signals).

Splitting polarizer 434 acts to separate the received scattered light signal according to the polarization. In this embodiment, the polarization splitter 434 is aligned with the optical path of the scattered light signal. As scattered light signal reaches polarization splitter 434, the cross-planar polarized component of the signal substantially passes through polarization splitter 434 while the co-planar polarized component of the signal substantially reflects. The angle of reflection is a function of the type of polarizer used (i.e. 90° angle or 62° angle for a Glan Taylor polarizer). Here, the first scattered light signal scattered from the water surface containing cross-planar polarized light is substantially reflected (i.e., at a 90° angle) while at least the co-planar polarization component of the second scattered light signal scattered from the water floor containing depolarized light is substantially transmitted. Other orientations are also possible depending on the polarization methodology used on the transmitted light signal and the type of polarizer used for polarization splitter 434.

Detector 435 is positioned at a 180° optical path from the reflected light signal and configured to detect the cross-planar polarization component of scattered light signal. Detector 436 is positioned at the optical path of the reflected light signal (i.e., 90°) and is configured to detect the co-planar component of the scattered light signal. As such detector 436 is configured to detect the first scattered signal from the water surface while detector 435 is configured to detect the second scattered signal from the water floor. Detectors 435 and 436 may be photomultiplier tubes and are configured to count the volume of photons in each signal within a certain time interval representing the strength of the signal and output a photon count signal. In one embodiment, detectors 435 and 436 have 2.5 ns resolution. Moreover, the detectors 435 and 436 can be configured to substantially simultaneously detect separated scattered signals from the polarizing beam splitter 434.

It is noted that polarizing beam splitter 434 can be positioned at a variety of angles to split the scattered light signal at other angles. Detectors 435 and 436 can be positioned at other configurations to receive such split components of the scattered light signal.

The timing electronics 440 may include a constant fraction discriminator (CFD) 441, time-to-digital converter (TDC) 442, and processor 443. Processor 443 is coupled to CFD 441 and TDC 442 through a control line for control and feedback of these components. CFD 441 is coupled to detectors 435 and 436 through a signal conditioning line and is configured to output an apex of the photon count signal at certain intervals representing the time at which the signal has meaningfully arrived. In one embodiment of the invention, CFD 441 has an 8 ns resolution. TDC 442 is coupled to CFD 441 and is configured to convert the time signal output by CFD 441 into a digital signal. In one embodiment of the invention, TDC 442 has a resolution of 27 ps.

Processor 443 is coupled to TDC 442 and is configured to take the digitized timing signal and determine the time of arrival of each component (co-planar and cross-planar polarized signals in one embodiment) and calculate the difference in the time of arrival of the two signals. In this embodiment, the processor 443 is further configured to transform the time difference into the depth between the polarization preserving and polarization-altering surfaces depending on the calibration of the lidar system 400 and the refraction index of shallow water body or other types of bodies in question. Further description of this calculation will be described with respect to FIG. 5.

Further, an initial calibration to lidar system 400 may be needed because the light paths to detectors 435 and 436 may not be the same after the scattered light is separated by polarizing splitting 434. According to one embodiment, this calibration can be accomplished by using a scattered signal from a surface that is depolarizing and noting a difference in the assessment of distance to that surface between the detectors 435 and 436. The difference in the assessment of distance is likely due to the slightly different optical paths between each of detectors 435 and 436 and polarizing splitter 434. In one embodiment, this calibration can be performed once and saved for adjustment by processor 443. The correction and adjustment can be applied to subsequent depth data by processor 443.

Figure 5:
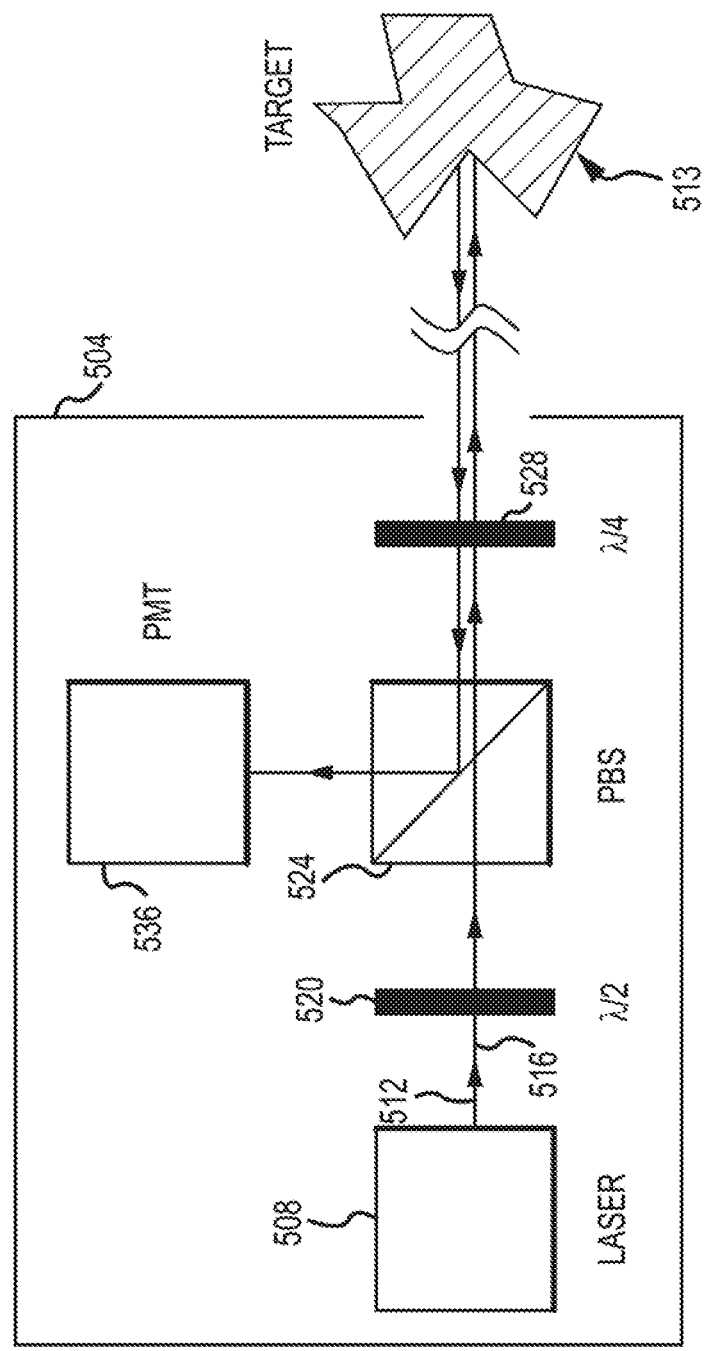
FIG. 5 depicts components of a lidar system in accordance with an embodiment of the present invention.

FIG. 5 illustrates components of a lidar system in accordance with embodiments of the present invention.

Referring to FIG. 5, the lidar system 504 includes an optical bench or other structure, to which other components may be directly or indirectly connected. These components include a light source (e.g., pulsed or CW laser) or laser 508. The laser 508 may be operated to generate linearly polarized light 512 that is transmitted along an optical axis 516. As an example, the linearly polarized light 512 may have a wavelength of 532 nm. A half-wave plate 520 can be included along the optical axis 516. The half-wave plate 520 may be rotated about the optical axis 516, at least during a calibration stage, to control the orientation of the linearly polarized light 512 about the optical axis 516.

A polarizing beam splitter (PBS) 524, such as a polarizing beam splitter cube, is located along the optical axis 516. Where required to maximize transmission, the linearly polarized light 512 can be rotated about the optical axis 516 by the half-wave plate 520, such that the light 512 is aligned with the transmission axis of the PBS 524, enabling the maximum amount of linearly polarized light 512 to pass through the PBS 524.

A quarter-wave plate 528 is located along the optical axis 516 such that the linearly polarized light 512 transmitted by the PBS 524 is passed through the quarter-wave plate 528. In addition, the quarter-wave plate 528 is free to rotate about the optical axis 516. As will be described in greater detail elsewhere herein, the quarter-wave plate 528 may be rotated between a first orientation, in which the quarter-wave plate 528 acts to circularly polarize the light 512 received from the polarizing beam splitter, and a second orientation, in which the quarter-wave plate 528 is aligned so as to maintain the linear polarization state of the light 512 received from the polarizing beam splitter 524. As an alternative, an electronically controlled variable wave plate may be used in place of the quarter-wave plate 528.

A detector 536 is located to receive light scattered from a target 513 back through the quarter-wave plate 528, and that is in turn reflected by the PBS 524. The detector 536 may, for example, comprise a photomultiplier tube, an avalanche photodiode, a charge coupled device, or other light detector.

In a first mode of operation, the fast axis of the quarter-wave plate 528 is oriented 450 to the linear polarization output of the PBS 524. In this orientation, the quarter-wave plate 528 retards the linear slow polarization component of the light 512 transmitted from the laser 508 through the PBS 524 relative to the fast polarization component of that light 512 by 90°, resulting in the emission of light towards the target 513 that is circularly polarized in a first direction. The surface of a target 513 comprising a body of water is polarization preserving. Accordingly, the circularly polarized light is scattered back to the lidar 504 in the opposite circular polarization state. For example, where the light 508 transmitted to the target 513 is left hand circularly polarized, the light scattered from the surface of the target 513 will be right hand circularly polarized. The light scattered back to the lidar system 504 is retarded again by the quarter-wave plate 528. The result is linearly polarized light that is rotated about the optical axis 516 by 90° as compared to the light 512 that originally exited the PBS 524. For example, where the light 512 exiting the PBS 524 was vertically polarized, the light scattered by the polarization preserving surface will be horizontally polarized after again passing through the quarter-wave plate 528. Accordingly, the scattered light is aligned with the reflection axis of the PBS 524, and is directed by the PBS 524 to the detector 536. Accordingly, a light pulse comprising scattering from the surface of the target 513 is delivered to the detector 536.

In the second mode of operation, the quarter-wave plate 528 is rotated such that the fast and slow axes are aligned with the transmission plane of the PBS 524. The vertical polarization components of the transmitted light are thus retarded equally by the quarter-wave plate 528. As a result, linearly (e.g., vertically) polarized light is transmitted to the target 513. Because the surface and the water column of a target 513 comprising a body of water are polarization preserving, the linear polarization state of the incident light is preserved. When scattered back to the lidar system 504, this linearly polarized light is passed through the quarter-wave plate 528 unmodified, as linearly (e.g., vertically) polarized light that is then transmitted by the PBS 524 back toward the laser 508. Accordingly, the light scattered by the surface or the water column of the target 513 is not delivered to the detector 536. However, the floor of the target 513 alters the polarization of the transmitted linearly polarized light upon scattering. This polarization-altering effect is due to attributes such as the rough topography of a typical floor of a body of water. The polarization-altered light scattered back to the lidar system 504 by the floor of the target 513 is not altered by the quarter-wave plate 528. Accordingly, half of the light scattered from the floor of the target 513 is reflected by the PBS 524 to the detector 536 for detection. The other half of the light is transmitted through the PBS 524 back toward the laser 508. As a result, in this second mode of operation, the lidar system 504 only passes light scattered from the floor of the target 513 to the detector 536. This facilitates the detection of the floor, even in connection with targets 513 comprising shallow (e.g., less than 10 cm) bodies of water, since the earlier return from the surface and column of the body of water is passed through the PBS 524 back toward the laser 508, and therefore is not directed to the detector 536.

The scattering surface that is measured in shallow water bathymetry using a lidar system 504 in accordance with embodiments of the present invention is dictated by the orientation of the rotating quarter-wave plate 528 and subsequent modulation of transmitted and received polarization states. An analytical description of the technique begins by defining the associated Stokes vector of the transmitted linearly polarized laser pulse 512, $S_{Tx}$, not limited to but for the purposes of demonstration here is oriented to an angle $\theta$ of $\pi/4$ radians about the optical axis out of the laser transmission face.

$$S_{Tx} = \begin{bmatrix} 1 \\ 0 \\ 1 \\ 0 \end{bmatrix} \quad (2)$$

The half-wave plate 520 used to rotate the linearly polarized laser 508 light 512 into alignment with the transmission axis of the PBS 524 is expressed as a variable wave plate with phase shift $\gamma$ of $\pi$ radians, oriented to rotate the linearly polarized laser 508 light 512 to the transmission axis of the PBS 524. For the manifestation of the technique described here, the half-wave plate 520 is oriented to an angle $\theta$ of $\pi/8$ radians about the optical axis. The resulting Mueller matrix for the variable wave plate is defined as $$VWP = \begin{bmatrix} 1 & 0 & 0 & 0 \\ 0 & \cos(2\theta) & -\sin(2\theta) & 0 \\ 0 & \sin(2\theta) & \cos(2\theta) & 0 \\ 0 & 0 & 0 & 1 \end{bmatrix} \begin{bmatrix} 1 & 0 & 0 & 0 \\ 0 & 1 & 0 & 0 \\ 0 & 0 & \cos(\gamma) & \sin(\gamma) \\ 0 & 0 & -\sin(\gamma) & \cos(\gamma) \end{bmatrix} \quad (3)$$

$$\begin{bmatrix} 1 & 0 & 0 & 0 \\ 0 & \cos(-2\theta) & -\sin(-2\theta) & 0 \\ 0 & \sin(-2\theta) & \cos(-2\theta) & 0 \\ 0 & 0 & 0 & 1 \end{bmatrix}$$

The PBS 524 is modeled as a polarizer oriented to an angle $\theta$ of 0 radians for transmission along the vertical axis in the instrument transmitter, and oriented to $\theta$ of $\pi/2$ radians for horizontal transmission in the receiver.

$$Pol = \begin{bmatrix} 1 & 0 & 0 & 0 \\ 0 & \cos(2\theta) & -\sin(2\theta) & 0 \\ 0 & \sin(2\theta) & \cos(2\theta) & 0 \\ 0 & 0 & 0 & 1 \end{bmatrix} \begin{bmatrix} 0.5 & 0.5 & 0 & 0 \\ 0.5 & 0.5 & 0 & 0 \\ 0 & 0 & 0 & 0 \\ 0 & 0 & 0 & 0 \end{bmatrix} \quad (4)$$

$$\begin{bmatrix} 1 & 0 & 0 & 0 \\ 0 & \cos(-2\theta) & -\sin(-2\theta) & 0 \\ 0 & \sin(-2\theta) & \cos(-2\theta) & 0 \\ 0 & 0 & 0 & 1 \end{bmatrix}$$

During acquisition of bathymetric measurements, the quarter-wave plate 528 is initially oriented to $\theta$ of $\pi/4$ radians for transmission of circularly polarized light towards the target 513 and then rotated to $\theta$ of 0 radians for transmission of linear polarization. The quarter-wave plate 528 is expressed in terms of the variable wave plate Mueller matrix of (3), with phase shift γ of π/2 radians. As experienced along the return path of scattered signals, the quarter-wave plate 528 is expressed with orientation θ of −π/4 radians for reception of circularly polarized light and θ of 0 radians for reception of polarization-altered signals.

An example, normalized Mueller matrix that describes the scatter produced by the target 513 water body incorporates a d term which ranges from 0 to 1 and describes the target's ability to alter the polarization state (depolarize) of the incident laser pulse polarization. In this sense, a d value of 0 corresponds to a polarization preserving target such as the water surface, while a d value of 1 defines a completely depolarizing target such as a rough floor topography.

$$MDep_d = \begin{bmatrix} 1 & 0 & 0 & 0 \\ 0 & 1-d & 0 & 0 \\ 0 & 0 & d-1 & 0 \\ 0 & 0 & 0 & 2d-1 \end{bmatrix} \quad (5)$$

Combining the transmitted Stokes vector in (2) with the appropriate Mueller matrices described in (3)-(5) produces the received Stokes vector $$S_{Rx} = [VWP_{Tx}^{\lambda/2} \cdot Pol_{Tx} \cdot VWP_{Tx}^{\lambda/4} \cdot MDep_d \cdot VWP_{Rx}^{\lambda/4} \cdot Pol_{Rx}]S_{Tx} \quad (6)$$

the intensity of which, as measured by the detector 536, is defined as $$I_{Rx} = [1\ 0\ 0\ 0]S_{Rx} \quad (7)$$

Figure 8:
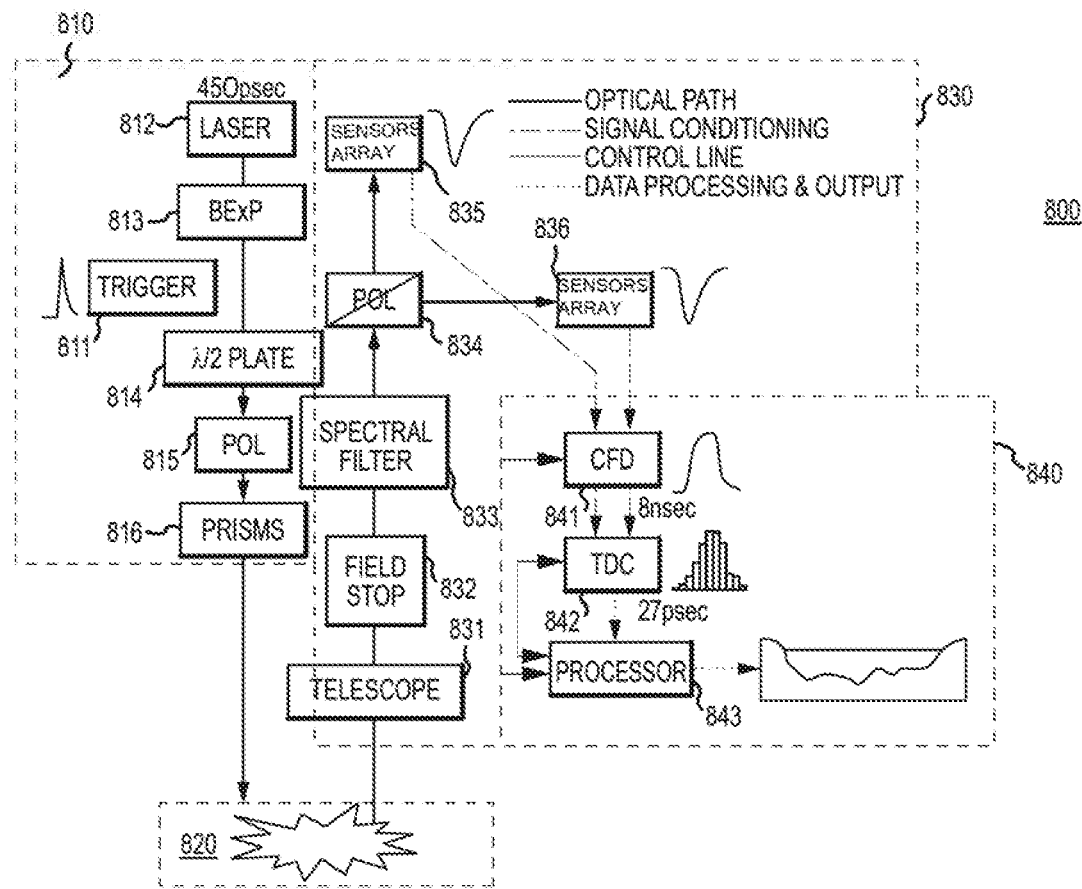
FIG. 8 illustrates components of a lidar system according to an embodiment of the invention.

FIG. 8 illustrates components of a lidar system according to an embodiment of the invention.

In an embodiment, the sub-pulse width resolution technique using a lidar system according to an embodiment is not limited to detection of hard surfaces but is also capable of detecting and characterizing "soft targets" whose optical density becomes sufficiently large to produce multiple scattering effects in the media. For example, water quality is often described by the level of turbidity. Turbidity is caused by the distribution of suspended particles in the water that reach sufficient optical density to scatter photons multiple times along the light path, consequently attenuating the light and obscuring the light path. These "soft targets" constitute a scattering target for a lidar system.

Lidar systems may work under a single-scattering assumption, that is, transmitted light scatters only once back to a co-aligned receiver. In many situations, this is an appropriate assumption to make but in optically dense media, such as turbid water or clouds, it is impossible to ignore the contribution of multiple scattering. Three of the important considerations that multiple scattering introduces is an increase in the angular spread of returned photons (light will scatter away from its initial direction axis and back to the detector), stretching the return in time (light travels an extended path within the media before returning to the receiver), and increase the amount of depolarization in the returned light (light transmitted with one polarization will return with a different polarization).

In particular, the single-scattering elastic backscatter lidar equation can be written in a form:

$$P(z) = \frac{K(z)}{z^2}\beta(z)e^{-2\gamma(z)}$$

where P (z) is the received power from range z, K(z) is the instrument and overlap function, β(z) is the backscattering coefficient, $\gamma(z)=\int_0^z a(z)dz$ is the optical depth at range z, and α(z) is the extinction coefficient. Lidar systems exploit this equation and attempt to extract β(z) and α(z) which often involves some assumption about the relation between the two. In order for this equation to remain valid, photons which are not exactly backscattered are assumed to be lost forever. Once the field-of-view (FOV) is large enough that multiply scattered photons may remain in the field-of-view and their contribution can be captured, then this equation must be modified in some way.

In simulations (e.g., Monte Carlo simulations), we have investigated a) how the angular spread of returned photons depends on recorded range, b) what new information this can provide about the particles doing the multiple scattering, and c) whether this can be incorporated into a lidar transmitter/receiver using current technologies.

There are two main results that have come out of these simulations for application to wide field-of-view lidar systems. The first is that we can calculate the optical depth of a cloud or of turbid media by measuring the depolarization of the returned lidar pulse, as long as the field-of-view of the receiver is large enough to observe multiple scattering. As the laser pulse penetrates the cloud it is depolarized by multiple scattering. The number of scattering events is related to the total optical depth (or the optical depth at a given range) so we can then relate the amount of depolarization to the optical depth of the medium. The second result is that the observed angular spread of the returned multiply-scattered light is related to the size of the particles. In Mie theory, as the particle size increases, the angular width of the forward scattering peak decreases, and therefore we see that the angular spread of the returned light is also smaller. By taking measurements with different field-of-view we can then work out how the lidar pulse is spreading laterally through the medium, which then informs on the particle size. These two measurements, taken simultaneously, can serve to identify two important cloud parameters.

Most lidar systems operate in a single-scattering regime but in an optically dense media such as a cloud or turbid water, this assumption breaks down. For sufficiently narrow laser divergence and receiver field of view, it is still possible to observe primarily single scattered photons. In a simulation, it is possible to separate returned photons by scattering order, returned angle, and exact range. This permits analysis of different types of scattering trajectories.

The easiest scattering order to analyze is the first order. These photons are ones that undergo exactly 180° backscattering. For scattering from spherical particles with linear incident polarization, the returned light will have the exact same polarization as the transmitted light; spherical particles do not depolarize incident linear polarization. Particles of different shapes and orientations will however depolarize perfectly backscattered light so depolarization is often used, for example, to differentiate water clouds from ice-crystal clouds. As the optical depth increases, more total light is reflected but this light is also concentrated near the detector, the high optical density attenuates the signal as photons are scattered away from their direct path. The total range of the single-scattered photons also stops directly at the cloud boundaries.

As the field-of-view of the receiver is increased, the receiver becomes sensitive to multiple-scattered photons. As the field of view increases, more light is allowed into the detector making a mist-cloud appear brighter than a single-scattering assumption would predict. The cloud also appears to extend beyond its physical boundary due to photons rattling around inside the cloud, taking more time to return to the detector.

Once photons are multiply scattered some depolarization can occur, and the best way to view this is by opening the field-of-view. For a fixed wide field-of-view and spherical particles, separating returns which are co- and cross-polarized to the transmitted photons illustrate the change in depolarization due to multiple scattering. The co-polarized returns will include both single- and multiple-scattered photons while the cross-polarized signal will only come from multiple scattering. When more scattering occurs more of the returned light is depolarized. The single-scattering events are dominant throughout the range but the higher order terms become increasingly important at larger ranges. This is very dependent on the total field of view and total optical depth.

Multiple-field-of-view (MFOV) lidars may be used to analyze multiple scattering effects. These systems have methods to quickly vary the field of view of the receiving telescope to capture signals as a function of range on a short enough timescale to not be confused by changes in cloud structure. One way that this works in practice is to use a rotating disk that has different sized-holes drilled at a constant radius as the field stop in a telescope. As the disk rotates, different sized holes lead to different fields of view and by timing the rotation of the disk to the firing of the laser it is possible to record very quickly signals for different FOVs.

The need for multiple field-of-views is to analyze how the lidar pulse spreads transverse to its initial direction. In the total signal observed, the small particles have a strong single-scattered return at the smallest FOV, due to the wide shape of the phase function, the cross-polarized signal comes back from a very high FOV angle. For the large particles, due to the low backscatter in the phase function, the single scattered signal is a much lower percentage of the total signal. Also due to the very tight forward peak of the phase function much more cross-polarized signal comes from the lower FOV than in the small particle case.

The way in which the laser pulse spreads through the cloud depends on the extinction coefficient and the particle size so the goal of a MFOV inversion scheme is to extract these two parameters. From these parameters other physical quantities of interest such as liquid water content (LWC) and broadband extinction can be derived. When designing a MFOV lidar system, the choice of field-of-views is essential for gathering information.

The earliest method used to evaluate multiple scattering was to take a ratio of the returns from the cross- and co-polarized channels called the linear depolarization ratio:

$$\delta = \frac{I_\perp}{I_\parallel}$$

Very generally, the more multiple scattering, the higher this ratio will be. As discussed in earlier sections, this ratio will be dependent on the experimental parameters such as FOV and particle size/density etc. Another metric which encapsulates similar information is the linear polarization contrast:

$$\delta_{LPC} = \frac{I_\parallel - I_\perp}{I_\parallel + I_\perp}$$

The linear polarization contrast is constrained to lie between −1 and 1 whereas the depolarization can take on any value greater than 0 (but is generally less than 1). As light travels through the cloud and scatters more than once, the depolarization will increase and the linear polarization contrast will decrease. For unpolarized light, or equal quantities of co- and cross-polarized signal, $\delta_{LPC}$=0. The light returned in the smallest field of view maintains the initial linear polarization since this light is scattered only once before returning to the receiver. As the FOV increases $\delta_{LPC}$ decreases, reaching a value of 0 beyond the physical boundary of the cloud.

Further, the azimuthal variation in the phase function suggests that there will be an azimuthal variation in the returned polarization patterns; the light in the two different polarization channels comes from different places in the cloud. From simulations, the initial polarization is horizontal, and the majority of the scattering is perpendicular to the initial polarization plane, as expected from the forms of the phase functions. The co-polarized signals show a two-fold symmetry around the polarization plane. The four-fold symmetry is present in the cross-polarized signals. These patterns have been analyzed semi-analytically and can be explained by the conservation of angular momentum of light. This semi-analytical work has shown that there is information in these patterns regarding important microphysical properties of the cloud.

By comparing the co-polarized patterns returned from the small-particle cloud and from the large-particle cloud it is clear that there is some information on the particle size as the co-polarized signals are quite different. Part of the problem with these azimuthal measurements is the difficulty in experimentally recording these patterns as a function of range into a cloud. Most measurements made so far involve very wide range-bins that typically include an entire cloud depth and so influences due to variations in particle size and concentration are integrated over and difficult to separate. Gated intensified charge coupled devices (ICCDs) have allowed for this type of analysis.

In order to understand how the azimuthal patterns will evolve as a function of range through the cloud it helps to first investigate the azimuthal patterns due solely to second-order scattering. From simulations, the scattering from small particles shows a large difference between the full patterns and the second-order patterns which is because of contributions from higher scattering orders. The large particle full patterns on the other hand are quite similar to the second order patterns. The phase function for the large particles is heavily peaked in the forward direction meaning that photons leave the cloud after fewer interactions than they do in the small-particle case. This means that optical depth does not always track well with the number of scattering events.

For the azimuthal dependence of the co- and cross-polarized signals, Semi-analytic methods to interpret doubly-scattered photons suggest that the azimuthal dependence of the cross-polarized returns should follow a 1−cos(4φ) dependence. This suggests that these signals can be fit to an equation of the form:

$$I(\varphi) = A + B \cos(4\varphi)$$

where A>0 and B<0. The ratio between minima and maxima can then be defined as:

$$R = \frac{I_{min}}{I_{max}} - \frac{A+B}{A-B}$$

The ratio for double-scattered photons would be zero. Higher order scattering will blur the strong azimuthal patterns. This contrast may be used to correlate the azimuthal contrast of the cross-polarized channel to the optical depth. The change in contrast comes about through multiple scattering so perhaps a better way to analyze it is to correlate the contrast with a number of scattering events.

Rather than take the contribution of all photons or only double-scattered photons, it is possible to sort the returned photons into range-bins and thereby fit the azimuthal dependence as a function of range. For all particles, as the range into the cloud increases the ratio increases from near-zero at the cloud boundary to higher values deeper into the cloud. The difference between the particles comes about because the number of scattering events in clouds with the same optical density is lower for large particles. This is because of the highly-forward-peaked nature of the phase function for scattering from large particles. The azimuthal contrast ratio compares very well to the average multiple-scattering number, up to around three scattering events. By using the azimuthal contrast ratio we can determine whether most particles in a given range-bin have been single-, double-, or triple-scattered.

This connection between number of scattering events and azimuthal contrast can be used also to measure the optical depth of the medium. Measuring the azimuthal contrast of the cross-polarized signal is a good measure of the optical depth of the cloud. Note that this will change for different particle sizes because of the propensity for large particles to primarily scatter in the forward direction.

Given the difference in co-polarized images for scattering from particles with different size parameters, the co-polarized azimuthal contrast can be fitted to a form:

$$I(\varphi) = A + B\cos(2\varphi) + C\cos(4\varphi)$$

A contrast which measures the intensity difference in two- and four-fold patterns can be defined as $$R = \frac{C+B}{C-B}$$

This ratio shows a clear relation to particle size. This method has further promise for providing an additional measure of particle size independent from measures of optical density.

As such, the sub-pulse width resolution technique using a lidar system according to an embodiment can be used to exploit these attributes of multiple scattering to characterize turbid media. In an embodiment, one method is an invasive approach where a target is lowered into the liquid media serving as a scattering target for the lidar. Frequent recordings of high-precision range and intensity of the backscattered signal as the target is lowered through the liquid is then afforded by the sub-pulse width resolution technique using the lidar system. A highly precise range profile of backscattered intensity through the liquid column can be determined, enabling estimates of the extinction coefficient of the turbid media and an overall determination of optical depth.

In an alternate embodiment as opposed to the invasive measurement as described above, another method is a non-invasive measurement of the depolarization ratio of the turbid media. Multiple scattering by suspended particles will modify the original polarization, quantified by the amount of depolarization, that allows for differential detection of single- and multiple-scattered photons from optically dense media. The optical depth of a clouded or of turbid liquid media can then be determined by measuring the amount of depolarization of the returned lidar pulse, as long as the field-of-view of the receiver is large enough to observe multiple scattering. As the laser pulse penetrates the optically dense media, it is depolarized by multiple scattering. The number of scattering events is related to the total optical depth (or the optical depth at a given range), which can then be relate to the amount of depolarization to the optical depth of the medium.

Furthermore, the observed angular spread of the returned multiple-scattered light is related to the size of the particles and differs spatially for different planes of polarization. By taking measurements using the sub-pulse width resolution technique using the lidar system with different fields-of-view, it can be worked out how the lidar pulse is spreading laterally through the medium, which then informs on the mean particle size distribution of the suspended particulates. Combining the depolarization measurement with the multiple field-of-view measurement can serve to identify two important parameters of turbid media: optical depth and particle size. A way to capture simultaneous returns within multiple fields of view is to image the multiple scattered signal on a planar imaging array. In an embodiment, 5-6 different fields-of-view may be needed. In another embodiment, the suitable number of fields-of-view would be highly dependent on chosen parameters such as cloud distance, cloud depth, particle density, particle size, etc.

Compact and scalable sensor arrays with each pixel registering its own signal are available in, e.g., silicon photomultipliers. As each sensor pixel represents a physical location of the scattered signal from a target, the lateral spreading caused by multiple scattering in turbid waters can be determined. In an embodiment, this system configuration may be realized in a lidar system. For example, PMT detectors 435 and 436 in the lidar system 400 (as discussed with respect to FIG. 4) may be replaced with silicon photomultiplier arrays or other sensor arrays.

Particularly, in an embodiment, a charge couple device (CCD) camera may be used for capturing the scattered signal. However, traditional CCD cameras may not have the time-sensitivity that would allow for range-resolved measurements. The use of gated intensified CCD (ICCD) cameras may overcome this issue as ICCD cameras have the capability to be gated in time, allowing for the measurement of very narrow (ns) time slices. For each laser shot, only a single time slice could be measured and many laser pulses would have to be integrated to produce a final image for that particular time slice. Measurement in this way of a full depth profile could be time consuming depending on the signal levels returned from the cloud.

In another embodiment, the use of a spatial mask placed at a focal plane of the receiver may allow for measurement of azimuthal signal. Light that passes through the mask would all be focused onto a single-element detector such as a photomultiplier tube (PMT) or a photodiode. This spatial mask could be designed to isolate different parts of the expected pattern, allowing for measurements of the contrast. By rotating in different spatial masks into co- and cross-polarized channels and relying on symmetries present in the images, determination of azimuthal contrast would be possible. This method may allow for at least an imperfect measure of the contrast which will in turn provide information on the optical depth of the medium.

In yet another embodiment, a similar mask can be created for measuring the co-polarized variations, although designing the mask is somewhat trickier due to the subtle differences in scattering profiles between particles of different sizes. The larger particles lead to a much stronger peak along the horizontal axis (φ=0°, 180°) compared to smaller particles. With more realistic (larger) droplet sizes, these differences could change significantly.

Thus, a non-invasive, lidar remote-sensing technique for determining optical depth and particle size in turbid media can be developed by exploiting the effects of multiple scattering and using the sub-pulse width resolution technique using the lidar system according to an embodiment to determine detailed estimates of depolarization and angular spreading. In another embodiment, by combining the invasive and noninvasive approaches, using the lidar technology, a calibration procedure can be developed that relates the remote observation of optical depth and particle size with the invasive measurement of extinction and optical depth.

Referring to FIG. 8, the lidar system 800 in an alternate embodiment incorporating the features as discussed above for detecting and characterizing targets with sufficiently large optical density that produces multiple scattering effects in the media. The lidar system 800 may be modified from the lidar system 400 by replacing the PMTs 435 and 436 with sensor arrays 835 and 836. In an embodiment, the field stop 832 may be further opened (or completely opened) compared to the field stop 432 for a larger field-of-view for observing the multiple scattering light. In a further embodiment, the processor 843 may include processes, algorithms, and/or other calculations as calibrated to the lidar system 800 for determining data and information related to the multiple scattering effects in the media, for the invasive approach, the noninvasive approach, and/or a combination of the invasive and noninvasive approaches. In one embodiment, multiple fields of view can be obtained simultaneously or substantially simultaneously.

In further detail, the lidar system 800 includes light transmitter 810, light receiver 830, and timing electronics 840. In this embodiment, the light transmitter 810 includes laser 812, beam expander 813, half-wave plate 814, polarizer 815, and prisms 816. Laser 812 acts as a light source for lidar system 800 and is configured to emit a focused light as the basis of the transmitted light signal. Laser 812 can be a pulsed laser, continuous wave (CW) laser, polarized laser, or other types of lasers. In other embodiments, laser 812 can generically include other light sources as known in the art (i.e., lamp or LED light). In one embodiment, a 850 ps pulsed laser is used as laser 812. Beam expander 813, half-wave plate 814, polarizer 815, and prisms 816 are optional and are configured to focus and align the transmitted light signal towards target 820. In this embodiment, the chain of beam expander 813, half-wave plate 814, polarizer 815, and prisms 816 are each aggregated and aligned to the optical path of the transmitted light signal. Beam expander 813 is configured to expand the transmitted light signal for tight spot targets. Half-wave plate 814 may be mechanically or electrically (i.e., using a liquid crystal variable retarder) operable to control the retardance of the focused light signal along the optical path. Polarizer 815 is configured to polarize the light signal with a known polarization. A polarizing laser may also be used as laser 812 for a known polarization. Prisms 816 are configured to coaxially direct the transmitted light signal to target 820 as known in the art.

In operation, trigger 811 may be electrically coupled to laser 812 or other components of light transmitter 810 to start the transmission of the light signal. In other embodiments, light transmitter 810 may operate continuously without trigger 811. Light signal is transmitted from light transmitter 810 to target 820. Target 820 includes at least a first surface and a second surface as described herein. The transmitted light signal is partially scattered from the first surface as a first scattered light signal and partially refracted into the target. The refracted light is scattered from the second surface as a second scattered light.

The first scattered light signal has substantially the same polarization as the transmitted light signal while the second scattered light signal will have a different polarization due to the scattering from the second surface. The first and second scattered light signals may have an overlapped interpulse portion forming one combined scattered light signal.

Light receiver 830 includes telescope 831, field stop 832, spectral filter 833, splitting polarizer 834, first detector 835, and second detector 836. Each of these components are aggregated and aligned to an optical path of the scattered light signal. Telescope 831 acts to collect the scattered light signal. Field stop 832 and spectral filter 833 are optional components. Field stop 832 acts to limit the field of view of light receiver 830 where the scattered light signal would be gathered. In this embodiment, field stop 832 may have a wider field-of-view than field stop 432 or may be completely open. Spectral filter 833 acts to further filter the received light to the light spectrum of interest (e.g., limiting the spectrum to the expected frequency of the scattered light signals).

Splitting polarizer 834 acts to separate the received scattered light signal according to the polarization. In this embodiment, the polarization splitter 834 is aligned with the optical path of the scattered light signal. As scattered light signal reaches polarization splitter 834, the cross-planar polarized component of the signal substantially passes through polarization splitter 834 while the co-planar polarized component of the signal substantially reflects. The angle of reflection is a function of the type of polarizer used (i.e. 90° angle or 62° angle for a Glan Taylor polarizer). Here, the first scattered light signal scattered from the water surface containing cross-planar polarized light is substantially reflected (i.e., at a 90° angle) while at least the co-planar polarization component of the second scattered light signal scattered from the water floor containing depolarized light is substantially transmitted. Other orientations are also possible depending on the polarization methodology used on the transmitted light signal and the type of polarizer used for polarization splitter 834.

Detector 835 is positioned at a 180° optical path from the reflected light signal and configured to detect the cross-planar polarization component of scattered light signal. Detector 836 is positioned at the optical path of the reflected light signal (i.e., 90°) and is configured to detect the co-planar component of the scattered light signal. Detectors 835 and 836 may each include a sensors array e.g., silicon photomultipliers, for detecting scattered signal from the target (e.g., multiple scattered light signal).

It is noted that polarizing beam splitter 834 can be positioned at a variety of angles to split the scattered light signal at other angles. Detectors 835 and 836 can be positioned at other configurations to receive such split components of the multiple scattered light signals.

The timing electronics 840 may include a constant fraction discriminator (CFD) 841, time-to-digital converter (TDC) 842, and processor 843. Processor 843 is coupled to CFD 841 and TDC 842 through a control line for control and feedback of these components. CFD 841 is coupled to detectors 835 and 836 through a signal conditioning line and is configured to output an apex of the photon count signal at certain intervals representing the time at which the signal has meaningfully arrived. In one embodiment of the invention, CFD 841 has an 8 ns resolution. TDC 842 is coupled to CFD 841 and is configured to convert the time signal output by CFD 841 into a digital signal. In one embodiment of the invention, TDC 842 has a resolution of 27 ps.

Processor 843 is coupled to TDC 842 and is configured to take the digitized timing signal and determine the time of arrival of each component (co-planar and cross-planar polarized signals in one embodiment) and calculate the difference in the time of arrival of the two signals. In this embodiment, the processor 843 may further include processes, algorithms, and/or other calculations as calibrated to the lidar system 800 for determining data and information related to the multiple scattering effects in the media, for the invasive approach, the noninvasive approach, and/or a combination of the invasive and noninvasive approaches.

Further, an initial calibration to lidar system 800 may be needed because the light paths to detectors 835 and 836 may not be the same after the scattered light is separated by polarizing splitting 834. According to one embodiment, this calibration can be accomplished by using a scattered signal from a surface that is depolarizing and noting a difference in the assessment of distance to that surface between the detectors 835 and 836. The difference in the assessment of distance is likely due to the slightly different optical paths between each of detectors 835 and 836 and polarizing splitter 834. In one embodiment, this calibration can be performed once and saved for adjustment by processor 843. The correction and adjustment can be applied to subsequent depth data by processor 843.

One embodiment is directed towards using a lidar system and techniques described herein to classify skin of a patient. The pathway of light into the skin is believed to have several pathways. Skin includes several layers as known in the art including epidermis, dermis and subcutis/hypodermis. It is believed that the lidar system herein and techniques, for example, as described with Example 9 can be used to identify normal skin pathology and abnormal skin pathology. The abnormal skin pathology may include cancerous or precancerous cells. The lidar system can be utilized with an imaging technique as described with reference to *Imaging Skin Pathology with Polarized Light*, Journal of Biomedical Optics, 7(3), 329-340, July 2002, which is hereby incorporated by reference as if fully set forth herein. Other lidar measurement techniques are described with regard to examples 1-9 herein and it is believed that these techniques can be utilized for determining various skin pathologies.

In one embodiment, the lidar system can be configured to scan the surface, collect parallel and perpendicular polarizations and record intensities. It is believed the pathology of the cell can be differentiated by different wavelengths, volume of cell structures, density of cell structures and other characteristics of the system and/or cells. It is also believe the system can penetrate to at least 4 mm.

Figure 10:
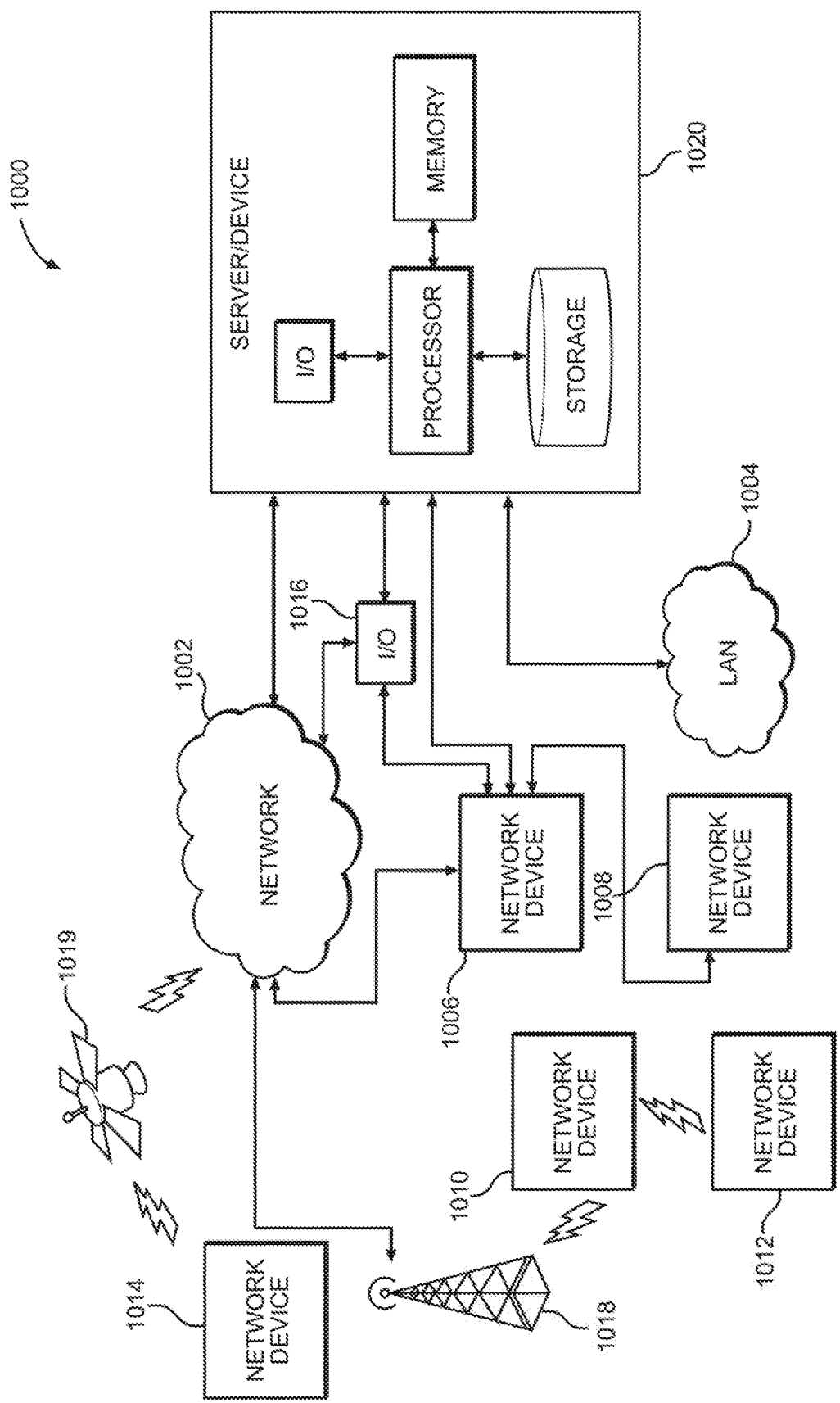
FIG. 10 illustrates an exemplary block diagram of a communication network for use with embodiments of the invention.

FIG. 10 illustrates an exemplary block diagram of a communication network for use with embodiments of the invention In one embodiment, the system 1000 is utilized for communication and processing techniques and methods described herein. The system can be configured with large-scale, parallel computational capabilities that are leveraged for image and signal processing demands of embodiments herein. In embodiments herein, lidar systems are utilized for various methods and systems for remote sensing measurements, and particularly to methods and systems for remote sensing measurements through semi-transparent media, e.g., glass, plastic, sapphire, and combinations thereof, and even more particularly to methods and systems for sensing a relative distance and/or shape of an object or feature in various environments and is configured to work with the system 1000. Optionally and/or alternatively, the lidar system is part of a larger navigation system can be configured to work with the system 1000. In this embodiment, the lidar systems may be in communication with any aspect of the system 1000.

Referring to FIG. 10, the system 1000 includes one or more networks, including wide-area network 1002, e.g., the Internet, company or organization Intranet, and/or sections of the Internet (e.g., virtual private networks, Clouds, and the Dark Web), and local-area network 1004, e.g., interconnected computers localized at a geographical and/or organization location and ad-hoc networks connected using various wired means, e.g., Ethernet, coaxial, fiber optic, and other wired connections, and wireless means, e.g., Wi-Fi, Bluetooth, and other wireless connections. The system 1000 can include a number of network devices 1006, 1008, 1010, 1012, and 1014 that are in communication with the other devices through the various networks and/or through other means, e.g., direct connection through an input/output port of a network device 1016, direct connection through a wired or wireless means, and indirect connection through an input-output box, e.g., a switch.

Network devices 1006, 1008, 1010, 1012, and 1014, which may also connect through the networks 1002 and 1004 using various routers, access points, and other means. For example, network device 1010 wirelessly connects to a base station 1018, which acts as an access point to the wide area network 1002. The network devices may include a I/O, processor, memory and storage configured to perform processes and methods of modules described herein and known in the art. The processing for the lidar system or navigation system may be done in parallel, on a network device in the cloud, and combinations of the same. Base station 1018 may be a cellular phone tower, a Wi-Fi router or access point, or other devices that allow a network device, e.g., wireless network device 1010, to connect to a network, e.g., wide area network 1002, through the base station 1018. Base station 1018 may be connected directly to network 1002 through a wired or wireless connection or may be routed through additional intermediate service providers or exchanges. Wireless device 1010 connecting through base station 1018 may also act as a mobile access point in an ad-hoc or other wireless network, providing access for network device 1014 through network device 1010 and base station 1018 to network 1002.

In some scenarios, there may be multiple base stations, each connected to the network 1002, within the range of network device 1010. In addition, a network device, e.g., network device 1010, may be travelling and moving in and out of the range of each of the multiple base stations. In such case, the base stations may perform handoff procedures with the network device and other base stations to ensure minimal interruption to the network device's connection to network 1002 when the network device is moved out of the range of the handling base station. In performing the handoff procedure, the network device and/or the multiple base stations may continuously measure the signal strength of the network device with respect to each base station and handing off the network device to another base station with a high signal strength to the network device when the signal strength of the handling base station is below a certain threshold.

In another example, a network device, e.g., network device 1014, may wirelessly connect with an orbital satellite 1019, e.g., when the network device is outside of the range of terrestrial base stations. The orbital satellite 1018 may be wirelessly connected to a terrestrial base station that provides access to network 1002 as known in the art.

In other cases, orbital satellite 1018 or other satellites may provide other functions such as global positioning and providing the network device with location information or estimations of location information of the network device directly without needing to pass information to the network 1002. The location information or estimation of location information is known in the art. The network device may also use geolocation methods, e.g., measuring and analyzing signal strength, using the multiple base stations to determine location without needing to pass information to the network 1002. In an embodiment, the global positioning functionality of the orbital satellite 1018 may use a separate interface than the communication functionality of the orbital satellite 1018 (e.g., the global position functionality uses a separate interface, hardware, software, or other components of the network device 1010 than the communication functionality). In another embodiment, the orbital satellite with the global position functionality is a physically separate satellite from the orbital satellite with communication functionality.

In one scenario, network device, e.g., network device 1008, may connect to wide area network 1002 through the local area network 1004 and another network device, e.g., network device 1020. Here, the network device 1020 may be a server, router, gateway, or other devices that provide access to wide area network 1002 for devices connected with local area network 1004. In one scenario, users may have access to navigation or lidar system data over the system 1000. In this embodiment, the users could pay for access to the data on the system 1000.

One embodiment is directed towards information content embodied within the light vector. This vector behavior is described by polarization theory where Stokes vectors are used to describe the polarization state of light and interactions along an optical path is described by Mueller matrices, which may modify light's polarization state to produce a new Stokes vector. Thus, a complete description of light through a lidar system, including its intended target, can be expressed in terms of Stokes vectors and Mueller matrices along the optical path to fully describe and use the information content.

In one embodiment, conventional lidar systems designed to observe the total intensity of backscattered light can be retrofitted to enable the range performance attributes by implementing aspects of invention described herein. This is possible because the four-element Stokes vector describing polarized or partially polarized light is based on intensity measurements.

In one embodiment, retrofitting conventional systems is described herein and with reference as follows. The four Stokes-vector elements, $S_0$, $S_1$, $S_2$, $S_3$ is represented as follows:

$$\begin{bmatrix} S_0 \\ S_1 \\ S_2 \\ S_3 \end{bmatrix} = \begin{bmatrix} E_\square E_\square^* + E_\perp E_\perp^* \\ E_\square E_\square^* - E_\perp E_\perp^* \\ E_\square E_\perp^* + E_\perp E_\square^* \\ i(E_\square E_\perp^* - E_\perp E_\square^*) \end{bmatrix} \propto \begin{bmatrix} I_\square + I_\perp \\ I_\square - I_\perp \\ I_{45} - I_{135} \\ I_L - I_R \end{bmatrix}$$

E represents the complex electric field of the light wave in the parallel ($E_p$) and perpendicular ($E\perp$) directions orthogonal to the propagation vector of the wave. The asterisk (*) associated with E is the complex conjugate symbol. The symbol I represents the intensity of light for a given component of the light wave in the parallel ($I_p$) and perpendicular ($I\perp$) directions orthogonal to the propagation vector of the wave. The total intensity is given by the $S_0$ element and, for conventional lidar systems without polarization sensitivity, this governs their measurement. However, conventional systems cannot distinguish between $I_p$ and $I\perp^-$ which both contribute to the total intensity. By being sensitive to select polarizations, the individual intensity measurements can be measured, and Stokes elements can be determined. The total intensity can be determined by summing the parallel and perpendicular intensities to get the $S_0$ element, but additional information is available from measurements of different polarization-sensitive intensities.

When an optical beam interacts with matter, its polarization state is almost always changed. The polarization state can be changed by one or more ways: (1) changing the amplitudes of the Stokes components, (2) changing the relative phase between orthogonal components, (3) changing the direction of the orthogonal components, or (4) by transferring energy from polarized states to unpolarized states. The terminology for optical elements which perform these transformations is as follows.

Case (1): Polarizer/diattenuator—an optical element that changes the orthogonal amplitudes unequally. Case (2): Retarder/wave plate/phase shifter—an optical element that introduces a phase shift between orthogonal elements. Case (3): Rotator/optical activity—An optical element that rotates the orthogonal components of the light beam through some angle as it propagates through the element. Case (4): Depolarizer—an optical element where energy in polarized states transfers to unpolarized states. Mueller matrices are defined for each of these optical elements but can also be used to describe the optical altering effects of a scattering target. If that target is semitransparent then a product of Mueller matrices is required to capture the altering effects as the beam propagates through the medium. The Mueller matrix embodies these effects in its 16-element matrix containing real-valued elements where the incident beam's Stokes parameters, $S_i$, are altered by the medium to produce an emerging beam with a new set of Stokes parameters, $S'_i$.

$S_0' = m_{00}S_0 + m_{01}S_1 + m_{02}S_2 + m_{03}S_3$, $S_1' = m_{10}S_0 + m_{11}S_1 + m_{12}S_2 + m_{13}S_3$, $S_2' = m_{20}S_0 + m_{21}S_1 + m_{22}S_2 + m_{23}S_3$, $S_3' = m_{30}S_0 + m_{31}S_1 + m_{32}S_2 + m_{33}S_3$.

Figure 17:
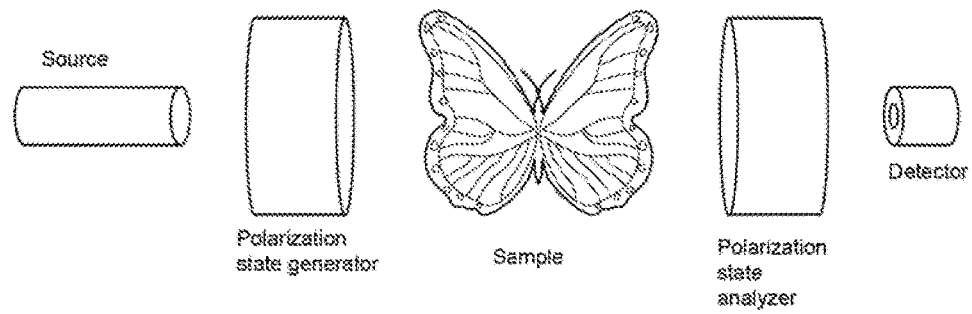
FIG. 17 illustrates a general PSG-target-PSA configuration according to an embodiment of the invention.

This can be written in matrix form as, $$\begin{bmatrix} S_0' \\ S_1' \\ S_2' \\ S_3' \end{bmatrix} = \begin{bmatrix} m_{00} & m_{01} & m_{02} & m_{03} \\ m_{10} & m_{11} & m_{12} & m_{13} \\ m_{20} & m_{21} & m_{22} & m_{23} \\ m_{30} & m_{31} & m_{32} & m_{33} \end{bmatrix} \begin{bmatrix} S_0 \\ S_1 \\ S_2 \\ S_3 \end{bmatrix} \text{ or } S' = M \cdot S$$

where M is the Mueller matrix with $m_{ij}$ representing elements of the matrix by row, i, and column, j, S is the incident beam's Stokes vector, and S' is the emerging beam Stokes vector. The approach can be generally implemented by devising a polarization state generator (PSG), to illuminate the target, and a polarization state analyzer (PSA), to observe the scattered signal from the target, so that elements of the target's Mueller matrix can be determined by systematically altering the PSG and PSA configuration and measuring the resulting intensity by a detector situated behind the PSA. FIG. 17 illustrates a general PSG-target-PSA configuration but the arrangement of the PSG and PSA can be at different scattering angles than just forward scatter depicted.

A lidar transmitter can become a PSG by including retarders and polarizers in the transmit path to produce an outgoing Stokes vector with known and controllable components. In one embodiment, a conventional lidar receiver can be converted to a lidar receiver described herein. For example, a conventional lidar receiver can be converted or retrofitted to PSA by including retarders and polarizers in the receiver path to produce an emerging Stokes vector whose intensity can be recorded by a detector. If information indicative of the target's Mueller matrix is available, then the PSA can be used to isolate certain components of the emerging Stokes vector. In matrix form, this PSG-target-PSA configuration can be expressed as:

$$I = cOA_{Rx}M_sS_{Tx} = c\begin{bmatrix}1\\0\\0\\0\end{bmatrix}^T\begin{bmatrix}a_{00}&a_{01}&a_{02}&a_{03}\\a_{10}&a_{11}&a_{12}&a_{13}\\a_{20}&a_{21}&a_{22}&a_{23}\\a_{30}&a_{31}&a_{32}&a_{33}\end{bmatrix}\begin{bmatrix}m_{00}&m_{01}&m_{02}&m_{03}\\m_{10}&m_{11}&m_{12}&m_{13}\\m_{20}&m_{21}&m_{22}&m_{23}\\m_{30}&m_{31}&m_{32}&m_{33}\end{bmatrix}\begin{bmatrix}S_0\\S_1\\S_2\\S_3\end{bmatrix}$$

where $S_{Tx}$ is the Stokes vector exiting the PSG of the lidar transmitter, $M_s$ is the Mueller matrix of the scattering target, $A_{Rx}$ is the Mueller matrix of the PSA in the lidar receiver, O is the transpose of the projection vector of the emerging Stokes vector onto the detector, and c is a calibration constant that accounts for optical efficiencies.

The polarization altering nature of matter is exploited by a lidar technique of this embodiment of the invention by understanding the Mueller matrices of the scattering object and applying polarization analyzers to isolate certain components of the backscattered Stokes vector. This isolation enables surfaces to be discerned in a semitransparent media at high range resolution—even if the laser pulse lengths are longer than the range separation between surfaces. For example, a lidar transmitting horizontally polarized pulses that are backscattered by a water surface and collected by the lidar receiver's polarization state analyzer produces an emerging Stokes vector of, $$S_{Rx} = A_{Rx}M_sS_{Tx} = \frac{1}{2}\begin{bmatrix}1&1&0&0\\1&1&0&0\\0&0&0&0\\0&0&0&0\end{bmatrix}\begin{bmatrix}1&0&0&0\\0&1&0&0\\0&0&-1&0\\0&0&0&-1\end{bmatrix}\begin{bmatrix}1\\1\\0\\0\end{bmatrix} = \begin{bmatrix}1\\1\\0\\0\end{bmatrix}$$

This emerging Stokes vector through the PSA is the same as the transmitted Stokes vector when the PSA consists of a polarizer aligned (i.e. parallel) with the transmitted polarization (in this case, the PSA is the Mueller matrix of a horizontal polarizer). The scattering Mueller matrix, $M_s$, is a unit matrix where the scatter from the water surface is assumed to be a polarization preserving process with the negative sign in the [3,3] and [4,4] elements of the Mueller matrix accounting for the flipping of the polarization plane upon reflection in the 45° direction and for circular polarization. Water surfaces can act as a polarization-preserving scatterer even under wavy conditions. Applying the projection vector, O, the detector records the intensity of parallel polarized signals scattered back through the receiver consider now the same polarimetric lidar as described above but for a scattering surface that is a nonuniform. A partial depolarizer is where the degree of polarization is reduced by reducing one, two, or all three Stokes vector components. The emerging Stokes vector becomes, $$S_{Rx} = A_{Rx}M_sS_{Tx} = \frac{1}{2}\begin{bmatrix}1&1&0&0\\1&1&0&0\\0&0&0&0\\0&0&0&0\end{bmatrix}\begin{bmatrix}1&0&0&0\\0&1-d&0&0\\0&0&d-1&0\\0&0&0&2d-1\end{bmatrix}\begin{bmatrix}1\\1\\0\\0\end{bmatrix} = \begin{bmatrix}1-d/2\\1-d/2\\0\\0\end{bmatrix}$$

Here, the Mueller matrix of the scattering surface is described by a single parameter, d, which represents the propensity of the scattering surface to depolarize the incident polarization, and varies from 0 to 1. Conversely, the value of 1-d indicates the amount of partial polarization present in the scattered signal. Applying the projection vector, O, the detector records a normalized intensity of 1−d/2. Written equivalently in the expanded form, 1−d+d/2, illustrates that the backscattered intensity from a depolarizing surface, whose receiver polarization is parallel to the transmitted polarization, is a combination of the remaining parallel polarization plus half of the light that is depolarized.

If the lidar receiver's PSA is aligned orthogonal (in this case the receiver's polarizer transmission axis is rotated 90 degrees) to the transmitted PSG, then the emerging Stokes vector becomes, $$S_{Rx}^{\perp} = A_{Rx}^{\perp}M_sS_{Tx} = \frac{1}{2}\begin{bmatrix}1&-1&0&0\\-1&1&0&0\\0&0&0&0\\0&0&0&0\end{bmatrix}\begin{bmatrix}1&0&0&0\\0&1-d&0&0\\0&0&d-1&0\\0&0&0&2d-1\end{bmatrix}\begin{bmatrix}1\\1\\0\\0\end{bmatrix} = \begin{bmatrix}d/2\\-d/2\\0\\0\end{bmatrix}$$

Applying the projection vector, O, the detector intensity is d/2 or half of the depolarized portion of the incident polarization. There are numerous PSG and PSA lidar configurations to detect elements of the backscatter Stokes vectors and the examples provided here illustrate their utility.

Optionally and/or alternatively, in one embodiment circular polarization can be used in the depolarizing case. In this case, it can be shown using the same steps as the previous explanation that the PSG and PSA configured for circular polarization will result in all of the depolarized light being recorded by the cross-polarized detector while only the partially polarized light is recorded by a co-polarized detector.

This can now be applied to ranging through semitransparent media to achieve high-resolution range resolution of closely spaced surfaces. Transmitting highly linearly polarized signals by a lidar to a semitransparent surface, such as water, with a co-polarized detector in the receiver will produce an intensity response to the scattered light from the polarization-preserving surface. Thus, range to the water surface can be determined from the co-polarized intensity measurement. If the lidar receiver has a cross-polarized detector to the transmitted beam then no backscattered signal is detected from the surface. However, as the transmit beam propagates through the water and interacts with the bottom surface, a new Mueller matrix must be considered based on the scattering attributes of the bottom surface. The scattering attributes of the bottom surface typically act as depolarizers, much in the manner described in the previous discussion. Therefore, one-half of the depolarized signal plus the remaining partially polarized signal impacts the co-polarized detector, but to be detected this must occur outside the dead time of the detector as it was already activated by the previous water surface signal. However, the cross-polarized detector remains dormant until the half of the depolarized signal is returned from the bottom surface. Consequently, the water surface and bottom surface can be detected separately by detecting the time separated co-polarized and cross-polarized signals on separate detectors. More generally, the laser pulse is encoded by the nature of the scattering matrices and that this encoding can occur within the length of the laser pulse. The scattered pulse carrying the imprint of these different scattering surfaces is decoded by the lidar receiver's PSA and detected independently. This results in the ability to resolve surfaces with resolution higher than the transmitted laser pulse length. In one embodiment, this technique can be called intrapulse phase modification induced by scattering and can be exploited to achieve much higher resolution ranging of surfaces than conventional lidar systems such as less than a pulse resolution or 1 cm or less resolution. These techniques can be utilized to retrofit conventional LIDAR systems and techniques to achieve a much higher resolution, e.g., 5 cm or less, 4 cm or less, 3 cm or less, 2 cm or less, or 1 cm or less.

In one embodiment, the original polarization state is vertically polarized, described by the intensity-normalized Stokes vector as $S=[1,-1,0,0]^T$, and interacting with a water body. The surface signal is polarization preserving and the received scattered signal from the surface remains vertically polarized, $S'=[1,-1,0,0]^T$, with the scattered intensity modified by the reflection coefficient of the water surface. The transmitted portion through the water surface scatters signal from the bottom surface such that some of the energy in the original vertical polarization will be transferred to the horizontal state through the depolarization scattering Mueller matrix. A physical attribute that contributes to a depolarization Mueller matrix are rough surfaces, like sand which has a depolarization value close to 0.5. This physical attribute can act as a partial depolarizer producing a depolarization Mueller matrix whose diagonal elements are non-zero but less than one. By multiplying the original Stokes vector with the bottom surface Mueller matrix, the backscattered return signal now has polarization components in both the vertical and horizontal polarizations. This type of polarization diversity in backscattered signals can be isolated by introducing polarization sensitivity in the receiver that is orthogonal to the originally transmitted polarization state. Thus, water surface returns and bottom returns can be isolated in range by their associated polarization scattering properties. More generally, transmitting through semitransparent targets whose scattering Mueller matrices produce different polarization responses can be resolved in range. In this embodiment, the methodology of this approach is that the polarization alteration induced by scattering can be observed within the transmitted pulse width enabling sub-pulse width resolution in range for polarization altering targets whose range separation is less than the laser pulse width. This applies to any semitransparent medium with these polarization attributes, including glass, skin, combinations of the same and the like.

In this embodiment, the need for a single high dynamic range detector is eliminated and it allows for simultaneous unambiguous detection and ranging to the water surface and to an underwater object. By being able to separate surface reflected signals into one detector and signals from submerged objects into another, the dynamic range problem becomes more manageable and opens flexible pathways to implement. An illustration of the perceived improved dynamic range is shown in FIG. 18.

Figure 18:
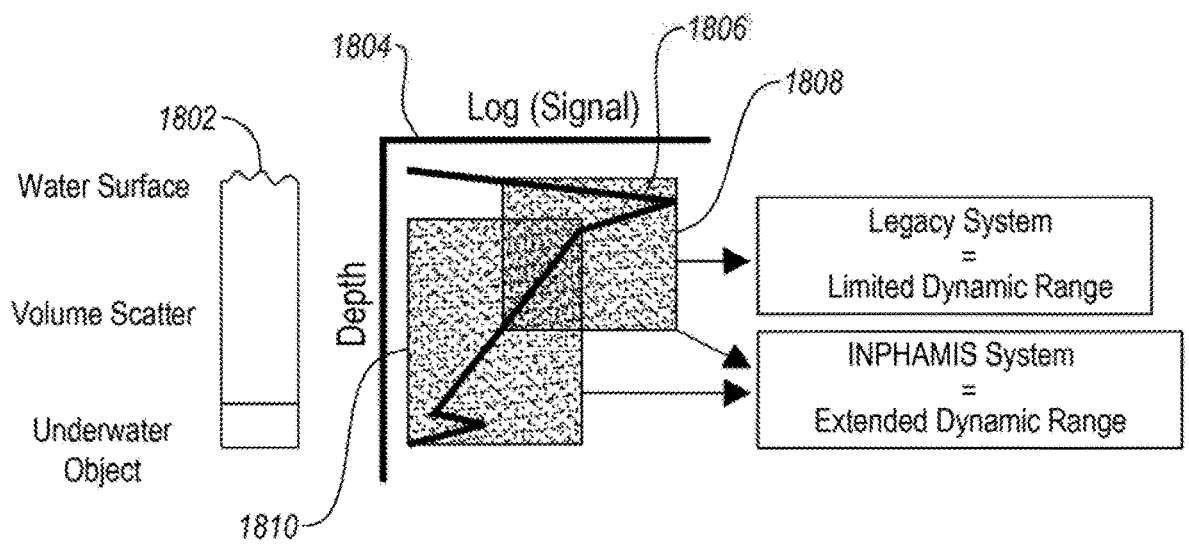
FIG. 18 illustrates comparison between a related art lidar system and lidar system according to an embodiment of the invention.

Referring to FIG. 18, illustrating related art lidar systems utilizing a single detector system that attempts to capture both the very bright water surface reflection and the much dimmer bottom/object reflection. Also, as shown, in one embodiment of the invention the techniques and/or system are configured to separate the optical signals from the top surface and submerged object onto separate detectors, allowing for an extension of the dynamic range without requiring complicated new detector technology and also allowing for retrofitting existing related art systems.

In one embodiment, the natural logarithm of the signal strength versus water depth is depicted in a manner similar to lidar observations from deep water measurements—water surface at the top of the graph with depth increasing down the graph (see water 1802 insert on left of graph 1804). The graph 1804 includes a Log(Signal) on an x-axis and depth on a y-axis. Referring to the graph the log of the signal 1806 increases towards the right of the graph with the strongest signals coming from the water surface. Surface scatter is depicted by the first box 1808 and is the signal detected by the co-polarized detector, with the finite extension of the box along the x-axis indicating its particular dynamic range. The second box 1810 depicts the subsurface signals detected by the cross-polarized channel which includes the underwater object detection. Its signal dynamic range may be similar to the co-polarized channel but can be operated at a much higher gain to capture the weaker signals. Consequently, the combined detection capability extends the dynamic range that was originally limited by having to cater to the very strong surface reflections.

In one embodiment, the dynamic range can be expanded by capturing both the signal of the first box 1808 using the co-polarized detector and the signal of the second box 1810 containing much weaker signals using the cross-polarized detector. There are certainly variations to implementing this approach for specific system configurations (e.g. multiple detection paths, rotating polarizer, photoelastic modulator, etc.) but the fundamental nature of the method described is the true advantage to increasing the dynamic range. This can be done by retrofitting related systems not utilizing polarization generating or analyzing components. Therefore, as discussed herein, the use of polarization can provide high resolution ranging and extend the dynamic range of lidar systems.

One example of where implementation of an embodiment of the invention is relevant for related art lidar systems is in the simultaneous measurement of water surface and submerged object. Related art systems cannot handle the high dynamic range in order to simultaneously detect the water surface (which has a very bright specular reflection) and a submerged object (which may have a very dim reflection). To deal with this, these systems are typically oriented off-nadir as known in the art, so that they are sensitive only to the reflections from the submerged object. In order to detect the water surface these systems typically also utilize nadir-directed infrared light which does not penetrate the water. In this embodiment, the technique separates the bright water surface reflection from the dim submerged object reflection allowing for true simultaneous and nadir-pointing detection of both surfaces.

Once the polarization-specific signals are isolated then high resolution acquisition electronics can be used to determine the time of arrival of the scattered signal. In one embodiment, the vertically polarized signal from the water surface is time tagged upon arrival and the lagged scattered signal from the bottom with horizontal polarization is time tagged separately, both using constant fraction discrimination and time to digital converters. Experiments described herein have demonstrated sub-centimeter resolution in waters as shallow as centimeters to many meters. Water surface conditions have been tested under a range of flow velocities without impacting the basic premise of the technique.

Optionally and/or alternatively, embodiments can use other signals, e.g., Geiger mode and photon counting detection methodologies and also having similar performance attributes using analog signals and full waveform analysis. The difference in time between the two signals provides an estimate of the optical path length through the water. Because light travels slower in water than air by about thirty-three percent (33%) due to the difference in refractive index, underwater targets uncorrected for the change in light propagation velocity through water (essentially assuming the light only traveled through air) will have an apparent range that is further away than it should be. This systematic offset in range is corrected by accounting for the longer time it takes the laser light to travel the water path length, weighted by the difference in index of refraction between air and water of 0.33. The range to the underwater target can then be used to determine water depth by multiplying the range by cosine of the refraction angle. The ability to measure both surfaces from the same pulse for narrow fields of view also provides some constraint on the possible incident angles of the light entering a wavy surface.

Also, given the variety of Mueller matrices that could be experienced in scattering from any semitransparent media, techniques described herein can have many possible permutations in its implementation. For example, in one embodiment, related art systems may be retrofitted to a total-intensity lidar system. Because these related art systems measure total intensity for ranging, a retrofit can be employed where only a few components of the system require modification. In one embodiment, these retrofit components can include a retarder and polarizer in the transmitter and a retarder and polarization beam splitter in the receiver.

Figure 19:
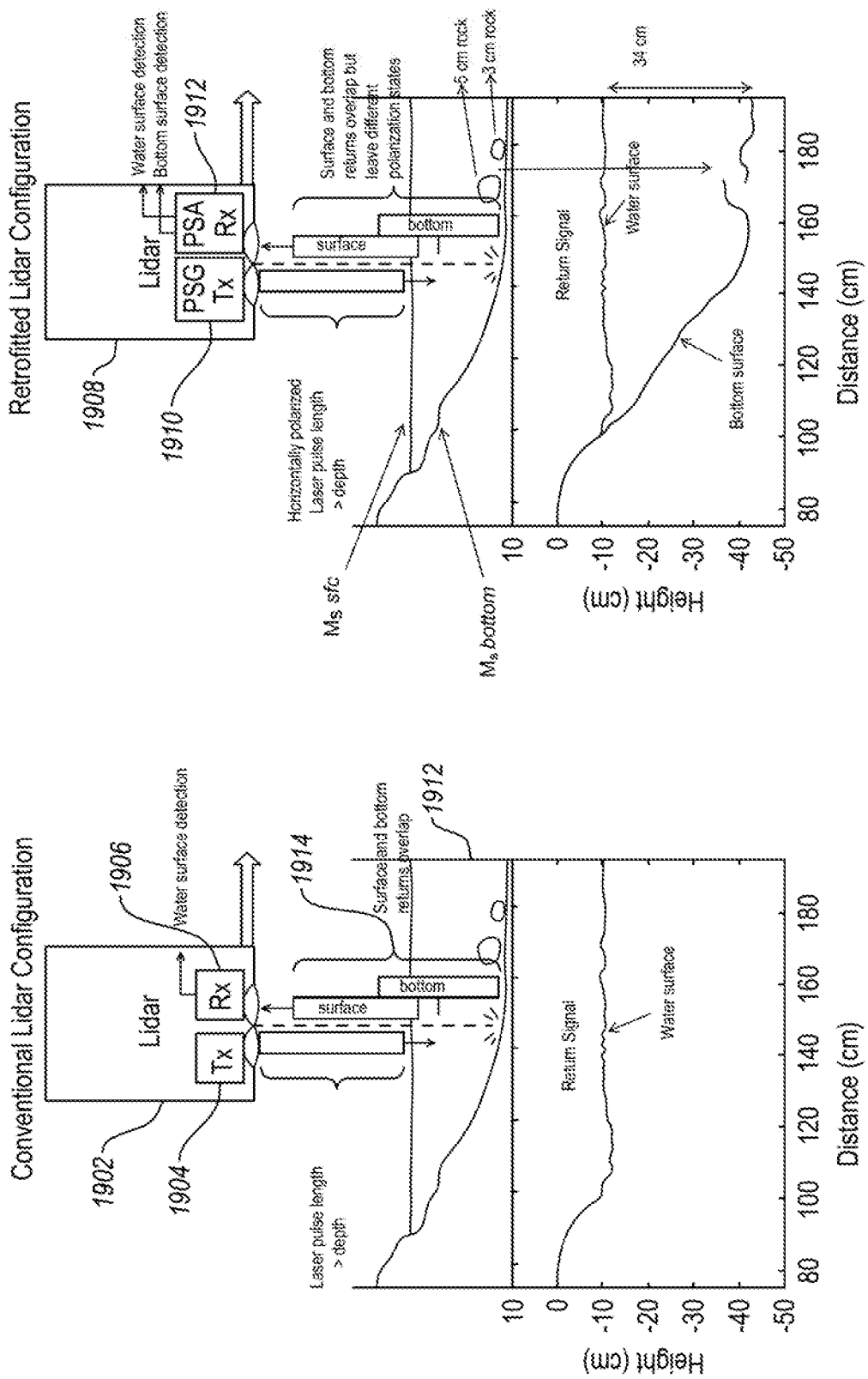
FIG. 19 illustrates a comparison between a related art lidar system and retrofitted lidar system according to an embodiment of the invention.

FIG. 19 illustrates a related art lidar system and retrofitted related art lidar system. Referring to FIG. 19, a related art or conventional lidar system 1802 includes a standard laser transmitter (Tx) 1904 and receiver (Rx) 1906 to observe a land-to-water transition in a water tank. The system 1902 cannot discern water surface from water bottom. In fact, there is no indication in the return signal that water is present. The retrofitted system 1908 on the right figure illustrates the use of our technique to achieve high-resolution ranging of the same land-to-water transition through a retrofit of the conventional lidar using a polarization state generator (PSG) in the transmitter 1910 and a polarization state analyzer (PSA) in the receiver 1912.

Referring to FIG. 19, a conventional lidar system 1902 includes a transmitter 1904 and a receiver 1906. Also, a retrofitted lidar system 1908 was constructed. As shown, each of the lidar systems 1902 and 1908 can be operated placed in a fixed position or moving position. In this embodiment, and by way of illustrative example only each of the units can be arranged over a tank of water with objects including a sloped surface and rocks of different dimensions. In operation, the units can be operated and data received and/or recorded and the data includes information indicative of co-polarized and cross-polarized channels.

This embodiment is directed towards improved resolution achieved by retrofitting a conventional lidar as shown in FIG. 19. The conventional lidar 1902 can be operated with an energy pulse as described herein, e.g., laser pulse, to a length longer than the depth of water contained in a tank 1912 as known in the art. In one scenario case, the water depth is about 34 cm which would require a pulse length of less than 300 ps to resolve the top and bottom surfaces (this is assuming the detector and electronics do not further degrade the time resolution) as shown in examples herein. However, the pulse lengths and detector/electronic conditions are seldom met by any of the conventional lidar systems. Furthermore, the more shallow the water the shorter the required laser pulse and faster the detector/electronics. As shown in FIG. 19, the scattered laser pulse from the water surface and bottom surface are overlapped and indistinguishable resulting in the conventional lidar only observing the water surface, and without other knowledge could even misidentify water as land—not a good scenario for seaplanes landing at night.

Now referring to the retrofitted lidar system 1908 it can be shown that the polarization techniques described herein allow the pulses overlapped to be separated by the PSA in the lidar receiver because of the distinctly different polarization states from the surface and bottom targets. As described herein, the retrofit enables depth determination and bottom surface mapping of less than a centimeter as demonstrated by the land-to-water transition and distinguishing rock features in FIG. 19.

In one embodiment, the conventional lidar system 1902 is be modified so that the intensity being measured is not the total intensity but a specific polarization component of the Stokes vector. Also, if the system is to be used for water bathymetry, a laser source in the blue-green part of the spectrum is necessary to optimize transmission through the water.

In one embodiment, a method for retrofitting to a conventional lidar system includes obtaining a conventional lidar system, e.g., including a laser, at a prescribed and fixed wavelength, transmitting pulses that upon scattering are collected by an optical receiver, such as a telescope, and the light intensity is detected by a single optical sensor. Modifying or retrofitting the conventional lidar system by modifying the transmitter path so that laser pulses are transmitted for a specific polarization state, e.g., vertical, horizontal, or circular. The degree of polarization (DOP) depends on the application but it is not unreasonable to implement a DOP of 99% in one specific polarization state. The high DOP is helpful to insure cross-polarized signals from the transmitter are minimized once scattered from the water surface. These transmitter attributes can be accomplished by the laser manufacturer or implemented after the output of the laser transmitter by placing a retarder/polarizer combination that can be rotated to control and select the plane of polarization transmitted. If other reflecting surfaces are present in the transmit path, such as steering mirrors, some retardance may occur if the mirrors are not adequately coated for certain planes of polarization. This can introduce ellipticity in the transmitted Stokes vector and often a quarter wave plate is introduced in the path to mitigate this effect. These adaptations essentially convert the conventional lidar system into a polarization state generator (PSG Tx). The added hardware can be designed to be of low volume, mass, and cost to have minimal impact on these conventional lidar specifications. In one embodiment, the transmitter is providing a prescribed polarization, the receiver can be modified to make its intensity measurement capable of detecting specific polarization states. This can be done by converting the conventional lidar receiver to a polarization state analyzer (PSA Rx), e.g., employing retarders and polarizers in the optical path. Optionally and/or alternatively, these elements can be designed to be of low volume, mass and cost. In one embodiment, the manner is to place a retarder/polarizer combination in the receiver path preferably before any polarization altering surfaces may corrupt the entering Stokes vector coming from the scattered target. Optionally and/or alternatively, there are methods to implement hardware compensation of optical retardance that can be implemented to correct for this effect. Depending on the transmitted polarization state, the retarder/polarizer combination can be devised to select specific polarization components of the entering Stokes vector.

If only one detector is present in the conventional lidar, a sequence of measurements in time to select specific polarization components is required. This can be accomplished by implementing a rotating analyzer. In one embodiment, a method can be utilized to avoid mechanically rotating mounts by implementing a quarter-wave plate at a fixed angle followed by a liquid crystal variable retarder which is followed by a linear polarizer. This configuration can produce any combination of polarization state while only requiring a low-voltage supply to change the variable retarder's value to meet the desired emerging Stokes vector. For the linearly polarized transmitter case, the rotating analyzer would switch between co-polarized and cross-polarized signals to detect the surface and then the bottom. This single detector, alternating scheme of orthogonal polarizations will have time integration constraints dictated by the dead time of the detector/electronics, the laser pulse repetition frequency (PRF) and the switching time of the analyzer. The liquid crystal variable retarders can switch on timescales of microseconds which is typically within the PRF of most conventional systems requiring at least two laser pulses to detect both surfaces. If more than one detection is required then more laser pulses will be needed extending the required time on target. If the PRF is higher than the variable retarder switch time, then multiple laser pulses for one state could be detected before switching to the next polarization state. Consequently, with just one detector, the time on target for detection may require more time than if simultaneous detection is made with two detectors, but the high-resolution range capability is still maintained.

In one embodiment, the foregoing method can be applied where the PSA is the static component and the PSG has a rotating analyzer placed in the transmit path. In this instance, the PSG utilizes a quarter-wave plate followed by a liquid crystal variable retarder and a polarizer. This allows the PSG to generate any polarization state and can quickly switch between transmitted polarization state. The PSA is then set to analyze a single polarization state.

Optionally and/or alternatively, another solution to avoid electronic dead times, polarization switching, or laser PRF and can achieve high-resolution ranging on a per laser pulse basis is to implement a retarder with a polarization beam splitter, and a second detector. This scheme enables measurement of co-polarized and cross-polarized signals for each backscattered laser pulse to minimize time on target in resolving the water surface and the bottom surface. It also provides an extended dynamic range and can constrain the range of incident angles, as discussed earlier. This retrofit option does not require any moving parts, lessens the number of polarization parts than those described for the single detector, but adds an additional receiver chain to the existing system. An extension of the lidar technique to multiple dimensions using 3-D flash technology, or other means, will also benefit from our technique in improving range resolution.

In one embodiment, a system is adapted to measure elevations, 3-D elevations, or topography of a surface from an airborne platform. The airborne platform may be a satellite, helicopter, plane, drone, dirigible, or any other apparatus configured to operate above ground in the air or space. The system includes a lidar system as described herein. The lidar system is configured with computational equipment configured for determining an elapsed time between two portions of received light from a laser pulse, based on a difference between properties of portions of the received light, and a relative distance based on the elapsed time, wherein the elapsed time is less than a duration of the laser pulse, or within a system's dead time. In one embodiment, the two portions include scattered light from one surface. Optionally, the lidar system may include a retrofitted lidar system with PSG and PSA components as described herein. In a preferred embodiment the PSG components include a transmitter, a retarder and polarizer it is also noted that the original transmitter may be used in such case no additional transmitter is required. Also, in a preferred embodiment the PSA components includes a retarder and polarization beam splitter and optionally a receiver.

Optionally and/or alternatively, the system includes a time interval meter configured to determine a time of flight based on a time that the laser pulse is generated to when a reflection of the laser pulse are received. The time interval meter includes computational equipment configured to digitize the echo received and analyze the waveform, or other means. In one embodiment, the time interval meter is described with reference to U.S. Patent Application Publication No. 2016/0259058, which is hereby incorporated by reference.

Optionally and/or alternatively one or more control electronics is configured to measure topographic elevations using the time of flight. The one or more control electronics for topographic elevations is described with reference to U.S. Patent Application Publication No. 2016/0259058, which is hereby incorporated by reference.

In one embodiment, a system adapted to measure elevations from an airborne platform. The airborne platform may be a satellite, helicopter, plane, drone, dirigible, or any other apparatus configured to operate above ground in the air or space. The system includes a lidar system as described herein.

One embodiment is directed towards a method of mapping a surface topography. The method includes generating a pulse of polarized light and scattering at least some portion of the pulse of polarized light onto one or more surfaces as described herein. Next, scatter light is received from the surfaces as one or more received pulses. The received pulses have one or more portions that overlap in an ambiguous intrapulse overlap portion. The received surface pulses are split or separated into a first component and a second component. The first component and the second component having a relative difference in polarization between each other, wherein the separation removes the ambiguous intrapulse overlap.

The method further includes determining an amount of time elapsed between the first component and the second component and calculating a relative distance between the first surface and the second surface, with computational equipment described herein, based on the amount of time elapsed, thereby achieving a sub-pulse width resolution.

The method further includes dynamically adjusting scanner parameters to keep a spot density relatively constant as at least one of an aircraft flying height and ground terrain elevation changes during a survey mission. In one embodiment, the dynamically adjusting the scanner and type of scanner is described with reference to described with reference to U.S. Patent Application Publication No. 2016/0259058, which is hereby incorporated by reference.

EXAMPLES

Without intending to limit the scope of the invention, the following examples illustrate how various embodiments of the invention may be made and/or used.

Example 1

Figure 6A:
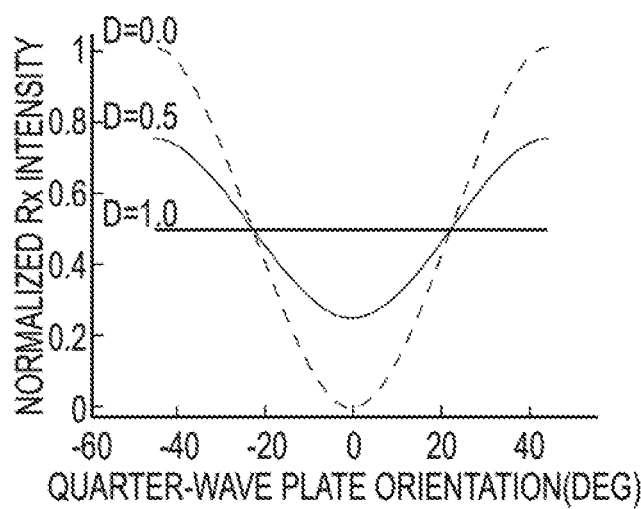
FIG. 6A illustrates the normalized received intensity of light for targets of varying degrees of depolarization.

A simulation of the normalized received intensity for targets of varying degrees of depolarization d is illustrated in FIG. 6A. The sinusoidal nature of received light from a polarization preserving target 513 (curve labeled d=0) is evident, while the detector 536 registers a constant intensity of 0.5 for a completely depolarizing target 513 (curve labeled d=1). By translating the quarter-wave plate 528 from an orientation θ of π/4 radians to θ of 0 radians, scattered signals are modulated between polarized water surface and volume of the water body returns and depolarized floor returns.

Bathymetric measurements were made at the University of Colorado, Boulder, using a lidar system 504 as illustrated in FIG. 5. The transmitter consisted of a CW-diode pumped, passively Q-switched Nd:YAG microchip laser. The laser outputs 2.45 microjoule of linearly polarized 532 nm light at a repetition rate of 14 kilohertz and pulse width of 450 picoseconds. A half-wave plate aligned the laser 508 light polarization to the vertical transmission plane of a 532 nm PBS. Light exiting the PBS was transmitted through a rotatable quarter-wave plate toward a controlled target consisting of a column of water on top of a polarization-altering floor substrate. Scattered laser light received by the instrument was collected with a detector comprising a photomultiplier tube in photon counting mode. The output PMT voltage was analyzed on an oscilloscope with 550 ps timing resolution and stored for post-processing.

Figure 6B:
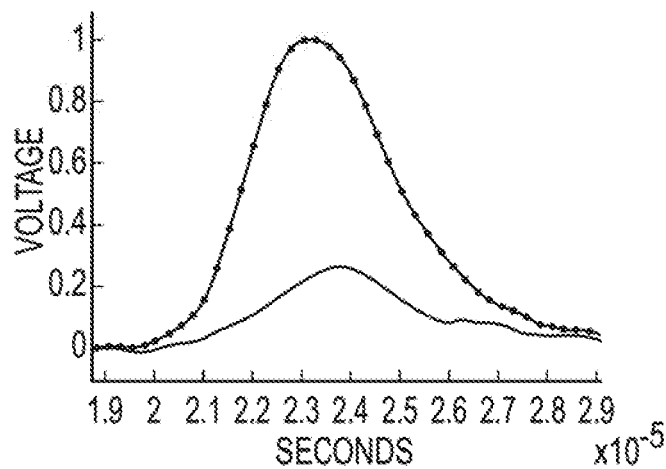
FIG. 6B illustrates normalized detector voltage data acquired during the reception of backscattered signals using an analog system for the water surface (dotted) and floor (solid)

Data acquired during reception of scattered signals from the target for 3 centimeter deep water as measured physically, are presented in FIG. 6B. The quarter-wave plate was positioned in θ orientations of π/4 and 0 radians. The received intensity from the PMT analog signal illustrates reduction of polarized signals from the water (dotted-solid) when the quarter-wave plate fast axis is aligned to the vertical PBS polarization transmission plane to measure polarization-altered floor signals (solid).

Figure 6C:
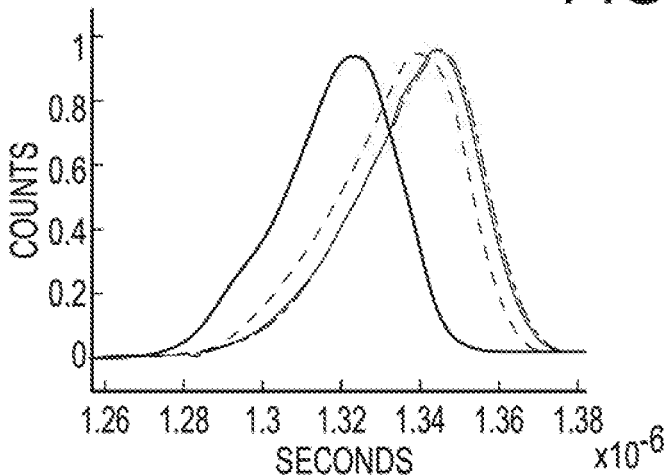
FIG. 6C illustrates normalized timing data acquired during the reception of scattered surface and floor signals using a digital system for 3 centimeter water depth (solid) and 1 centimeter water depth (dashed)

The experiment was repeated using a digital lidar receiver with 27 picosecond timing resolution, as illustrated in FIG. 6C. To illustrate the ultimate resolution of the timing unit, data were again taken for 3 centimeter (solid) and 1 centimeter (dashed) water depths.

Taking into account the refractive index change of water n relative to air, water depth h is calculated as:

$$h = \frac{c\Delta t}{2n} \quad (8)$$

where the time delay $\Delta t$ is evaluated by differencing the FWHM points (horizontal dashed) of the surface and floor curve trailing edges. The results presented in FIG. 6C produced depth measurements d of 2.7 cm and 1.2 cm. The 27 ps resolution of the timing unit imposes a ±3 mm uncertainty on the water depth estimate. Therefore, the observed depths are well within the uncertainty of the measurement.

Transmission of vertically polarized light through the PBS and translation of the quarter-wave plate orientation modulates received signals between polarization preserving water surface and body returns and polarization-altered floor scatter. By removing water surface and column effects through polarization modulation, bathymetric ambiguities between water surface and body floor returns are negated. As a result, the fundamental lower limit on shallow water bathymetry imposed by system bandwidth limitations is reduced beyond traditional techniques using a single detection channel. The technique presented here has demonstrated resolution of 1 cm water depth.

Although embodiments described above discuss the inclusion of a light source comprising a laser, it should be appreciated that the light source is not required to comprise a laser. Moreover, transmission and reception of light may be through separate apertures. According to such embodiments, a polarizing beam splitter need not be included. For example, the reception channel can instead include a filter or other polarization discrimination element. Moreover, although examples have discussed the transmission of light having particular polarizations, other polarizations can be used. In particular, it is sufficient to transmit polarized light, and receive polarization-altered light for discriminating polarization preserving and polarization-altering scattered light. In addition, although methods and systems herein have discussed the disclosed polarization techniques in connection with lidar, embodiments of the present invention also have application to guided wave optics, optical time domain reflectometry, fiber optic sensor networks, and/or other applications as known now or may be later derived.

Example 2

Figure 7:
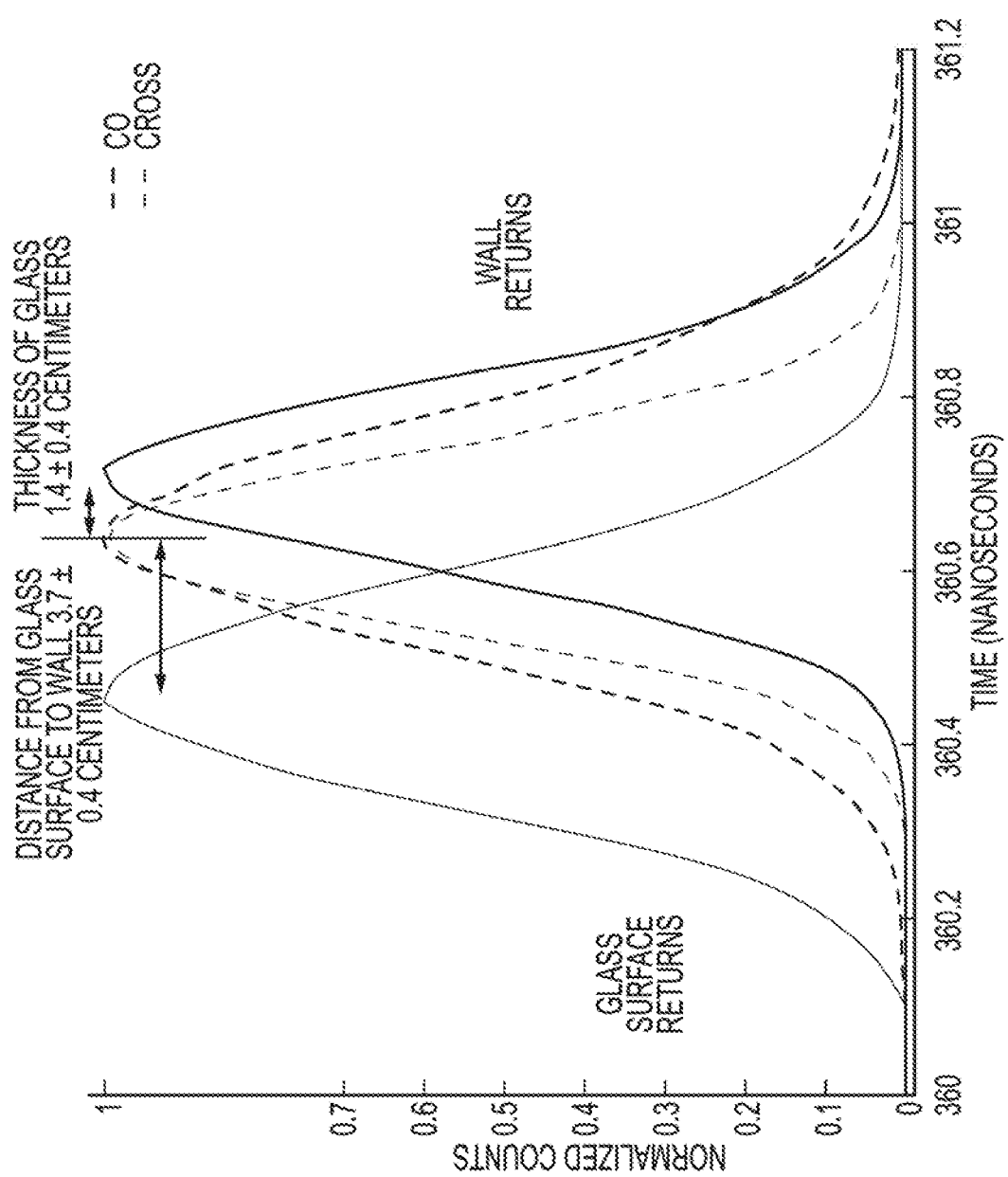
FIG. 7 illustrates the measurement of depth of semi-transparent media with sub-pulse width resolution.
Figure 7:
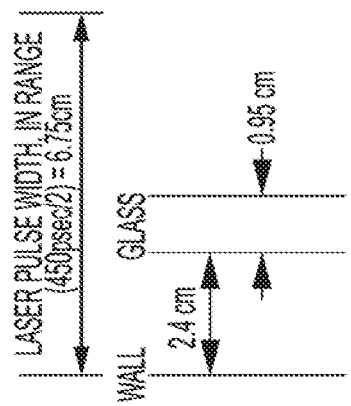

FIG. 7 illustrates the result of an experimental setup measuring depth of semi-transparent media with sub-pulse width resolution. Here, a laser pulse width of 450 ps was used, corresponding to a pulse length (range) of 6.75 cm. A piece of glass with polarization preserving and semi-transparent surfaces and with a thickness of 1.4 cm was placed in front of a polarization-altering (depolarizing) wall at a distance of 3.4 cm. A lidar system, similar to lidar system 400 according to one embodiment of the invention, was placed at a distance of 30 m from the media.

First, a control measurement was made with the piece of glass removed. The dotted lines in the graph show the relative distance of the wall from this control measurement. Both the co-planar and cross-planar polarization components in this measurement are scattered from the wall and register the same distance after being calibrated (dotted lines).

Next, a measurement is made with the glass setup as described. The solid lines in the graph show the relative distance of the glass and the wall from this measurement. The co-planar polarization component is scattered from the glass surface. The cross-planar polarization component is produced by scattering from the wall. The distance from the glass surface to the wall can then be determined based on previous embodiments of the invention. Further, in this measurement, the cross-planar polarization component scattered from the wall is further delayed by the refraction index of the glass. Therefore, a measurement on the thickness of the glass can also be determined by this delay in this second measurement.

Both the distance from the glass surface to the wall and the thickness of the glass can be determined using both the measurements from the control experiment and with the glass setup. For the distance of the glass first surface to the wall, since the cross-planar polarization component is scattered off the glass surface in the experiment with the glass setup, the distance is the difference between the wall measurements in the control experiment and the cross-planar polarization component in the experiment with the glass setup. The calculated distance is 3.7 cm±0.4 cm (actual measured distance from wall to first glass surface is 3.4 cm±0.1 cm). For the thickness of the glass, since the co-planar polarization component is scattered off the wall in the experiment with the glass setup and further includes the delay by the refraction index of the glass, the thickness is the difference between the wall measurements in the control experiment and the co-planar polarization component in the experiment with the glass setup. The calculated thickness is 1.4 cm±0.4 cm. Comparing the result of the calculated distance (3.7 cm) and thickness (1.4 cm) with the pulse width of the laser (6.75 cm), both the distance and the thickness measurements are confirmed to be at sub-pulse width.

Example 3

FIG. 8 illustrates the result of an experimental setup measuring water clarity with sub-pulse width resolution. Here, the lidar system operating at 532 nm was positioned 7 ft above a tank of water and pointed down into the water. The tank of water also contained 1.5 cu. ft. of sand, which could be stirred up in order to introduce turbidity into the water. The water was 25 cm deep above the sand bottom surface. This experimental setup demonstrated that the invasive lidar technique is able to measure extinction through turbid media.

First, a second green laser system was used to determine the vertical distribution of turbidity in the water to check on the uniformity of the turbidity through the water column. This laser system was directed horizontally through the water tank to a detector to record the intensity of light that passed through the water. As the density of suspended sand was increased through stirring, the detector sensed a large decrease in laser light that was transmitted through the water. By vertically translating this horizontally oriented laser/detector system, it was confirmed that the amount of transmitted light was independent of the vertical position of this laser on the time scale of a few minutes. This suggests that the density of suspended sand was independent of vertical position and uniformly distributed through the water column.

Second, the sub-pulse width resolution technique using a lidar system according to an embodiment was applied to the fully mixed turbid water by positioning the lidar above the tank. A scattering target (a block of wood) was attached to a rod and progressively lowered into the tank of turbid water. At 2 cm intervals the target was held steady in the water, and the peak intensity of the backscattered laser light off the target was recorded on an oscilloscope, bypassing the acquisition system described in FIG. 4 (e.g., CFD 441 and TDC 442) and FIG. 8 (e.g., CFD 841 and TDC 842) in order to achieve a more direct measurement of the intensity.

Figure 9:
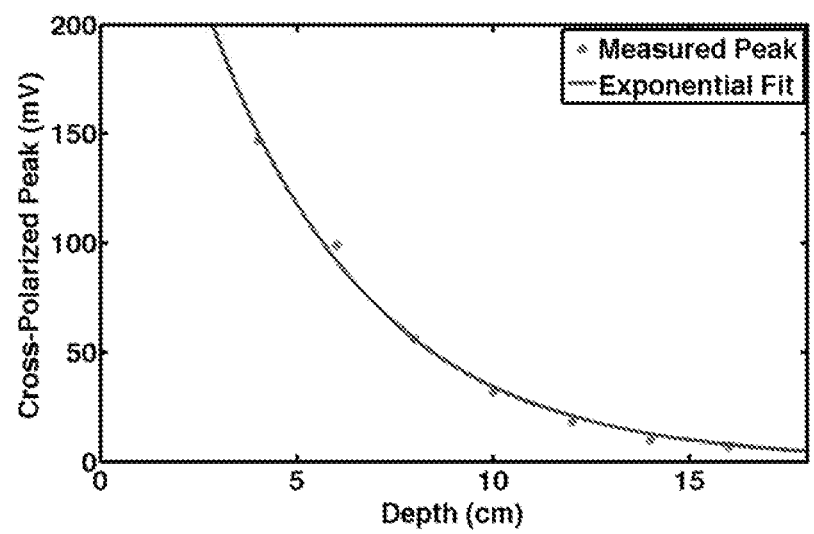
FIG. 9 illustrates the measurement of water quality in terms of turbidity of semi-transparent media with sub-pulse width resolution.

As the scattering target was lowered deeper into the water, the returned signal decreased due to the turbidity level of the water. Using a narrow field-of-view and observing the change in intensity with range, a two-way extinction measurement of $k=0.25$ cm$^{-1}$ was calculated by fitting the measurements to an exponential function $e^{-kx}$, as seen in FIG. 9. This two-way extinction coefficient corresponds to a one-way extinction through the water of $k=0.25/2=0.125$ cm$^{-1}$. This is much larger than the absorption coefficient of water for the 532 nm laser light (~0.001 cm$^{-1}$), indicating that the extinction observed is largely due to the scattering of light from the suspended fine-grain sand present in the water. This measurement provides a direct means of determining the level of turbidity of the water and can be used as important information in determining the multiple scattering attributes of optically dense media.

In this example, calm but turbid water conditions were emulated in the lab. The main concern is the achievable depth for a given amount of extinction along the laser beam's water path. Turbid water includes small particles suspended in the water. Working in shallow waters of less than a few meters does have its benefits as the level of extinction by the water is significantly reduced leading to high signal-to-noise (SNR) signals for determining surface and bottom positions. Of course, particulates suspended in the water can add to the extinction by scattering and absorption as their number density increases, leading to levels of turbidity that may be enough to prohibit signals from reaching the bottom.

Because the lidar system and techniques have such high depth resolution less than about one centimeter, this example highlights turbidity measurement capabilities of the lidar system and techniques, or a reflecting transmissometer, that can determine the total extinction along the path and relate that extinction to the maximum detectable depth. By lowering a scattering target through the water at intervals of about 2 centimeters, a profile of extinction was retrieved—essentially applying our novel technique to create a reflecting transmissometer. This is illustrated in FIG. 9 for highly turbid water produced in the lab. A two-way extinction value of 0.25 cm$^{-1}$ was derived by fitting the observations to an exponential. This value is ten times more turbid than most lakes and rivers. Although this experiment shows a limiting depth of about 15 cm in this highly turbid case, this is not the limiting depth of the system because the system was not optimized for maximum depth during the experiment. These observations enable quantifiable estimates of turbidity to test light propagation and opens the possibility of using the Lidar technique to provide water opacity measurements.

Example 4

Figure 11A:
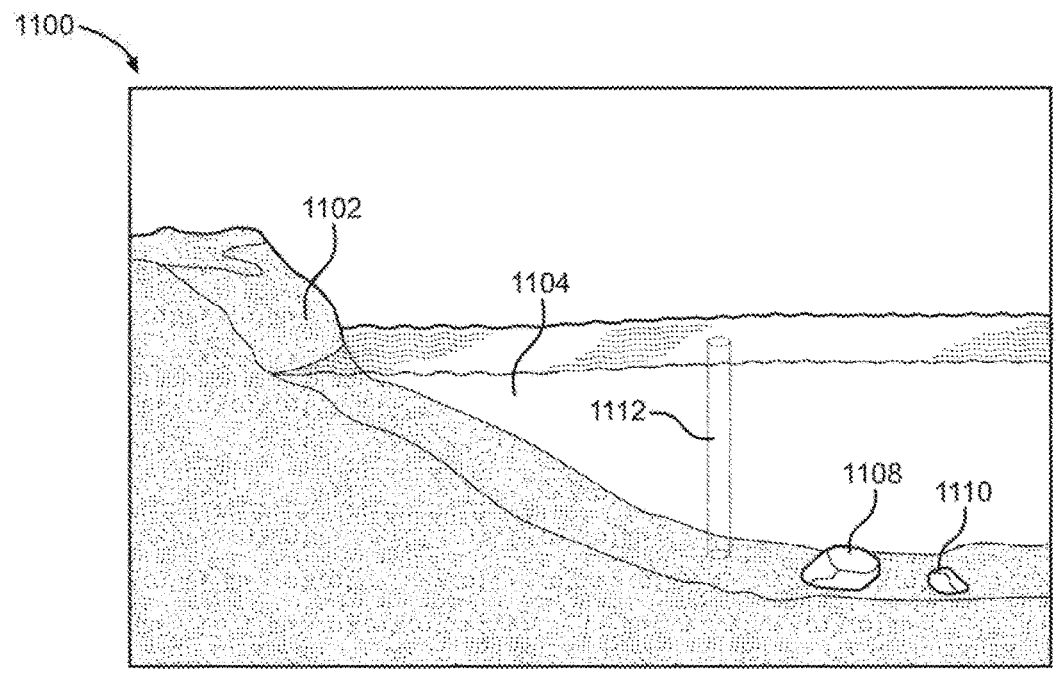
FIG. 11A illustrates an experimental setup of Example 4 configured to measure the height of at least two surfaces in still substantially clear water.

FIG. 11A illustrates an experimental setup of Example 4 configured to measure the height of at least two surfaces in calm and substantially clear water. In this example a lidar system configured to map the height of at least two surfaces. The experimental setup used was an aquarium 1100 shown in FIG. 11A. The aquarium 1100 was filled with about 15 gallons of water 1104 and partially filled with 100 pounds of Quickrete Play Sand 1102. The sand 1102 was arranged to have a slope of about 35 degrees with a portion of the sand in and out of the water 1104 the slope was configured to mimic an entrance to a body of water, e.g., ocean or lake. A first rock 1108 and second rock 1110 are arranged on a lower portion of the sand 1102. The first rock 1108 has a diameter of about 5 cm and the second rock 1110 has a diameter of about 3 cm. These rocks are spaced about 5 cm apart from each other.

In this example, the lidar system configured to map the height of at least two surfaces includes a lidar system is described with reference to FIGS. 4 and 8. The system was arranged about 7 feet above the top of the tank.

The system includes a pulsed laser (TEEM Laser SNG-03E) operating at 532 nm at 8 KHz repetition rate with 0.5 ns pulse width, with highly vertical polarization (ThorLabs glan-thompson polarizer GT15A), a telescope receiver (made up of a ThorLabs AC508 achromatic lens and a ThorLabs AC254 achromatic lens) with a polarization beam splitter (ThorLabs PBSW-532 and Thorlabs GT15A) and two PIN photodiode detectors (ThorLabs Det10a), one detecting co-polarized light while the other detects cross-polarized light. The acquisition system is described in FIG. 4 (e.g., CFD 441 and TDC 442) and FIG. 8 (e.g., CFD 841 and TDC 842) in order to achieve a more direct measurement of the intensity. The lidar system can provide about ±3 mm uncertainty in depth while nadir pointing, even though the effective range resolution of the laser pulse was about 7 cm and detector bandwidths were about 40 cm. In operation, photon-induced electrical pulses from each polarization state are passed through the CFD to produce a digital pulse for the TDC. The CFD/TDC operation provides precise and stable time tagging (a few picoseconds of jitter) with first-in, first-out (FIFO) mode of acquisition such that a time tag for each detected pulse is recorded in real time. This results in sub-nanosecond time resolution, low data rates, and significant flexibility in post data handling. This can be applied either in photon counting or Geiger modes. Acquisition dead time is not an issue as we are detecting surface and bottom return pulses on separate detector/acquisition paths.

Figure 11B:
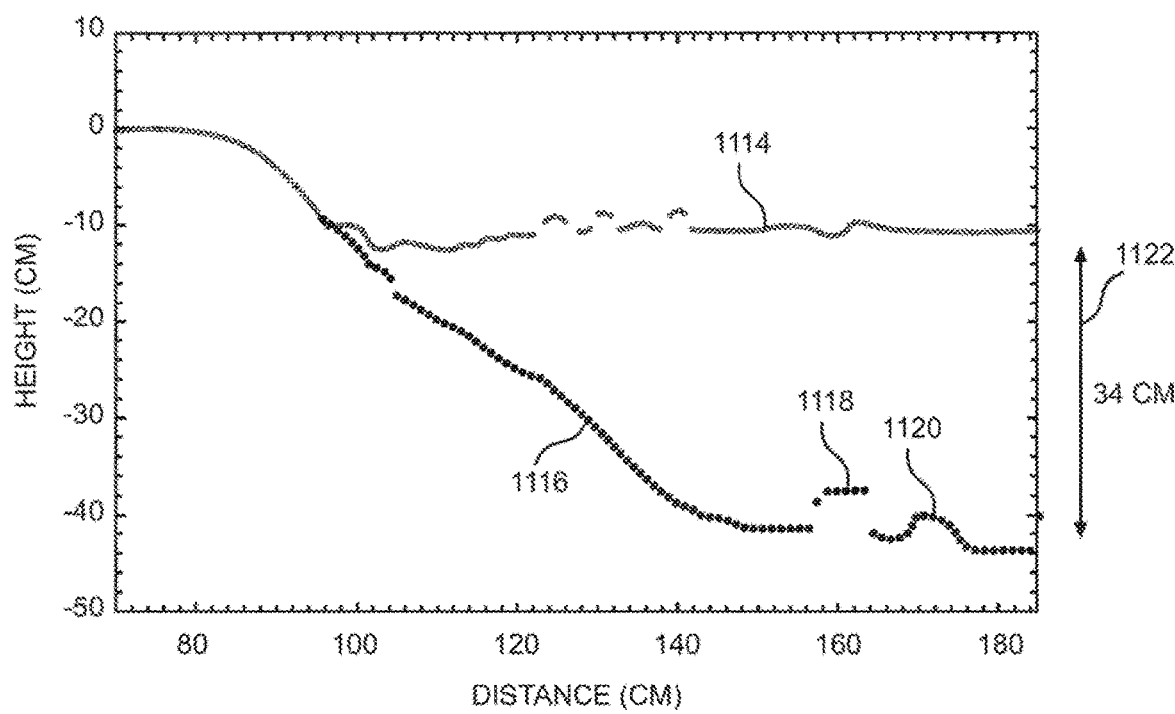
FIG. 11B illustrates a graphical representation of exemplary results of Example 4.

Referring to FIG. 11B, the maximum depth of water in the aquarium was about 34 cm. Using the lidar technique described herein, the top and bottom surfaces were resolved with an accuracy of better than a centimeter. The raw data from this experiment are shown in lower plot of FIG. 11B. The presence of the beach is indicated in both the co-polarized and cross-polarized detector channels but as water becomes present the signals deviate. The co-polarized channel registers the water surface, shown by line 1114, and the cross polarized channel registers the sandy bottom surface line 1116. The y-axis scale is in centimeters and we are able to discern features on the order of about 1 cm or less. The laser pulse width is about 0.5 ns, or a length of about 14 cm in water. We are able to achieve resolution less than a duration of the pulse from the lidar system using our technique. This far exceeds current lidar capabilities and, for all known existing systems, this tank of water would not even be detected as a water body. Fine details can be observed of the sandy bottom by line 1116 at objects 1118 and 1120. The identification and relative size of the two rocks 1118 and 1120, respectively, is clearly evident in FIG. 11B.

In operation the lidar system was placed 7 feet above an aquarium 1100, oriented with the laser pointed directly down at the aquarium (the laser light 1112 can be seen interacting with the water). Horizontal translation of the system enabled longitudinal mapping of the scene. The transition from land to shallow water can be identified in the data presented in the bottom portion of FIG. 11B, and the first rock 1108 and second rock 1110 placed in the aquarium are mapped with sub-centimeter resolution. Referring now to FIG. 11B, the results of the scan are shown in a plot having an on the y-axis height in cm and x-axis having distance in cm. The surface of the sand 1102 has profile 1116 it clearly illustrates the profile of the first rock 1118 and the profile of the second rock 1120 are shown. Moreover, the profile of the surface of the water is shown 1114. Finally, the maximum height 1122 of the water is shown as 34 cm.

As shown in FIGS. 11A and 11B, the shallow water lidar system provided measurements of two surfaces, the water surface and the sand surface, under clear and calm water conditions. The results are precise to less than 1 cm, and a comparison to measurements with a ruler placed in the water reveal accuracy also less than 1 cm. The two rocks 1108 and 1110 are measured with a ruler to have about a 5 cm height and about a 3 cm height, respectively, and the lidar system also measures them at 5 cm and 3 cm above the sandy surface. We achieved sub-centimeter horizontal resolution with slow translation of the lidar horizontally across the scene. This example demonstrates capability of the lidar system when measuring two or more surfaces at centimeter vertical resolution in still water. Any bottom object can be discerned with centimeter horizontal resolution. The detailed measurement enables mapping of submerged objects on bottom surfaces.

Example 5

Figure 12A:
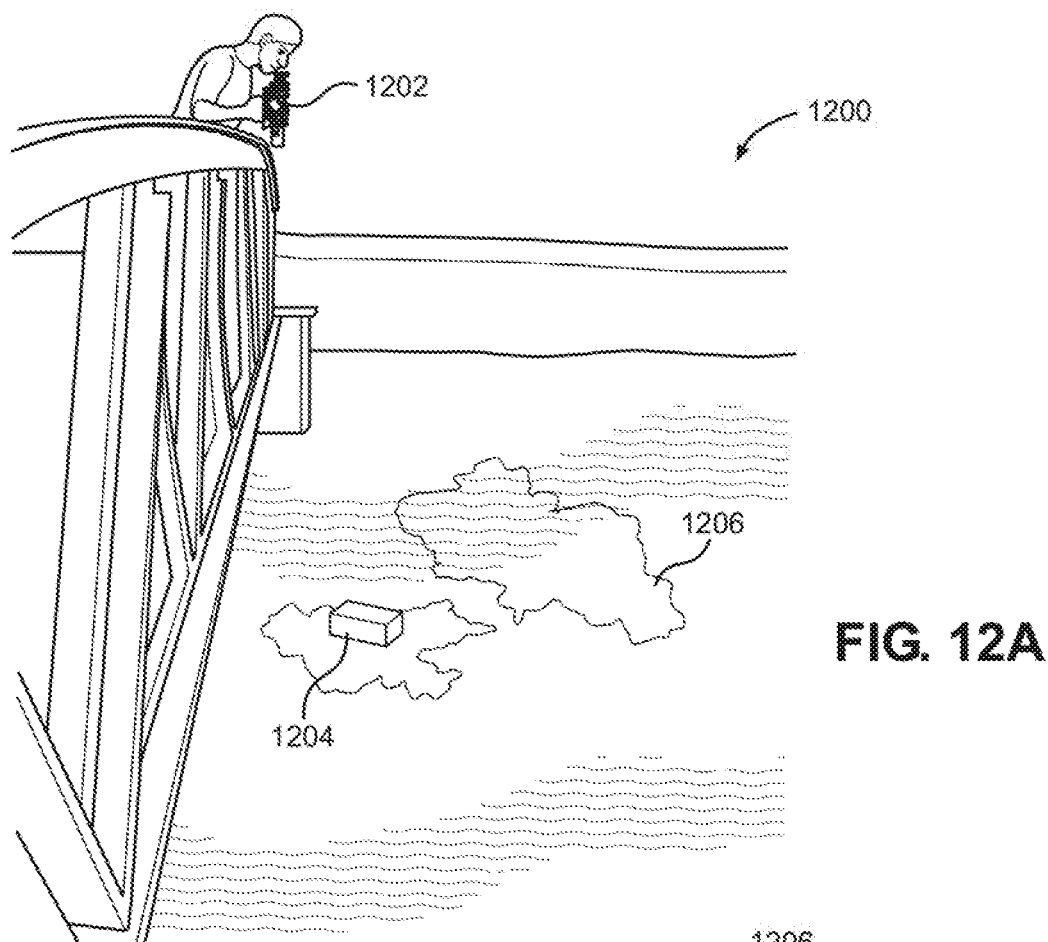
FIG. 12A illustrates an experimental setup of Example 5 configured to measure the height of at least two surfaces in slow flowing water.
Figure 12B:
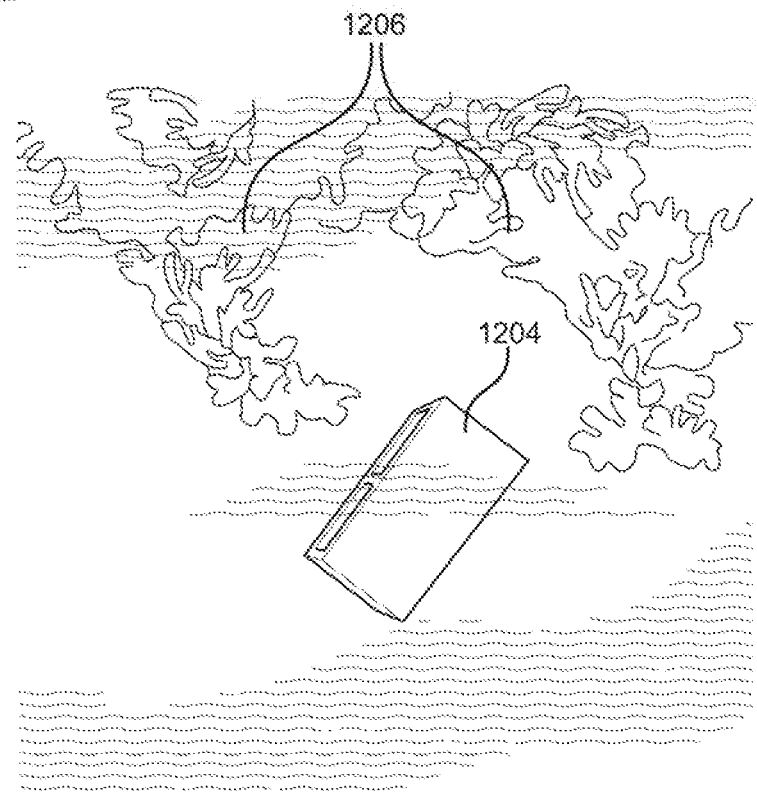
FIG. 12B illustrates an exemplary top down view of experimental setup of Example 5.

This example illustrates a lidar system configured to map the height of at least two surfaces in a slow flowing outdoor aqueous environment 1200. The experimental setup used was operating a lidar system 1202 described with reference to Example 4 over a slow flowing shallow stream in Boulder, CO as shown in FIG. 12A. The lidar system 1202 also included an Inertial Measurement Unit (IMU) (VectorNav VN-200), which was attached to the lidar system on a fixed mount bolted to an aluminum plate, to record changes in pointing and position. An image of submerged objects is given in FIG. 12B.

On the bottom of the stream was at least a concrete block 1204 placed in the stream and natural vegetation of plants 1206. In this example, the heights of at least two surfaces were mapped with a lidar system including operating the lidar and the IMU together. In operation, the lidar system 1202 was rotated by hand to map out the stream bathymetry and identify submerged objects of plants 1206 and the concrete block 1204. More specifically, as the lidar system 1202 was tilt-scanned we mapped out the underwater topography.

The top surface of the smooth water surface was found by pointing the lidar in a near-nadir direction and measuring time of flight for top surface and bottom surface reflections simultaneously. Using the lidar for off-nadir data and the position and pointing data from the IMU, we created a point cloud of the returned pulses. The IMU recorded "pitch" and "roll" of the lidar sensor, which can be interpreted as an altitude and azimuth. The lidar records ranges to two surfaces. Range and two angles define locations in the spherical coordinate system, which can be converted to XYZ coordinate system using standard spherical-to-Cartesian transformations. This was used to convert the measurements into a lidar point cloud referenced at the lidar position. This point cloud displays the concrete block and some nearby plants, and the resulting data has been used to measure the size and shape of the concrete block as described herein.

Figure 12C:
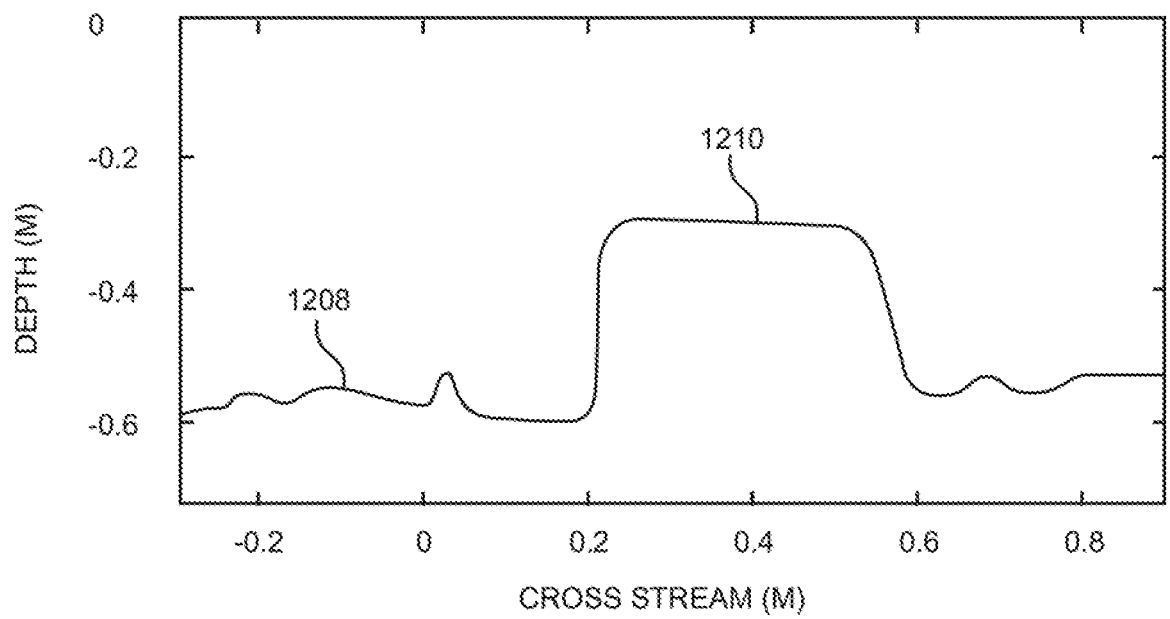
FIG. 12C illustrates a two-dimensional graphical representation of exemplary results of Example 4.

Referring to FIG. 12C illustrates a graph with a line 1208 showing the cross-section highlighting the submerged concrete block 1210 the graph includes a depth (m) on the y-axis and cross-stream (m) on the x-axis. Referring to FIG. 12C, shows a three-dimensional map with a cross stream x-axis (m), downstream y-axis (m) and depth z-axis (m), that reveals the concrete block 1212 in the foreground as well as plants 1214 that are shown in the upper part.

Figure 12D:
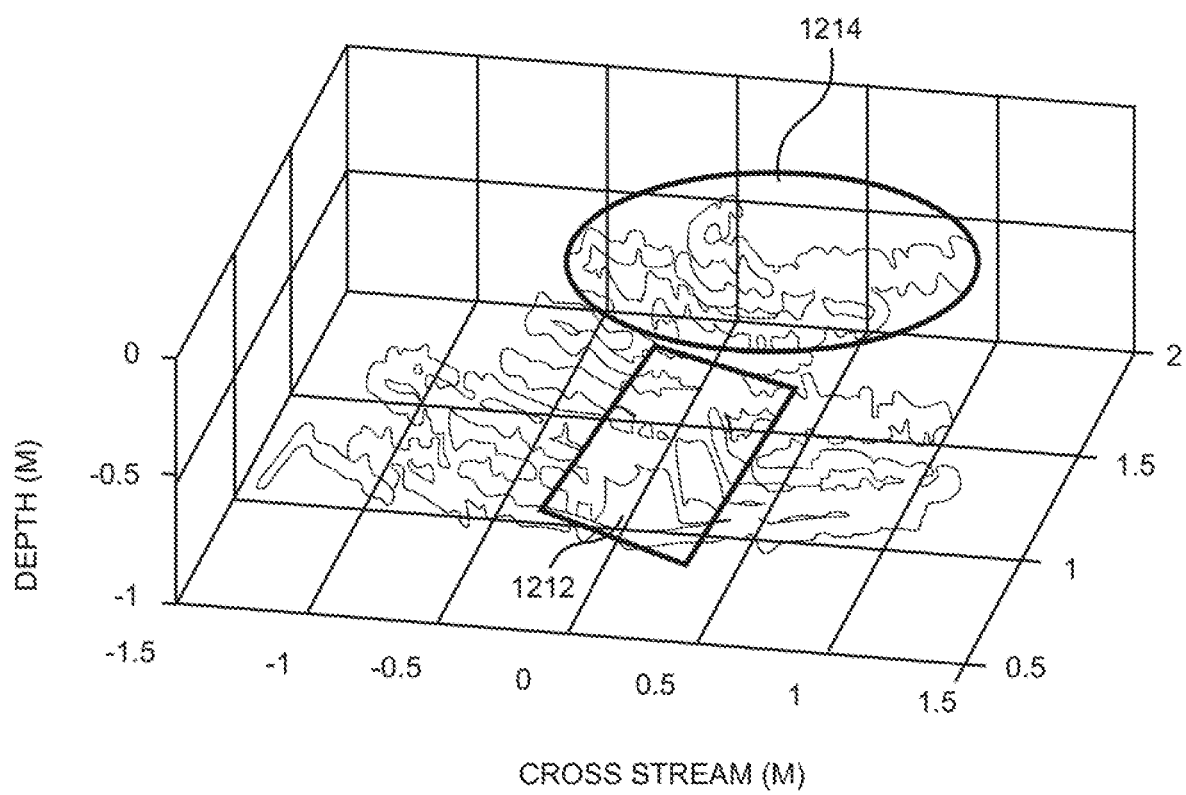
FIG. 12D illustrates a three-dimensional graphical representation of exemplary results of Example 4.

The precision of the measurement in FIG. 12C is 1 cm or less in height. Due to inaccessibility of the water we were unable to measure accurate ruler measurements in this location. The horizontal resolution is displayed in FIG. 12D and was limited by the handheld nature of the test. Along the lidar track, as shown in FIG. 12C, the resolution is greater than 1 cm. The tracks were made to be roughly 5 cm apart.

This example demonstrates the applicability of the technique in outdoors environmental conditions. The combination of the lidar and IMU measurements provide centimeter resolution in the vertical and horizontal directions when the object is submerged in over 1 meter of water.

Example 6

This example illustrates vertical and horizontal mapping with a lidar system providing accurate range to the surface and bottom, water depth, and subsurface mapping of various features in a flowing river. The experimental setup included a lidar system 1302 described with reference to Example 4.

Figure 13A:
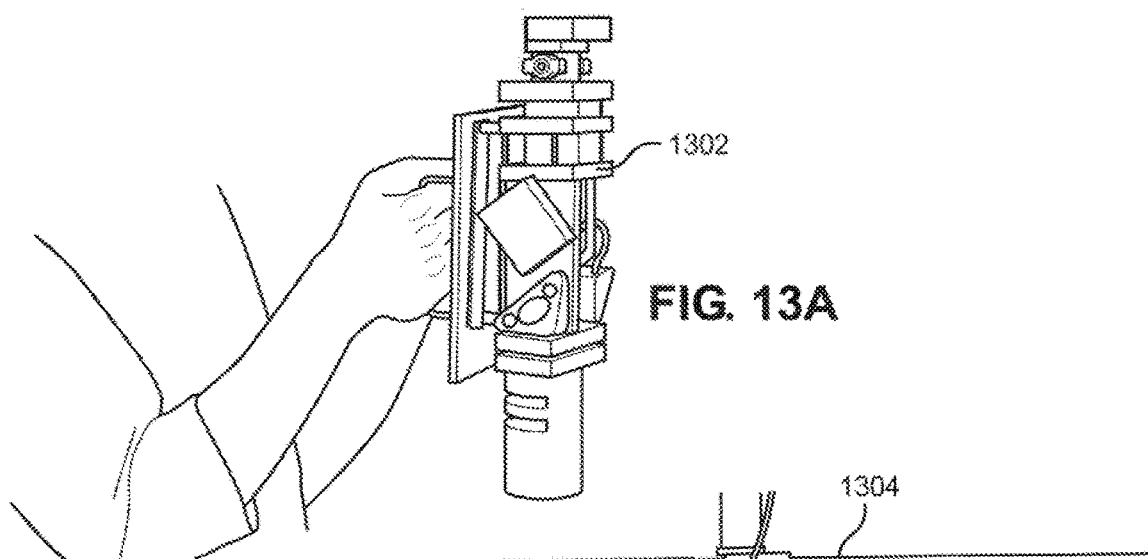
FIG. 13A illustrates a lidar system used in example 5.
Figure 13B:
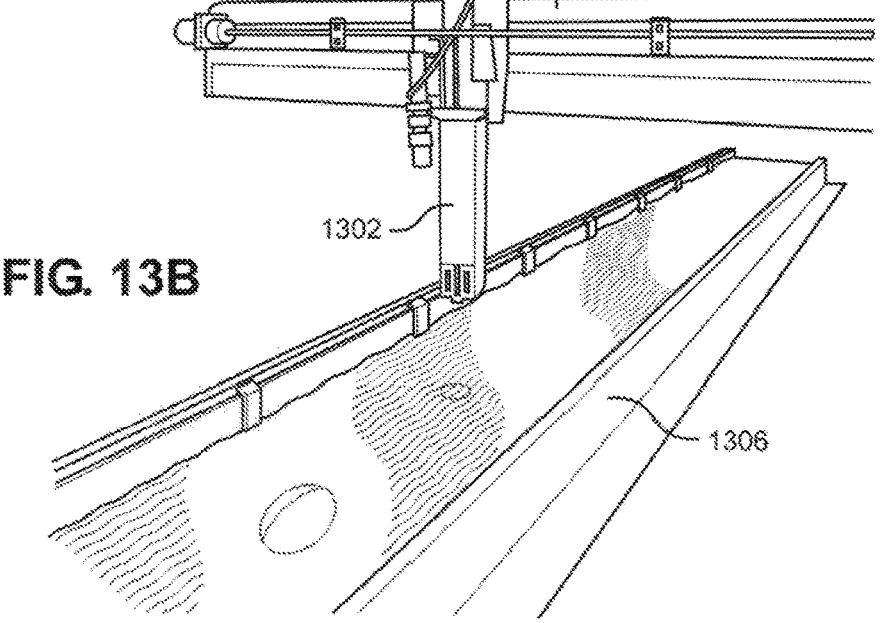
FIG. 13B illustrates a lidar system arranged over an experimental setup of example 5.

The lidar system 1302 was mounted on a scanner 1304 over a flowing river scene setup 1306 as shown in FIGS. 13B and 13F. The lidar system 1302 was positioned three feet above the water surface pointing down at the water on a scanner 1304 (custom scanner built by USGS personnel from Velmex parts). There was a small amount of alignment necessary in order to collect reflected light in both polarization channels from this close range. Electronics and computer were placed on the horizontal strut behind the lidar system. The scanner 1304 allows the lidar 1302 to move up, down, and across the entire river scene which encompasses a horizontal size of 45 cm×500 cm.

Referring to FIG. 13F, the flowing river scene 1306 is shown. The river scene 1306 was constructed in a channel configured to mimic a flowing river. The channel had a dimension of height 20 cm, width 50 cm, and length 800 cm was constructed from wood having a bottom 1334 made from plywood, first side wall 1332 made from 2×4s, a second side wall 1336 made from 2×4s. A 5 cm-high dam was arranged on a lower end of the channel causing a slight reservoir to build up, causing the water depth to increase as the water flowed downstream. The whole flume was tilted at 1.25 degrees.

Water was added to height at a first end of about 7 cm and second end of 18 cm and circulated from the lower part of the flume back up to the upper by a pump at a flow rate of about 1 cubic foot per second. A number of rocks 1322 and other objects are placed indiscriminately on the bed of the channel to provide submerged objects to detect. Shown in the bottom left of this image is half of a Nerf football 1340 that is attached to the bed surface. In the middle of the image is a concentrated single-layer bed of rocks 1322. A tape measure runs along the side of the flume in order to verify horizontal distance measurements.

The flowing river scene was configured a small indoor river (flume) used to investigate how sediment and underwater structures affect and are affected by flowing water. Different size rocks were placed into the riverbed to provide submerged objects to detect, and then flowing water was circulated through the flume creating a rough water surface. Rock 1316 was a whitish in color having a dimeter of about 10 cm to about 15 cm, rock 1318 was greyish in color having a dimeter of about 10 cm to about 15 cm, and rock 1320 was reddish in color having a dimeter of about 10 cm to about 15 cm as shown in FIG. 13D. Rocks, 1316, 1318, and 1320 were oriented in a triangular fashion in the stream. These rock features 1316, 1318, and 1320 served to create a turbulent flow while water was running in the flume and also served as objects to identify and measure with the lidar system.

A bundle of rocks 1322 each having a diameter of about 5 cm and two larger rocks 1324 having a dimeter of about 10 cm to about 15 cm were oriented in the middle portion of the stream as shown in FIG. 13E. The larger rocks, 1324, were used to anchor the smaller bundle of rocks 1322.

In this example, the mapping was conducted by the lidar system described with reference to example 4. The system was operated by one person and the data collected using a Windows PC laptop. The lidar was turned on prior to operating the scanner and operated in the same configuration as in Example 5 with two differences: 1) the Lidar was attached to the scan system via a custom aluminum mounting plate 2 feet above the flowing water, as shown in FIG. 13B, and 2) the detector for the cross-polarized channel was replaced with an APD (ThorLabs APD430a). The scan system was operated to perform repeatable motions up, down, and across the flume.

Figure 13C:
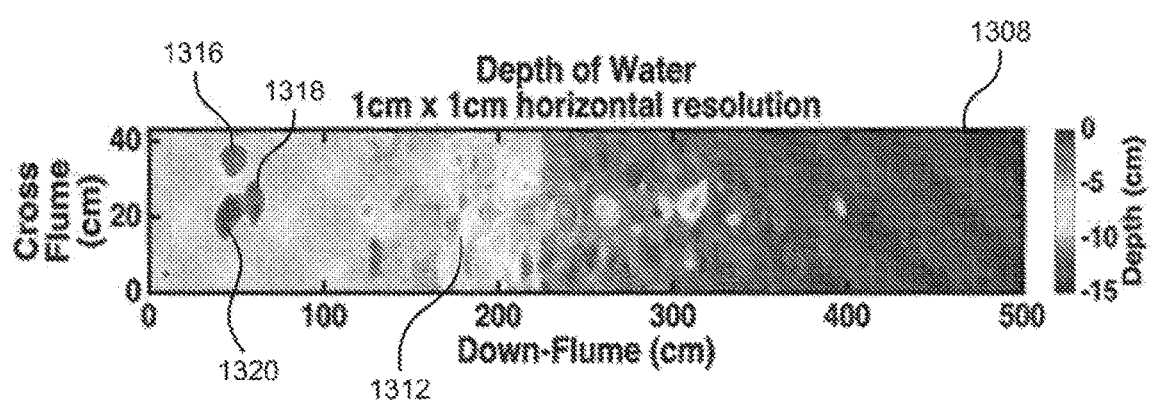
FIG. 13C illustrates a graphical representation of exemplary results of Example 5.

The lidar time-of-flight (TOF) data for each channel were adjusted for differences in optical and electrical timing paths by illuminating a solid target below the mounted lidar. In this example, the plywood bed, before water began to flow, was used. By accounting for this time difference, the two lidar receiver channels recorded the same TOF to the plywood bed. Water began to flow through the flume. Lidar TOF data from the surface measurement and from the bottom measurement were differenced and the index of refraction of 1.33 was applied to determine depth using equation 8. The scanner x-y position was referenced to the lidar depth estimate using the scanner encoder data and a common computer time. The lidar depth estimate with the corresponding computer time was then assigned to the x-y position on the flume. One example of a scan pattern resulted from the following steps: 1) start at the downstream left edge of the flume 2) move the scanner upstream for about 700 cm, 3) step 1 cm across the river, 4) move the scanner downstream for about 700 cm, 5) step 1 cm across the river, 6) repeating steps 2-5 until the entire flume crossed the entire flume. An output from combining the lidar and scanner data is shown in FIG. 13C, referring to this figure it is shown the derived water depth over the extent of the flume illustrating depth in centimeters and the cross-flume and down-flume is given in centimeters.

Figure 13G:
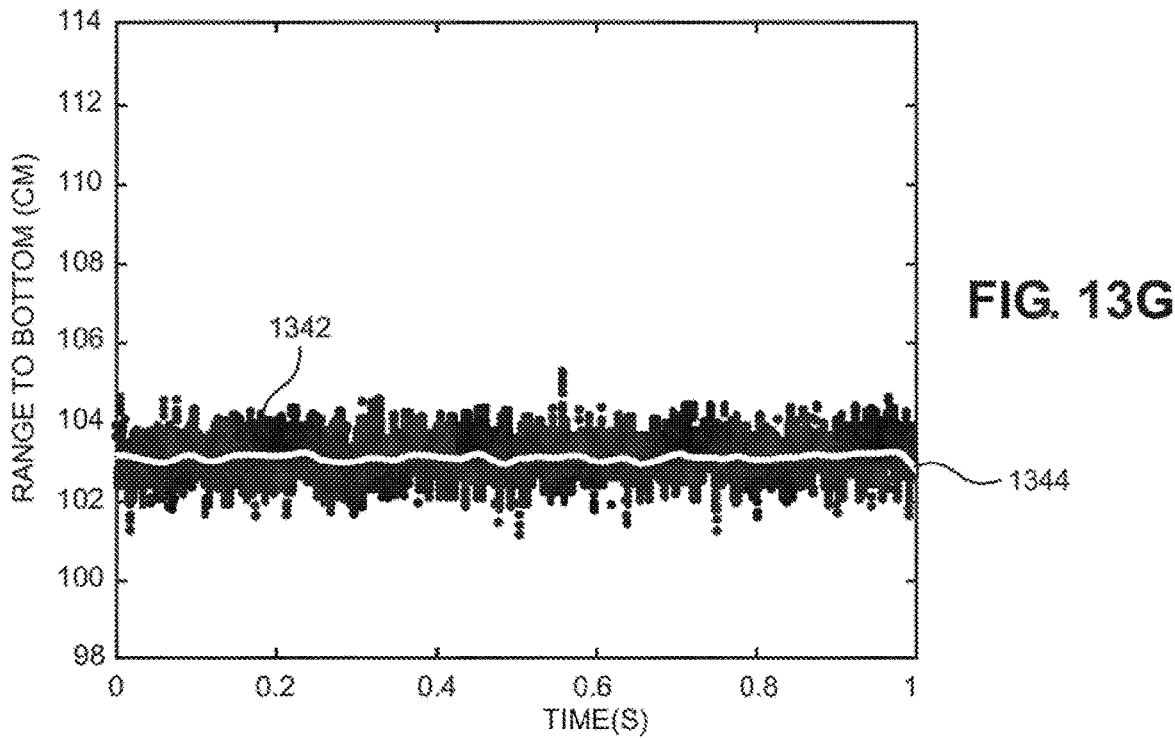
FIG. 13G illustrates a graphical representation of exemplary results of example 5.

FIG. 13G illustrates a graph with an x-axis in [seconds] and y-axis in [cm] showing range to bottom with no water. More specifically, the graph shows a range to a single location without water present as a function of time. Over the course of 1 second roughly 8000 laser pulses are fired. The shot-to-shot standard deviation is 5 mm. The individual laser shots 1342 are depicted and a rolling average 1344.

Figure 13H:
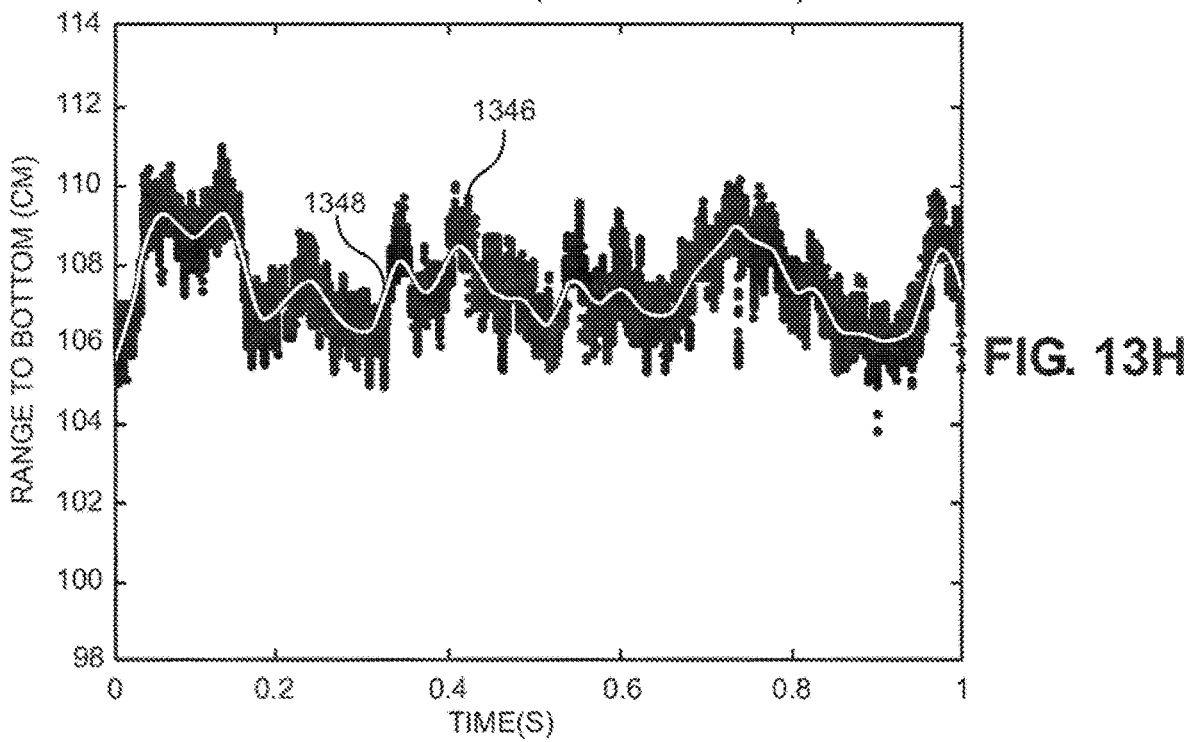
FIG. 13H illustrates a graphical representation of exemplary results of example 5.

FIG. 13H illustrates a graph with an x-axis in [seconds] and y-axis in [cm] showing range to bottom through flowing water at flowrate of about 1 cubic foot per second [cfs] More specifically, the graph shows a range to a single location flowing water as a function of time. Over the course of 1 second roughly 8000 laser pulses are fired. The individual laser shots 1346 are depicted and a rolling average 1348.

Figure 13I:
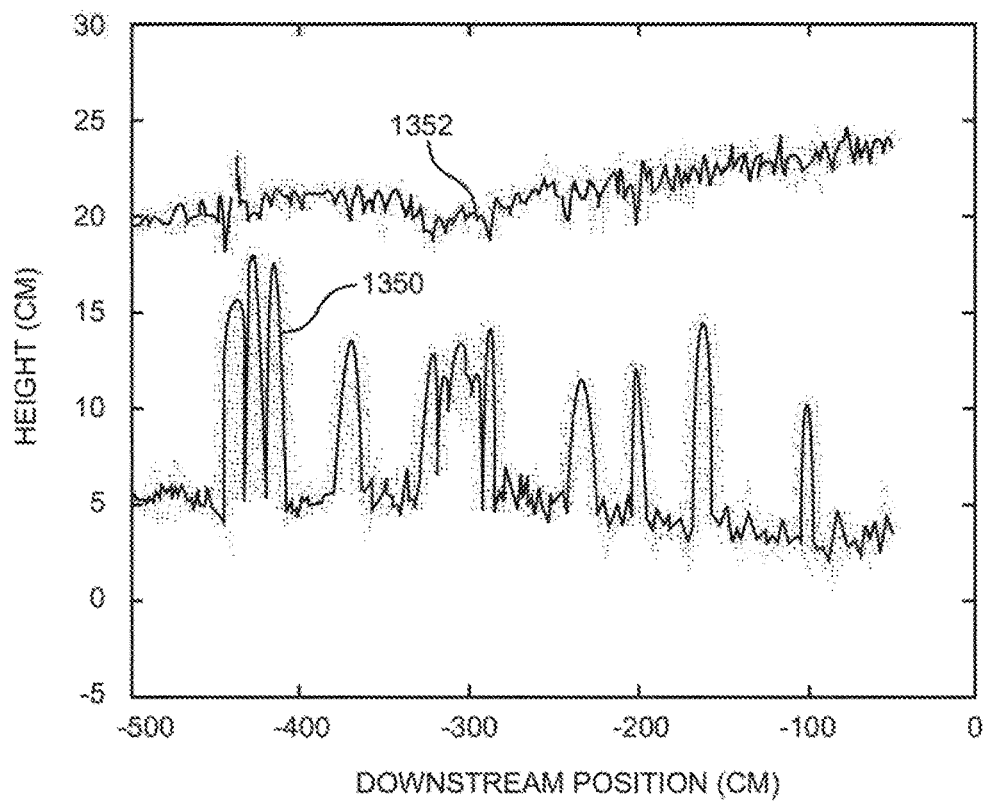
FIG. 13I illustrates a graphical representation of exemplary results of example 5.

FIG. 13I illustrates one-dimensional map of a flume with an x-axis downstream position [cm] and a y-axis height [cm]. More specifically, atop surface and bottom surface from ten consecutive sweeps up and down the center of the flume resulting in the plots shown here in the black dots.

Line 1352 shows the average measurement of the bottom surface while line 1350 shows the average measurement of the top surface of the water. The line 1352 shows the rocks and other objects distributed throughout the bed of the flume. Due to the nature of the water flow and the setup of the scan tracks, the water surface appears to move closer to the lidar as the lidar scanned in the downstream direction. This is due to the increased water depth as the water traveled downstream.

Figure 13J:
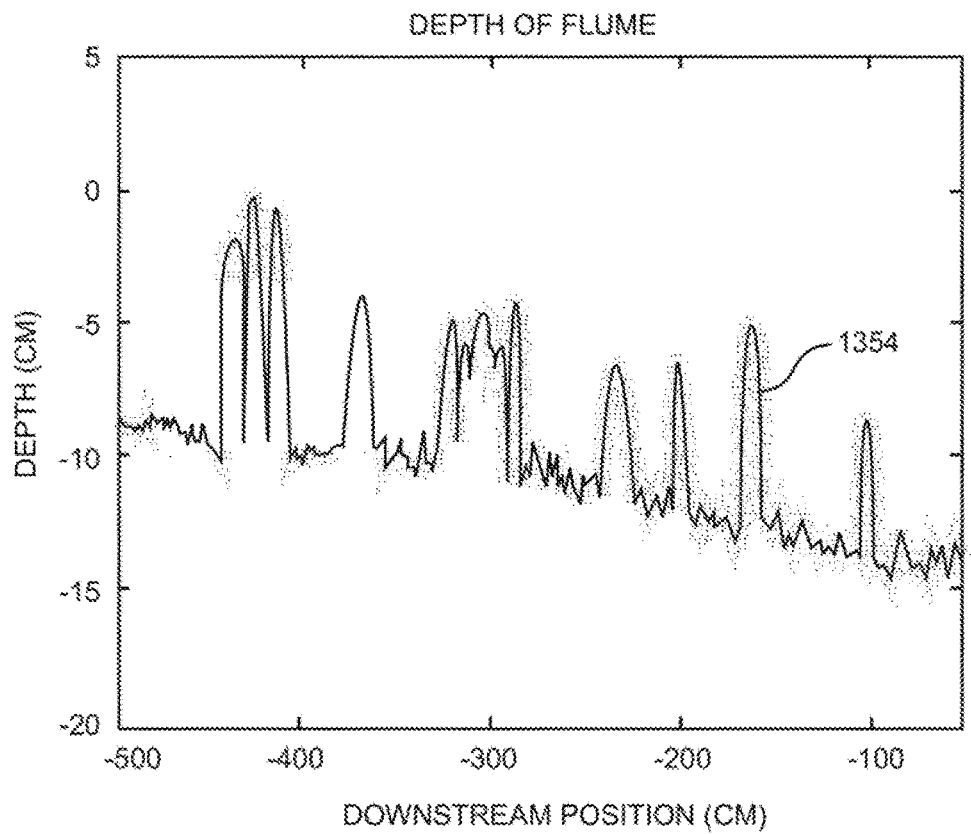
FIG. 13J illustrates a graphical representation of exemplary results of example 5.

FIG. 13J illustrates a depth of the flume with a x-axis downstream position [cm] and a y-axis depth [cm]. More specifically, individual measurements of the depth from ten consecutive sweeps up and down the center of the flume result in the plots shown here in the black dots and line 1354 shows the average of all ten sweeps.

The results from the testing demonstrate that the lidar system and technique works in a variety of shallow water conditions and submerged objects with about a 1 cm by about 1 cm horizontal resolution, dependent on scan parameters, and yielded less than about 1 cm vertical resolution, thus providing an unprecedented detailed estimate of water depth and subsurface morphometry. Ranging to the top and bottom surfaces was consistent throughout the test and was possible through the flowing water surface, as shown in FIGS. 13B and 13D.

Example 7

This example illustrates a lidar system configured to map the height of at least two surfaces in a high flowing indoor river flume with wavy surfaces. The experimental setup used was a lidar system 1402 described with reference to Example 4 positioned over a fast flowing shallow earthen embankment as shown in FIG. 14A and FIG. 14B.

Referring FIGS. 14A and 14B, the setup 1400 includes a lidar system 1402 arranged over tank 1404 on a rail system 1406 having a volume of about 50 cubic meters with an earthen embankment 1408 of a sand-clay-gravel mixture with a volume of 12 cubic meters and amass of about 30,000 kg. In operation, a flume 1410 of flowing water flows over the earthen embankment 1408 at a flow rate in a range of about 0.1 [cfs] to about 10 [cfs]. The rail system 1406 suspended along the longitudinal length (about 6 meters) over the flume 1410, and the downward-pointing lidar system 1402 attached to a sled on the rail system 1406 and can be pulled back and forth along the rail.

This example is configured to demonstrate the utility of a shallow-water lidar system for surveying an overtopping erosion test under running water conditions. The lidar system offers a new technology that can provide added research capability in the field of surface and overtopping erosion. Specifically it provides the ability to measure the water depth (even for shallow water) and bottom surface erosion with high flowing water present.

In operation, the lidar system 1402 was calibrated by operating while no water flow was present. The lidar illuminated a flat section of the dry earthen embankment and recorded time-of-flight (TOF) data of the laser pulses for the co-polarized and cross-polarized detectors. Any difference in time due to optical and electrical path differences between the two detector channels is determined by taking the difference of the TOF estimates for the two detector channels. This self-calibrates the system so that semi-transparent measurements of two surfaces or more can be associated with the range difference between surfaces. The sled-mounted lidar on the rails was manually pulled along the rails from one end of the flume to the other at a rate of about 4.0 feet per second. This took less than 5 seconds per pass in one direction over a length of about 20 feet. The lidar system 1402 was pointed downward and the height from the earthen embankment ranged from about 3 feet to about 10 feet. The water depth varied with flow rates but ranged from less than a centimeter to tens of centimeters in different sections. The lidar was operated with the same configuration outlined in Example 6. The lidar was turned on prior to water flowing and remained on throughout the duration of the experiment. The data acquisition system recorded backscattered laser light in both receiver channels per laser pulse (8 kHz laser repetition rate) while the lidar was pulled along the rail. A real-time display on the computer provided an indication of lidar signal acquisition. A rangefinder (make: Laser Technology, Inc., model: Universal Laser Sensor) was mounted on the sled and aligned normal to the lidar optical path to provide position information relative to a target located at the end of the flume. The rangefinder data recorded at 100 Hz and was synchronized to the same computer clock as the lidar. Therefore, the location of the lidar measurement along the flume can be determined by the computer time that data was collected with the rangefinder.

Figure 14C:
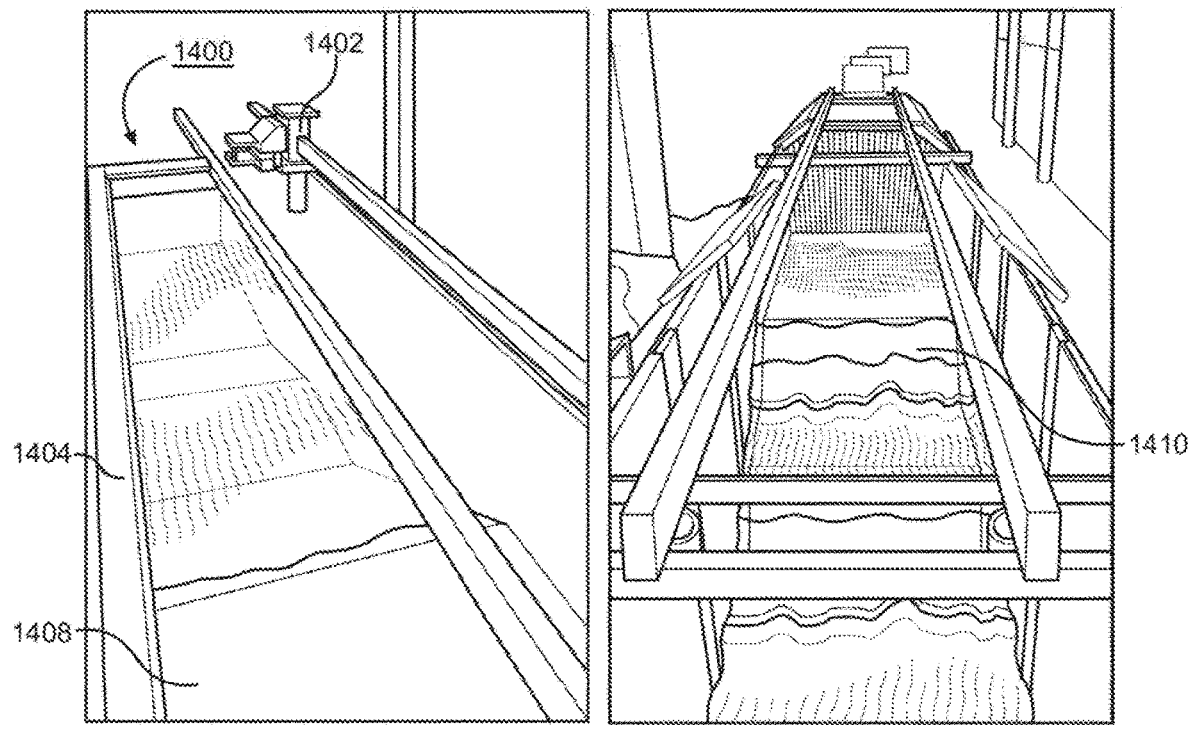
FIG. 14C illustrates a graphical representation of exemplary results of example 5.
Figure 14C:
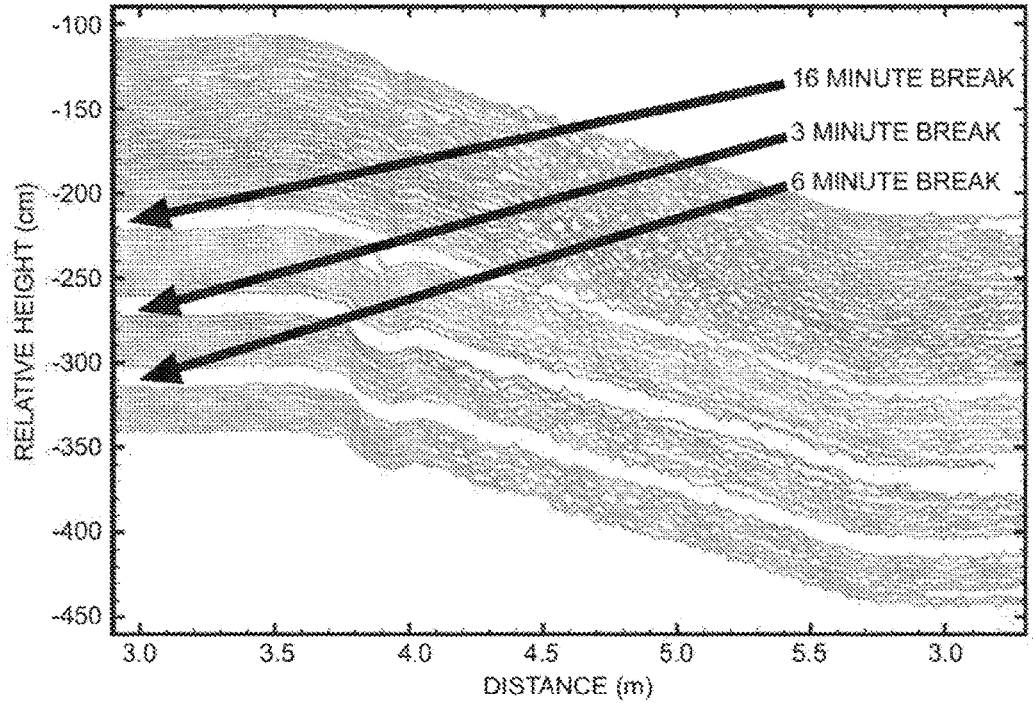

FIG. 14C illustrates a graphical representation of 10 [CFS] flow of water on a bed surface downstream scans with 2 cm horizontal resolution vertical displacement related to time between scans having an x-axis distance [m] and y-axis relative height [cm]. This graph further illustrates unprecedented precision measurements of shallow water soil-eroded surface under flow conditions ranging from 0.1 [CFS] to as high as 10 [CFS]. The graphic depicts horizontal distance on the x-axis in meters and represents the length of the flume in the longitudinal direction [m]. The y-axis provides a relative height measurement from the lidar to the earthen embankment in [cm]. Multiple longitudinal profiles of the embankment are provided during high flow conditions of about 10 [CFS], and the longitudinal profiles are offset vertically. The lidar results illustrate the capability of providing high-precision longitudinal profiles of the earthen embankment at 2 [cm] horizontal resolution over a 6 [m] span, and it can provide a single profile measurement in less than 10 [sec], with the potential for even faster scans if supported by a properly advanced scanning system.

Each 2 [cm] horizontal bin from a single longitudinal scan often contained 50 or more laser pulses producing a mean range estimate to the embankment with about +1 [cm] precision. Aggregating consecutive scans improved the precision of the mean embankment position relative to the lidar to even better than 1 [cm]. This measurement fidelity is much better than other lidars can produce, and this level of fidelity provides a better overall understanding of the likelihood of breach as well as a better estimate of breach initiation time, breach formation time, and peak breach outflow. The depth measurement has been a consistent feature of the lidar demonstrated in previous tests.

Example 8

Figure 15A:
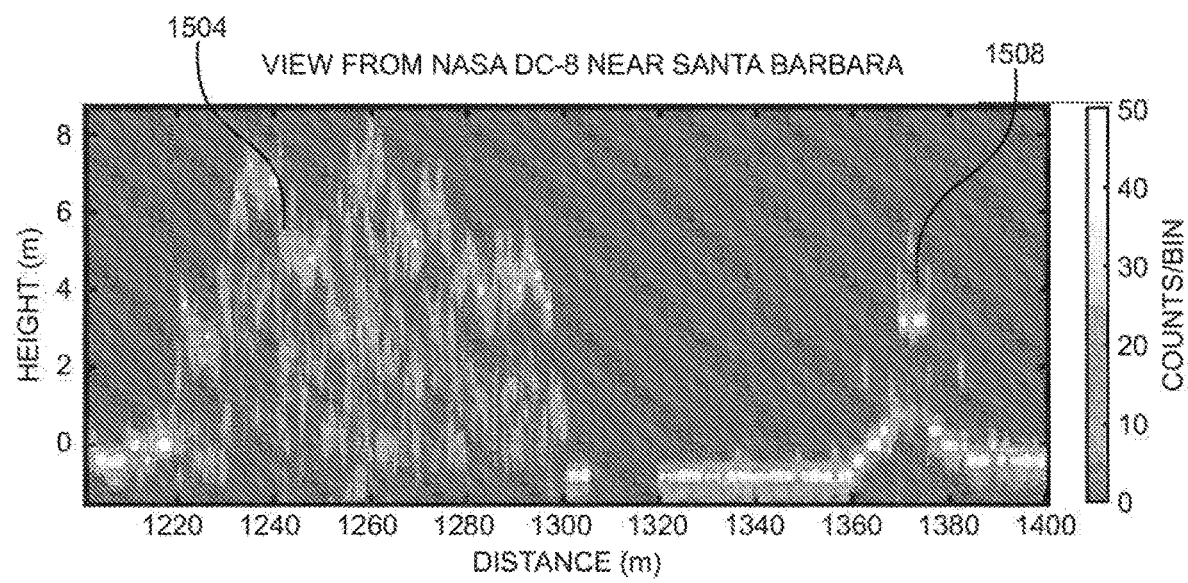
FIG. 15A illustrates a graphical representation of exemplary results of example 6.

FIG. 15A illustrates the data from the lidar system according to Example 7. The data is shown in a graph having an x-axis showing horizontal distance [m] and vertical distance [m] in the graph data is binned in 10 [cm] height bins and 1 [m] distance bins, and the number of lidar hits, anywhere from about 0 to about 50, in each bin is plotted in the contour plot.

Figure 15B:
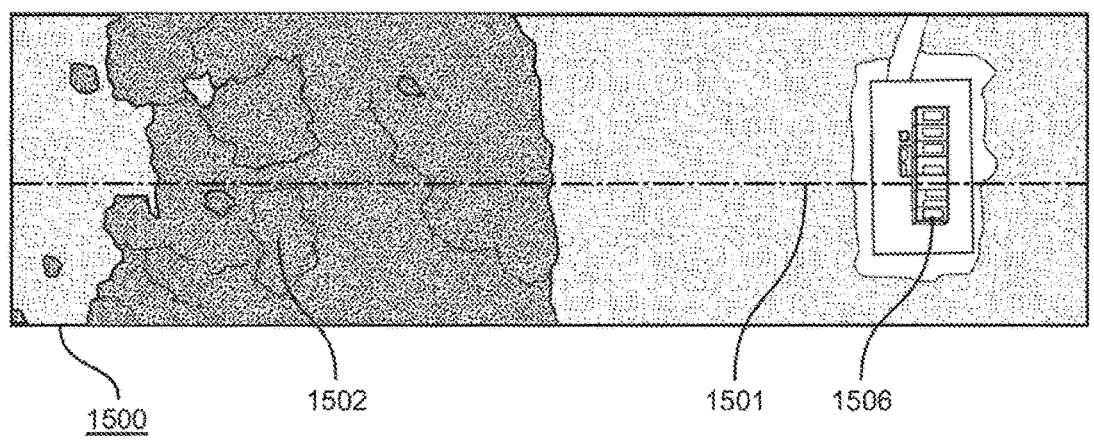
FIG. 15B illustrates a flight path according to example 6.

FIG. 15B illustrates an overhead view of the terrain 1500 covered in FIG. 15A, with the flight line 1501 across the image, a grove of trees 1502 and house 1506, correspond to data 1504 and 1508, respectively.

In this example, an aircraft was flown from left to right (east to west). On the left portion of the picture is a strand of trees and on the right side is a small red-and-white structure surrounded by a chain-link fence. The aircraft included a lidar system as described with reference to example 1. The aircraft was a Boeing DC-8 at a speed of about 90 [m/s] and elevation of greater than about 500 [ft]. The lidar was mounted over the nadir viewing port number 5 on the DC-8 using the existing baffling system and window. The mounting system for lidar system was used that met the DC-8 standards and provided sufficient vibration damping for the lidar system. This lidar system did not have scanning capability. This example served as a verification step to complete integration on a mobile platform. The lidar system may be used with a communication system as described with reference to FIG. 10.

In this example, polarization discrimination was a component of the measurement technique employed, and thus the transmit window in the nadir view port number 5 must be polarization preserving. The initial window selected for us to use was made of BK7 glass with a $MgF_2$ coating, and was tilted by approximately 1.5 degrees to facilitate control of reflections. A simple test, where laser light was transmitted to a controlled area on the hangar floor, showed the $MgF_2$ coating to have poor transmission at 532 [nm] and introduced a retardance to the transmit polarization, thus hindering the polarization sensitivity of the lidar. The one way transmission for the BK7 window, at 532 [nm], was measured to be approximately seventy two percent (72%), and the alteration to the polarization was determined to be more than 10 degrees of rotation.

The window on the hanger floor was changed to a custom NASA-made fused silica window. The transmission of the fused silica window was measured to be approximately ninety three (93%) at 532 [nm] with no discernible alteration to the polarization. Both of these measurements were done with the instrument mounted in the aircraft and diagnostic equipment located under the port window. A baffling system, metal tube extending from the instrument to the window port, was used to isolate the transmit portion of the lidar system from the receiving telescope, to eliminate any stray laser light that could contaminate the received backscattered ground signal. This helped control the back reflections of the laser light from the window.

The lidar operated on the aircraft during flight with one operator on board to cycle power and monitor progress. Flights were made primarily over land and the lidar was powered on once 500 feet altitude was reached. The data was collected on both receiver channels as described in previous examples.

The data from this example demonstrates our ability to detect small objects and variations in terrain from fast moving airborne platforms. The lower portion of FIG. 15B shows an aerial photograph of the scene while the upper portion, FIG. 15A, shows a height profile of the scene derived from our Lidar data. Two features in particular stand out. The first is a band of trees on the left side of the FIG. 15B. Aircraft navigation data were provided and the altitude information, aircraft attitude, and velocity were used to reference the lidar data to the ground.

Referring to FIG. 15A, lidar data from the treed region 1504 is shown in the left side of FIG. 15A and demonstrate mapping both of the tree canopy and of some sub-canopy structure. Based on the location of the ground on either side of the trees (just below 0 [m] height), a few of the lidar returns made it through to ground level during the overflight. The right side of FIG. 15A shows the structure 1508 sitting on top of a small hill. The structure appears to be roughly 2 [m] tall. The chain-link fence shows up on the left and right sides of the structure.

With our lidar system we can measure the height of the canopy while simultaneously detecting leaves and branches below the canopy. Some lidar pulses also reach the ground level through this region. Measuring sub-canopy lidar returns is a morphometric measurement that allows us to determine that we are hitting trees rather than a small hilly region. On the right side of the image is a small building situated on a slight hill and surrounded by a fence. These objects are all clearly identifiable in the lidar data shown in FIG. 15A. This engineering test allowed us to demonstrate operation from a mobile platform as well as a test of the morphometric capability provided by the lidar system in a terrestrial setting. Vertical resolution of a few centimeters was achieved with 10 [cm] horizontal resolution.

Example 9

Figure 16:
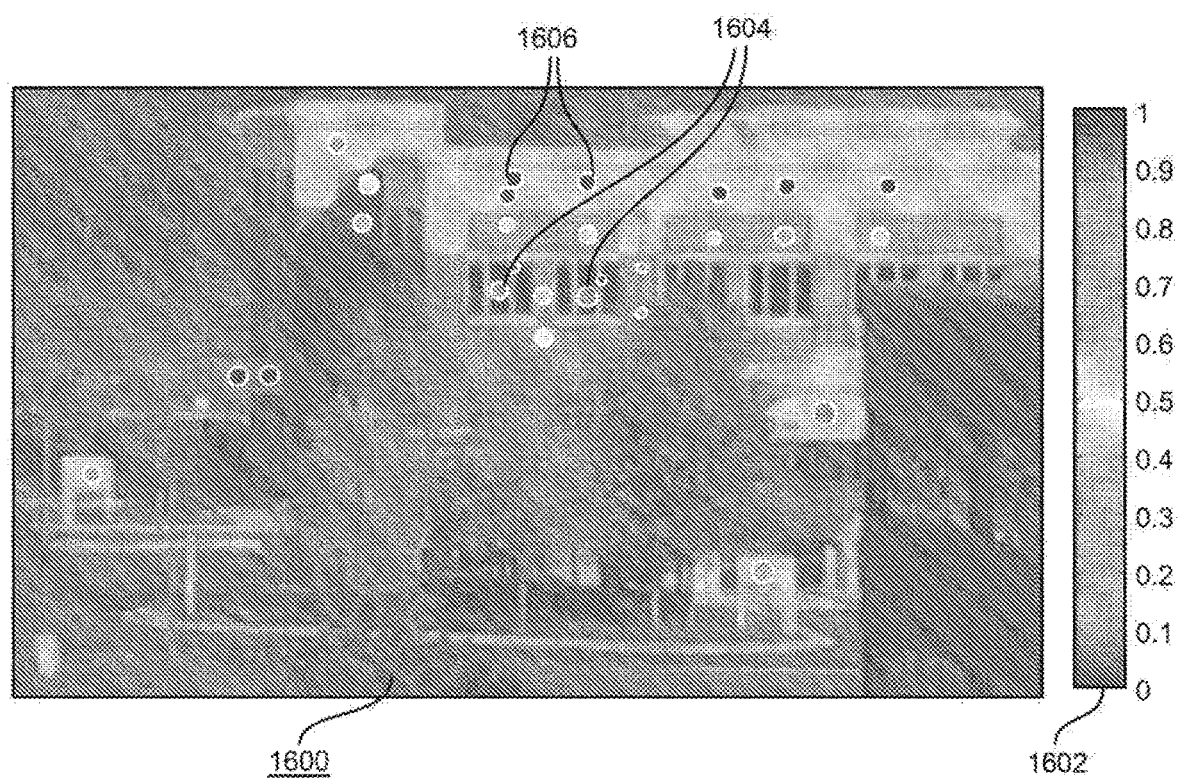
FIG. 16 illustrates a picture of an office building measured with lidar depolarization ratio according to example 8.

FIG. 16 illustrates a picture of an office building measured with lidar depolarization ratio according to example 8. In this example, a lidar system included the same configuration as example 1. The lidar system was operated by one person and placed in a fixed position across the street from the building to record data on both the co-polarized and cross-polarized channels. The ratio of these two signals provides what is called the depolarization ratio and allows for surfaces with different polarization scattering characteristics to be identified. A polarization calibration technique is performed before making the observations. Here, the laser light leaving the transmitter is passed through a half-wave plate and illuminates a hard target of know depolarization. In this case a piece of glass whose depolarization ratio is less than 0.05. The reflected signal from the glass was recorded by the lidar receiver in both the co-polarized and cross-polarized channels. This allows any differences in polarization caused by the system to be determined and accounted for when observing targets.

Once data in one position was recorded, the lidar system was repositioned and new data was collected in the same manner. The location of the laser spot on the office building was identified by eye and the time of the data collection was recorded in a lab notebook. The collection of data represented a sampling of different surfaces on the building and identified by their differing polarization characteristics.

Referring to FIG. 16, the picture is of a local office building 1600 with the measured lidar depolarization ratio shown in the scale color 1602. In this example, it is shown that the lidar depolarization ratio can be used to classify building materials. Note that the lidar returns from the glass show up with very low depolarization ratio 1604 while the bricks 1606 and other objects in the scene exhibit higher depolarization ratios, approaching unity.

The lidar allows for precise range determination to underwater objects and can simultaneously record information about the intensity of scattered returns. The polarization discrimination of the technique uses the relative intensity between the two polarization channels to allow for the classification of objects based on their depolarization ratio. Natural and man-made objects depolarize scattered light dependent on the micro-properties of the material, e.g. whether it is rough or smooth or whether the material is a dielectric or a conductor. By recording the depolarization ratio we can classify a target. This is shown in FIG. 16. This single-axis characterization of the material is limited but does provide valuable information as to the microphysical properties of the object. For instance, in FIG. 16 we can discern the difference between scattering from glass and from brick, and we can even observe differences between two types of brick (shown as light and dark in the image, and as red and yellow/green/blue in our depolarization spots). This scatterometry measurement can differentiate between materials and objects that may prove useful in autonomous vehicle advancements.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

As the foregoing discussion has been presented for purposes of illustration and description, the foregoing is not intended to limit the disclosure to the form or forms disclosed herein. In the foregoing description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this description, with each claim standing on its own as a separate preferred embodiment of the disclosure.

Moreover, though the description has included a description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The headings, titles, or other descriptions of sections contained in this disclosure have been inserted for readability and convenience of the reader and are mainly for reference only and are not intended to limit the scopes of embodiments of the invention.

What is claimed:

1. A method of mapping a surface topography, comprising:
generating a pulse of polarized light;
scattering at least some portion of the pulse of polarized light onto a first surface and a second surface;
receiving the scattered light from the first surface and the second surface as a received pulse, wherein the received pulse has one or more portions that overlap in an ambiguous intrapulse overlap portion;
separating the ambiguous intrapulse overlap portion into a first component associated with the first surface and a second component associated with the second surface, the first component and the second component having a relative difference in polarization between each other, wherein the separation removes the ambiguous intrapulse overlap portion;
determining an amount of time elapsed between the first component and the second component; and
calculating a relative distance between the first surface and the second surface based on the amount of time elapsed, thereby achieving a sub-pulse width resolution.

2. The method of claim 1, wherein the first surface comprises a relatively polarization preserving surface.

3. The method of claim 1, wherein the generating a pulse of polarized light step comprises the steps of generating a light pulse with a laser; and passing the light pulse through a polarizer.

4. The method of claim 1, wherein the first component is a co-planar polarization component of the scattered light and the second component is a cross-planar component of the scattered light.

5. The method of claim 1, wherein the receiving the scattered light step comprises the step of collecting the scattered light through a telescope.

6. The method of claim 1, further comprising the step of dynamically adjusting scanner parameters to keep a spot density relatively constant as at least one of an aircraft flying height and ground terrain elevation changes during a survey mission.

7. The method of claim 6, wherein the dynamically adjusted scanner parameters comprises a galvanometer-based scanner configured to execute a swath-tracking algorithm to maintain a predetermined laser spot density on the one or more surfaces.

8. The method of claim 7, wherein laser spot density is constant as an elevation changes between one or more surfaces.

9. A method of mapping a surface topography, comprising:
generating a pulse of polarized light;
scattering at least some portion of the pulse of polarized light onto a water surface and a bottom surface;

receiving the scattered light from the water surface and the bottom surface as a received pulse, wherein the received pulse has an ambiguous intrapulse overlap portion;

separating the ambiguous intrapulse overlap portion into a first component associated with the water surface and a second component associated with the bottom surface based on a polarization difference between the first component and the second component;

determining an amount of time elapsed between the first component and the second component; and calculating a relative distance between the water surface and the bottom surface based on the amount of time elapsed, thereby achieving a sub-pulse width resolution.

10. The method of claim 9, wherein the water surface comprises a relatively polarization preserving surface.

11. The method of claim 9, wherein the generating a pulse of polarized light step comprises:
generating a light pulse with a laser; and
passing the light pulse through a polarizer.

12. The method of claim 9, wherein the first component is a co-planar polarization component of the scattered light and the second component is a cross-planar component of the scattered light.

13. The method of claim 9, further comprising dynamically adjusting scanner parameters to keep a spot density relatively constant as at least one of an aircraft flying height and ground terrain elevation changes during a survey mission.

14. The method of claim 13, wherein the dynamically adjusted scanner parameters comprises a galvanometer-based scanner configured to execute a swath-tracking algorithm to maintain a predetermined laser spot density on the one or more surfaces.

15. The method of claim 14, wherein laser spot density is constant as an elevation changes between one or more surfaces.

16. A method of mapping a surface topography, comprising:
generating a pulse of polarized light;
scattering at least some portion of the pulse of polarized light onto a water surface and a bottom surface;
receiving the scattered light from the water surface and the bottom surface as a received pulse, wherein the received pulse has an ambiguous intrapulse overlap portion;
isolating a water surface return and isolating a bottom surface return from the received pulse based on polarization scattering properties of the water surface and polarization scattering properties of the bottom surface;
analyzing the water surface return in a first detector to determine a first component;
analyzing the bottom surface return in a second detector that is different from the first detector to determine a second component;
determining an amount of time elapsed between the first component and the second component; and
calculating a relative distance between the water surface and the bottom surface based on the amount of time elapsed, thereby achieving a sub-pulse width resolution.

17. The method of claim 16, wherein the water surface comprises a relatively polarization preserving surface.

18. The method of claim 16, wherein the generating a pulse of polarized light step comprises:
generating a light pulse with a laser; and
passing the light pulse through a polarizer.

19. The method of claim 16, wherein the first component is a co-planar polarization component of the scattered light and the second component is a cross-planar component of the scattered light.

20. The method of claim 16, further comprising the step of dynamically adjusting scanner parameters to keep a spot density relatively constant as at least one of an aircraft flying height and ground terrain elevation changes during a survey mission.

* * * * *